United States Patent [19]

Barnes et al.

[11] 3,914,747

[45] Oct. 21, 1975

[54] MEMORY HAVING NON-FIXED RELATIONSHIPS BETWEEN ADDRESSES AND STORAGE LOCATIONS

[75] Inventors: Elwood Eugene Barnes, Sound Beach; Sidney Thomas Emerson, Coram; Paul Clifton Rogers, Brookhaven; Wilburn Dwain Simpson, Port Jefferson, all of N.Y.

[73] Assignee: Periphonics Corporation, Bohemia, N.Y.

[22] Filed: Feb. 26, 1974

[21] Appl. No.: 446,116

[52] U.S. Cl. .............................................. 340/172.5

[51] Int. Cl.² .......................................... G06F 13/00

[58] Field of Search ...................... 340/172.5, 173 R

[56] References Cited

UNITED STATES PATENTS

| | | | |
|---|---|---|---|
| 3,599,176 | 8/1971 | Cordero, Jr. et al. | 340/172.5 |
| 3,651,475 | 3/1972 | Dunbar, Jr. et al. | 340/172.5 |
| 3,710,349 | 1/1973 | Miwa et al. | 340/172.5 |
| 3,737,860 | 6/1973 | Sporer | 340/172.5 |

*Primary Examiner*—Edward J. Wise
*Attorney, Agent, or Firm*—Gottlieb, Rackman, Reisman & Kirsch

[57] ABSTRACT

There is disclosed a memory in which there are no fixed relationships between received addresses and storage locations. In some modes of operation, fixed relationships may be established and maintained, but subsequently changed. In other modes of operation, the receipt of the same address in successive memory cycles controls access to different sequential storage locations. In such modes of operation, some of the bits treated by the CPU as address bits are actually interpreted as representing instruction codes. When the memory is operated in one of the latter modes, long messages may be stored in buffer areas of the storage while "using up" only a greatly reduced area of the computer address space.

79 Claims, 17 Drawing Figures

MEMORY HAVING NON-FIXED RELATIONSHIPS BETWEEN ADDRESSES AND STORAGE LOCATIONS

This invention relates to memories, and more particularly to memories which can be controlled to operate in stacking, mapping and other modes in which the relationships between addresses and storage locations are not fixed.

There are many different types of memories — core, semiconductor, plated wire, etc. — and they vary widely with respect to cost per bit, access and cycle times, and other characteristics. But the basic mode of operation of all such memories is the same. An address, for identifying one of the memory locations, is transmitted from a central processor or along a direct-memory-access (DMA) channel to the memory. If a read operation is to be executed, the data in the identified location are applied to output data lines, and if a write operation is to be performed, the data on input lines are written into the identified location.

A memory can be a self-contained unit, such as an "add-on" memory which is added to a system after its initial installation for expansion purposes. On the other hand, a memory may be contained on one or more cards within the same enclosure which houses a central processing unit (CPU). For the purposes of the present invention, which is applicable to any type of memory whether it is self-contained or not, it is important to distinguish between a memory itself and the CPU, DMA channel, or other address generating unit. As far as the CPU or a DMA channel is concerned, an address applied to the address lines is interpreted by a conventional memory as representing a respective location in the memory, into which or out of which data are to be written or read. For present purposes, the term "memory" refers to the hardware which operates on the address bits transmitted to it by a CPU or along a DMA channel, and either stores a word which is on data lines or applies a word to data lines in accordance with read/write and other control signals. This understanding of the dividing line between a memory and any other units to which it is interfaced is important because the memory of our invention operates on addresses in a way which is considerably different from the way prior art memories have operated on addresses extended to them.

The memory of our invention, in addition to storing and furnishing data in the usual way, is capable of operating in other modes — mapping and stacking. The concepts of mapping and stacking, in a broad sense, are not new, although as will be described below the mapping and stacking operations in the memory of our invention are implemented in ways which are considerably different from those known in the prior art. (For example, when operating in the stacking mode, the memory of our invention actually treats several of the address bits as representing a sub-mode of operation, rather than as part of the identification of a memory location.) But perhaps even more important is the fact that the mapping and stacking functions are controlled within the memory, whereas in the prior art any such functions have been controlled external to the memory. In the prior art, an address may be modified external to the memory, but once the modified address is transmitted to the memory, it represents a particular location associated with the transmitted address. This is to be contrasted with the memory of our invention in which there is no fixed correspondence between addresses transmitted to the memory and physical memory locations.

It is a general object of our invention to provide a memory in which the relationship between received addresses and storage locations is not fixed, and which is capable of operating in mapping and stacking modes, with the mapping and stacking functions being controlled by the memory itself in accordance with addresses transmitted to it, the operation of the memory being such that there is no one-to-one correspondence between addresses transmitted to it and physical memory locations.

Another object of the invention, when the memory is operated in the mapping mode, is to provide a high degree of flexibility. Any page of the address "space" can be mapped onto any equivalent-size page of memory locations, without regard to address boundaries within the memory. This is to be distinguished from the prior art in which pages of address space are mapped onto equivalent-size pages of the memory whose address boundaries are fixed.

Other objects of our invention, when the memory is operated in the stacking mode, are to allow a limited number of addresses transmitted to the memory to control the storage of data in a much larger number of memory locations (thus allowing extensive buffer storage without using up extensive address space), and to vary the stacking operation itself in accordance with some of the address bits.

For a proper understanding of the present invention, it is necessary to distinguish between the "computer address space" and memory addresses (which identify physical storage locations in the memory). Depending upon the number of bits in the instruction word of a central processor, there is a limited number of bits which are available for identifying a memory address. For example, 16 bits may be available for identifying one of $2^{16}$ ($64k$) addresses. These $64k$ addresses ($k$=1024) comprise the "address space" of the data processing system. At most $64k$ memory locations can be identified on a one-to-one basis by the $64k$ addresses in the address space. In a system where all $64k$ addresses are used to identify respective memory locations, the maximum size memory which can be employed is a $64k$ memory, in the absence of the provision of some means (hardware or software) to expand the memory.

There are techniques in the prior art in which larger memories have been used despite the fact that the address space is limited. One such technique results in what is known as a "paged memory". The total amount of "physical" memory which may be provided may have several hundreds of thousands of storage locations divided into pages of $2k$ locations each (or some other size). This physical memory may be utilized with a computer having a much smaller program address space (e.g., $64k$ locations or 32 pages of $2k$ locations each) by "mapping" each $2k$ page of the limited program address space onto one of the much larger number of pages in the physical memory. In effect, any address within a $2k$ page of the program address space can be made to be relative to the starting address of any $2k$ page in the physical memory. Although at any one time the total program address space may never exceed $64k$ locations (in this example), the actual amount of physical memory accessable may be significantly larger by selectively changing from time to time the mapping of program address space onto physical memory during the operation of one or more programs in the computer. Often, a set of "relocation" registers within the CPU is used to map the smaller program address space of a processor onto the larger physical address space of the memory.

What the various prior art mapping procedures have in common is that they are accomplished, whether under hardware or software control, in the CPU itself. As far as the physical memories are concerned, when an address is transmitted to any such memory it always identifies the same physical storage location in the memory. A word can be written into the memory or read out of it, but the storage location involved in the operation is always uniquely associated with the particular address which appears at the address line inputs of the memory. Moreover, prior art mapping techniques have generally been inflexible in that any 2*k* (or other dimension) page in the program address space can only be mapped onto predetermined 2*k* pages in auxiliary storage. Customarily, the physical boundaries (addresses) of the pages in the physical storage are fixed.

In accordance with the principles of our invention, our memory system includes, in addition to auxiliary storage, a much smaller stack and map pointer memory (SMPM) and logic circuitry for modifying an address transmitted to the system, for example, by a CPU. A "map pointer" section of the SMPM is used in conjunction with an incoming address to access a particular word in auxiliary storage. The mapping thus takes place in the memory itself. Moreover, the system is highly flexible in that the starting address of any page in the auxiliary storage can be arbitrarily selected. This permits pages in the auxiliary storage to overlap. An entire page in the auxiliary storage need not be "wasted" in the event it is not used to full capacity. In the prior art, if a page was not filled, part of its capacity was unused, or if an attempt was made to store a part of another set of data or instructions in the page, resort had to be made to linking techniques. In accordance with the invention, however, if it is known that one page will not be fully used, another page can be made to begin at some intermediate point in the page which is not fully utilized.

Depending on the contents of the map pointer section of the SMPM, the pages (or blocks) of the auxiliary memory may be contiguous, separated or overlapped in all possible combinations. In fact, switching pages in the auxiliary memory merely entails writing a new value in the map pointer section of the SMPM. This allows a programmer to quickly and easily switch from one program or data block to another. For the mapping to be flexible in this manner, it is necessary that the contents of the SMPM be changeable. This is accomplished when the system is operated in the SMPM mode, as will be described below.

One of the big problems in processing long messages in communications applications is that it is often necessary to temporarily store a message in some kind of buffer. Typically, each incoming character is stored in a different memory location, with successive characters being stored in contiguous locations. In the prior art, to accomplish such storage (and subsequent retrieval), a stack pointer address is maintained and manipulated by the CPU. This address identifies either the next available or the last used memory location into which a character is to be stored or from which a character is to be retrieved. During storage, the stack pointer is typically incremented or decremented prior to the storage or retrieval of a new character. Since the stack pointer always refers to an address in the limited address space, it is apparent that the address space consumed is equal to the total buffer size utilized and that the limited address space will be rapidly used up if a large number of buffers or if unusually long buffers are employed.

This is avoided in our invention by using the same address in the address space to access successive locations in the auxiliary storage when the system is operated in the stacking mode. As successive characters of a message are to be stored (or retrieved), the same address is transmitted to the memory of our invention. That address accesses a stack pointer which is contained in the stack pointer section of the SMPM. The stack pointer in turn points to a location in the auxiliary storage. All that is required to process successive characters is for the memory to automatically increment or decrement the appropriate stack pointer in the SMPM on successive memory accesses when operating in a stacking mode. In this manner, large amounts of buffer space (auxiliary storage) can be effectively utilized with a minimum impact on the limited program address space of the system as well as accompanying simplification of the associated software.

For greater flexibility, eight addresses in the address space are utilized for accessing the same stack pointer in the SMPM. (There is still a considerable savings because only eight addresses are required to store perhaps thousands of characters in the auxiliary storage.) Eight addresses are used to access the same stack pointer, but the particular one of the eight addresses actually transmitted to the system determines the particular mode of operation. For example, one of the addresses controls the incrementing of the stack pointer and another controls the decrementing of the stack pointer. Thus some of the bits in the addresses transmitted to the memory of our invention are not treated as part of an address; instead, they are treated as commands for controlling respective submodes of operation (within the broad stacking mode). And, as in the mapping mode, the stacking functions are performed within the memory. This greatly simplifies adding our new memory to already existing systems since no hardware changes are involved.

Further objects, features and advantages of our invention will become apparent upon consideration of the following detailed description in conjunction with the drawing, in which.

Figures 13, 14:
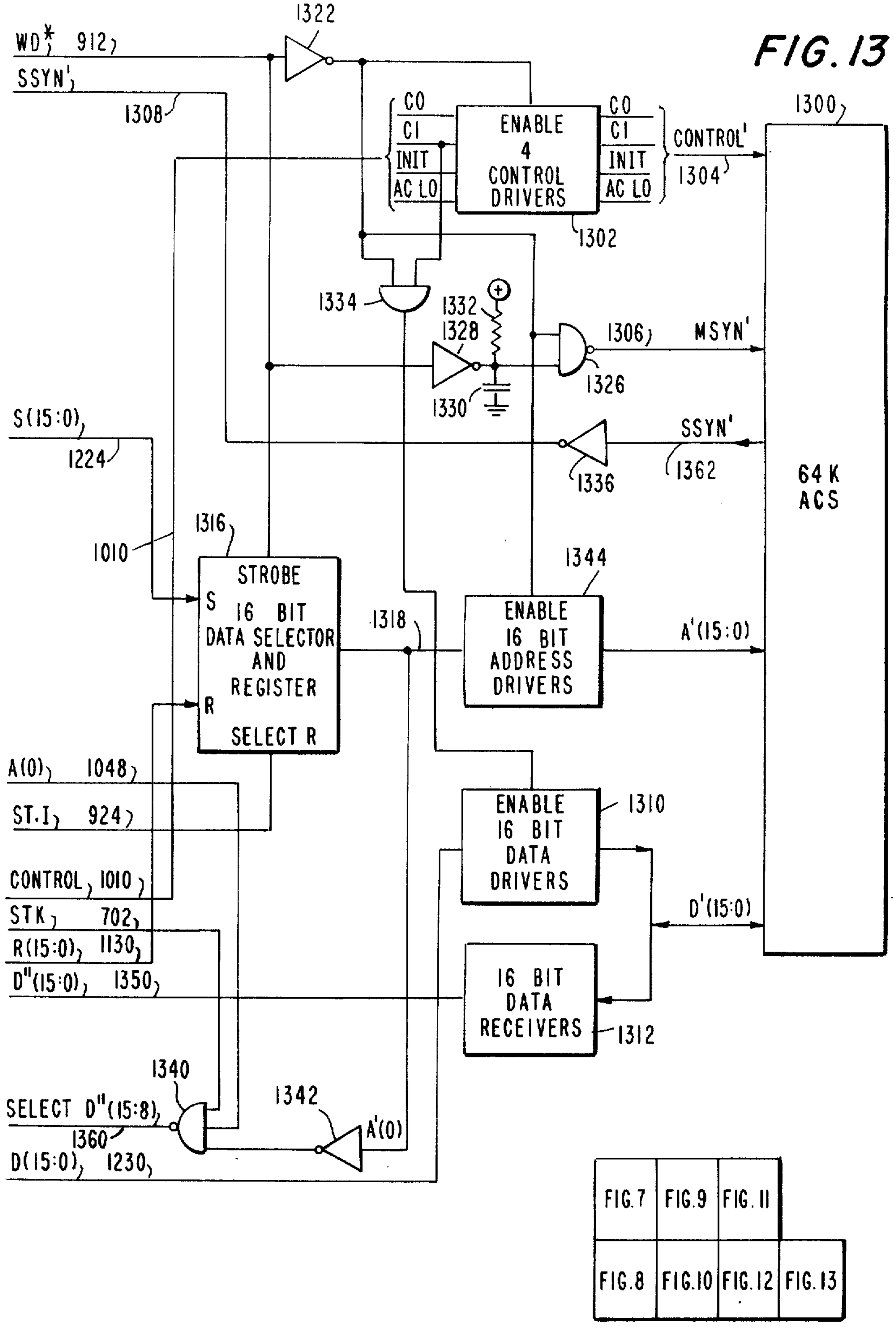
Figure 15:
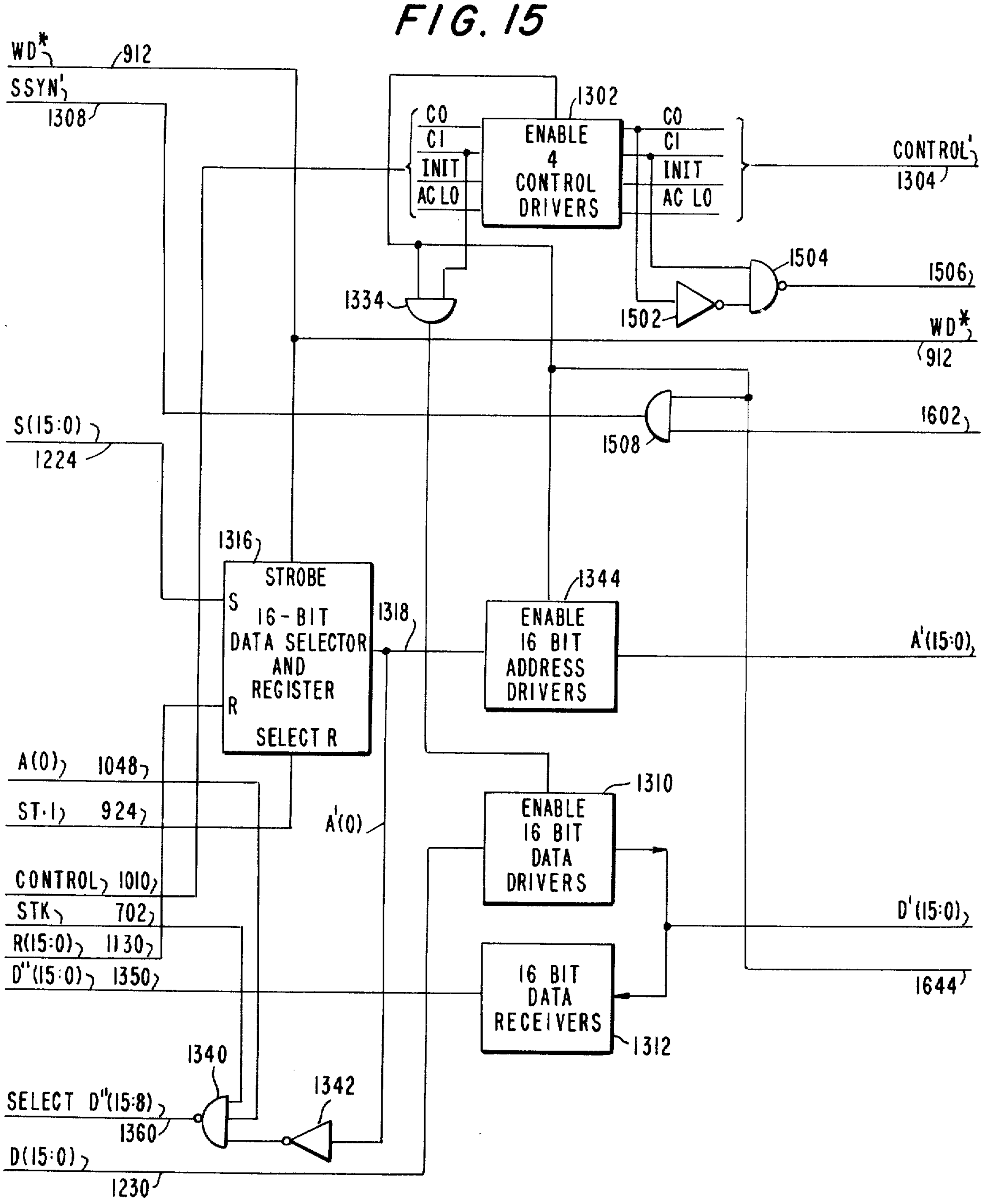
Figure 16:
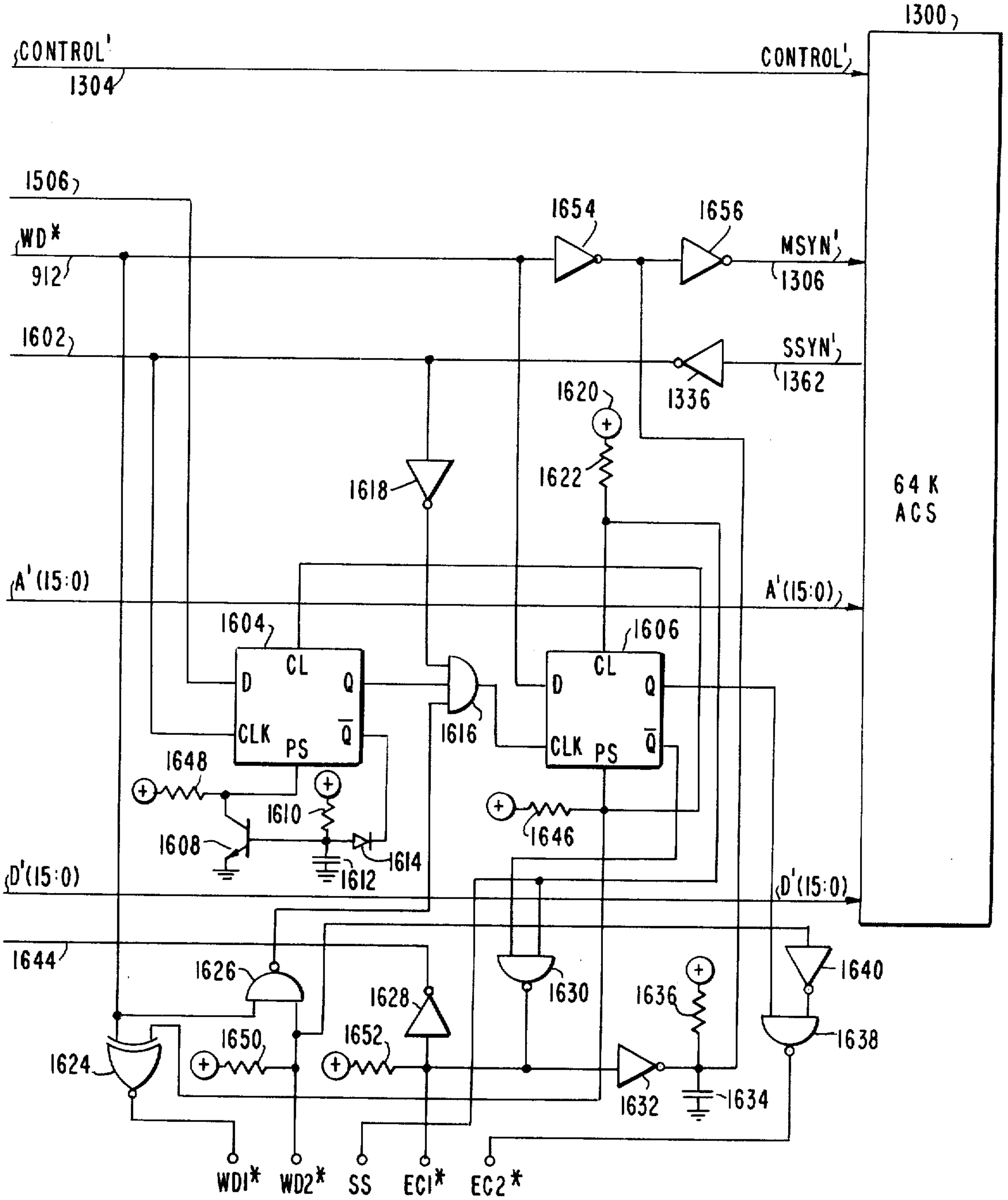
Figure 17:
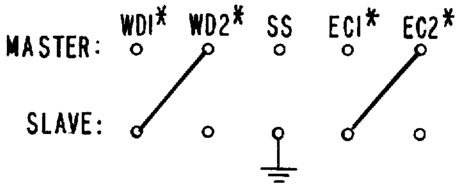

FIGS. 15 and 16, with FIG. 15 being placed to the left of FIG. 16, depict "priority logic"; when these figures are substituted for FIG. 13 in each of two separate systems, both systems, controlled by separate processors, may be connected to a common bus system to gain access to the same auxiliary computer storage; and FIG. 17 shows the strap connections which are required at five terminals of each of two systems having priority logic.

The invention will be described herein in two parts. In the General Description, the organization of the system is set forth together with a description of what happens when the system is operated in each of the several modes in which it can be operated. FIGS. 1–6 referred to in the General Description represent symbolically the types of operations which are performed in the system as well as the manner in which they are implemented, without, however, any attention being paid to particular circuits for accomplishing the required functions. For example, the mathematical manipulations of the address bits transmitted to the system for the purpose of accessing a particular storge location are depicted, but the particular circuits for performing the functions are not described. Instead, that is deferred to the Detailed Description. In this way, a complete overview of the invention can be appreciated by reading only the General Description.

GENERAL DESCRIPTION

Many modern small computers are 16-bit word machines. This word length usually limits the memory size to 64*K* ($K=10^{24}$) storage locations. In the usual case, the memory is partitioned into 32*K* words, with each word having two 8-bit bytes. Each of the 64*K* addresses which can be specified by the CPU can thus identify one of 64*K* 8-bit bytes. Unfortunately, this number of bytes is frequently too small for real-time applications. This is especially true when large amounts of buffering are required, e.g., when it is necessary to store individual characters of very long messages.

One of the most important things to understand about the system of the invention is that while the illustrative embodiment includes a 64*K* memory, all 64*K* locations in the memory can be accessed by transmitting to the system far fewer than 64*K* addresses. Thus only a small portion of the 64*K* address space (the 64*K* addresses which can be specified by the CPU) is "used up" in gaining access to all 64*K* storage locations in the system. As will become apparent below, a user can select the particular address areas within the overall 64*K* address space to which any system responds. By selecting a different portion of the overall 64*K* address space for each of many systems, they can all be connected to the same bus system to greatly expand the total number of storage locations which can be accessed by specifying addresses within the limited 64*K* address space.

Figure 1:
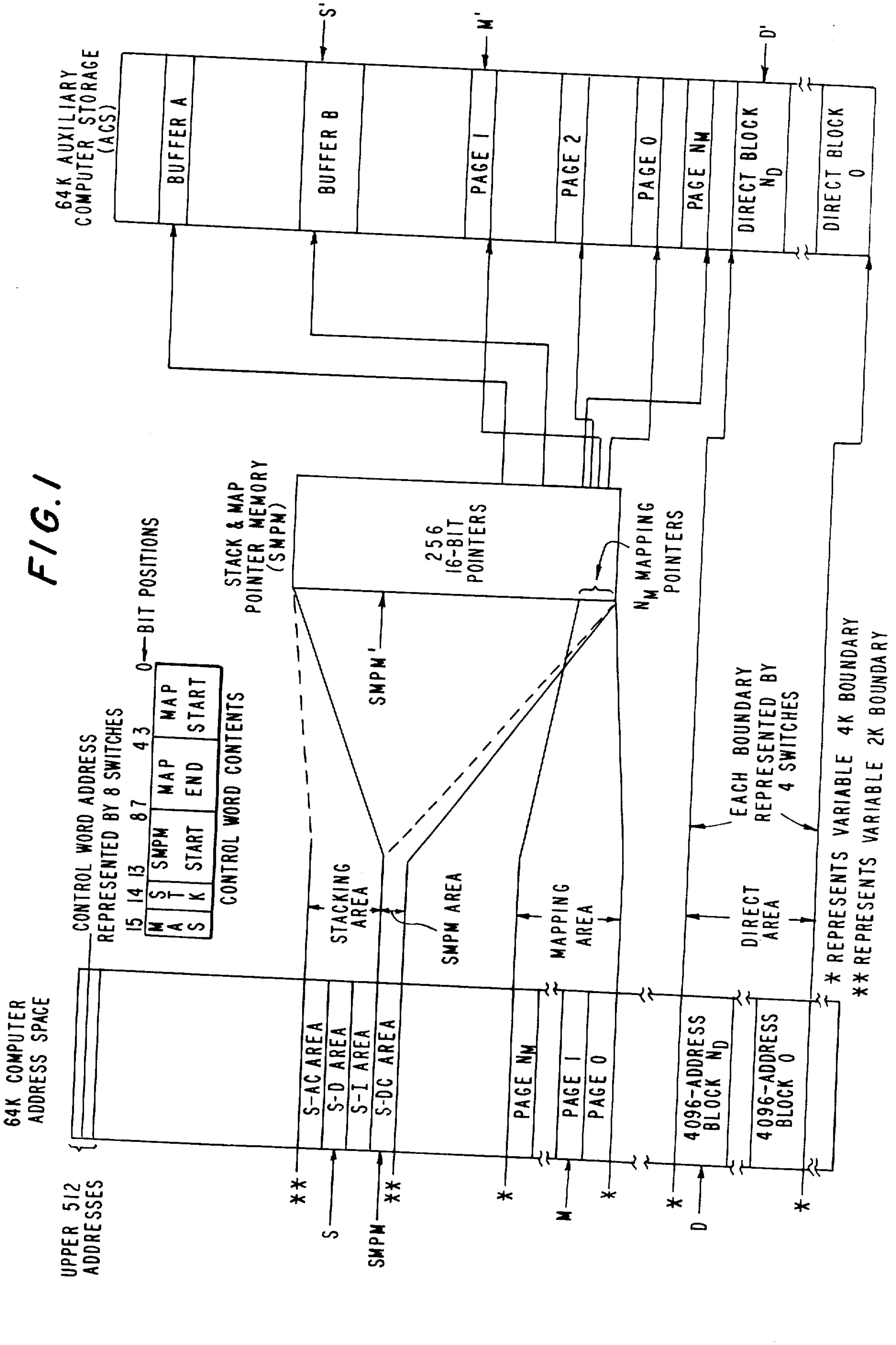
FIG. 1 depicts symbolically the relationship between a computer address space and the storage locations within the system of our invention, and further shows the information which is represented by a control word which is stored in the system when it is operated in the "control" mode.

FIG. 1 depicts symbolically the relationships between the computer address space (memory addresses) and the storage locations within the memory of our invention. On the left side of FIG. 1, the 64K computer address space of a conventional minicomputer is depicted. Each computer-generated address consists of 16 bits so that a maximum of 64K addresses can be specified. The system of our invention includes a conventional 64K auxiliary computer storage (ACS) shown on the right side of the drawing and an additional 256-word high-speed memory referred to as a stack and map pointed memory (SMPM) (as well as many other elements not shown in FIG. 1). The system responds to addresses contained within only seven areas of the 64K computer address space. The sizes of some of these areas can be adjusted by the user, and the user can also select the locations of the seven areas. It is this feature of allowing the user to select the areas of the overall address space to which each system responds that permits many systems to be used together, with each one responding to different sets of areas within the overall address space, so that the total auxiliary computer storage can far exceed 64K.

The function of the SMPM, in most of the modes in which it is used, is to allow a single address in the computer address space which is recognized by the system to control the accessing of many different storage locations in the ACS. It is the address manipulation within the system which is the key to providing for larger amounts of computer memory while staying within the address limitations of most minicomputers. The address of the actual storage location in the ACS which is accessed is derived in several modes by performing a predetermined operation on the contents of an appropriate 16-bit word in the SMPM in accordance with the values of some of the bits of the computer address which is specified. Unlike conventional memories, there is no simple one-to-one correspondence between an address presented by the computer and the actual address used within the system to access a given word or byte within the ACS.The addresses specified by the computer (CPU, DMA channel, etc.) not only relate in an unconventional way to actual locations within the ACS, but they also define the type of address manipulation which is performed on the address itself.

Each of the seven areas depicted in the computer address space of FIG. 1 represents a different function, that is, a different type of operation ensues when an address within any one of the seven functional areas is received by the system. Each of the seven functional areas and modes of operation will now be described separately.

Direct Mode

The direct mode of operation does not "save" any computer address space. But a direct mode capability is provided for the purpose of flexibility; a particular user may want his system to operate in the direct mode at least partially. Since this mode of operation is perhaps the easiest to understand it is described first.

As depicted in FIG. 1, each address within the direct area which is specified on the address line inputs of the system controls direct access to a respective storage location in the ACS. The user can select the size of the direct area, as well as its address boundaries. But with respect to the boundaries, a limitation is imposed; the beginning and ending boundaries of the direct area must be multiples of 4K. The direct area is divided into contiguous blocks each having 4096addresses. The blocks are identified by the symbols *O* through $N_D$. The user selects the beginning address of the direct area (the lower boundary) by setting up four hardware switches provided in the system. Since the beginning address is on a 4K boundary, the first address of the direct area is of the form XXXXOOOOOOOOOOOO so that only four switches are required. Similarly, the upper boundary is specified by adjusting four other hardware switches to represent the beginning address of the last 4K block in the direct area. By requiring the direct area to begin and end at 4K boundaries, only eight switches are required to define the area. An address within the 64K computer address space is recognized as being within the direct area, i.e., as requiring the system to operate in the direct mode, by checking that the four most significant bits in the transmitted address are equal to or greater than the four-bit lower bound and equal to or less than the four-bit upper bound. (The direct mode may be disabled altogether by setting the value of the upper limit switches to less than the value of the lower limit switches).

There can be up to sixteen contiguous blocks in the direct area. As a practical matter, it is expected that in the usual case at most a few blocks of the computer address space will be used in the direct mode. The ACS storage locations which are used in the direct mode are those with the lowest addresses. There are as many blocks in the ACS which can be accessed in the direct mode as there are in the direct area of the computer address space. Basically, the direct area is "mapped" onto the ACS but with an offset which is some multiple of 4K. Any address D (represented in FIG. 1) which appears on the address lines to the memory and falls within the direct area is translated to an address D' to access the respective location in the ACS as shown in FIG. 1. The difference between addresses D and D' is always a multiple of 4K, the exact multiple depending on the value of the lower boundary of the direct area which is set by the hardware switches.

Storage locations in the direct blocks of the ACS can also be accessed when the system is operated in other modes. The setting up of a direct area to which the system responds simply provides another mode of access to the lowermost storage locations in the ACS. It should be noted that while the direct area is shown below the other areas of the computer address space in FIG. 1, that need not be the case. The direct area can consist of up to sixteen contiguous 4K blocks anywhere within the computer address space.

The manner in which the ACS address D' is derived from the computer address D is as follows. The address D is first examined to determine whether it is within the direct area and, if it is, within which block of the direct area it is contained. The "offset" from the lower boundary of the block thus determined is then derived. The respective direct block in the ACS is then identified and the previously determined offset is added to the starting address of that direct block to derive the address D'.

Figure 2:
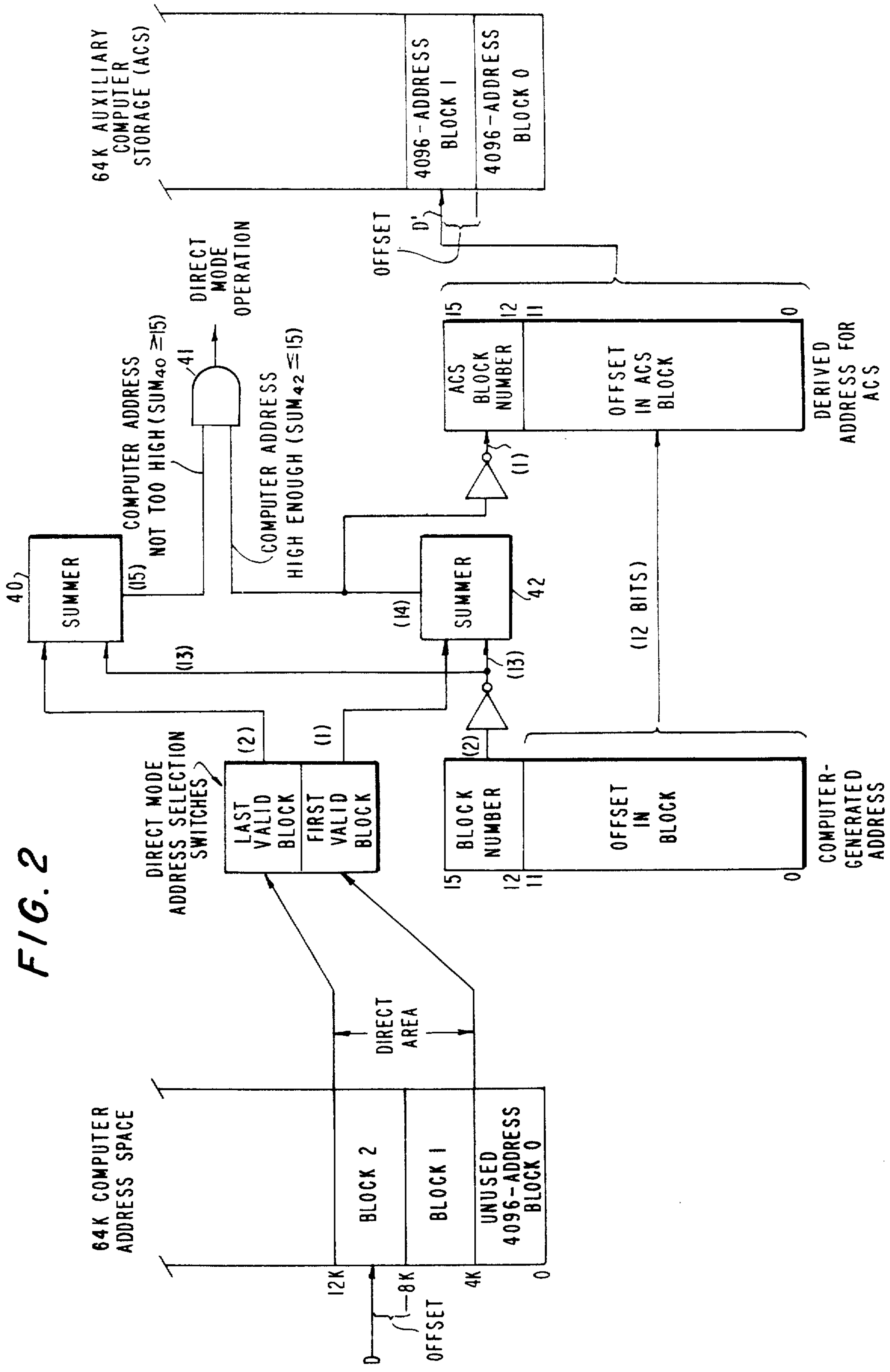
FIG. 2 depicts symbolically the operation of the system in the "direct" mode.

The mathematical manipulations on an address D are depicted in FIG. 2. The 64k computer address space is divided into 16 blocks (0 through 15) of 4096 addresses each. In the example selected, the lowest block is not part of the direct area, but blocks 1 and 2 are. Eight "direct mode address selection switches" are provided. Four of these represent the first block in the direct area (block 1) and the four others represent the last block (block 2). Recalling that the boundaries of the direct area are represented by four bits each, it is apparent that if the decimal values of the four bits are used, they actually represent the block numbers — 0, 1, 2, etc. In FIG. 2, the numbers within parentheses represent data values. Accordingly, the two groups of selection switches represent the decimal numbers 1 and 2 respectively.

Since the direct area consists of only two blocks in the selected example, only the two lowest blocks (0 and 1) of the 16 ACS address blocks are used in the direct mode of operation. It is necessary to translate the address D (in this case within block 2 of the computer address space) to an address D' (in this case within block 1 of the ACS).

The four most significant bits (12–15) in the 16-bit computer-generated address represent one of the 16 blocks of the address space. The 12 least significant bits (0–11) represent one of 4K offsets within the block. Accordingly, it is the 4-bit block number in the computer-generated address which is used to identify the block in the ACS which contains the storage location to be accessed, while it is the 12-bit offset in the computer-generated address which is used to access a particular location within the selected block of the ACS.

As shown in FIG. 2, the block number in the computer-generated address is first complemented. The 4 bits which represent block 2 are 0010; the complement of this number is 1101 or decimal 13. The complemented block number is extended together with the last valid block number to the inputs of summer 40. If the sum is greater than or equal to 15, it is an indication that the block number containing address D is not too high and one input of gate 41 is enabled. The complemented block number is also added to the first valid block number in summer 42. If the sum is less than or equal to 15, it is an indication that the block number which contains address D is high enough (that is, it is the first block in the direct area or one above it). In such a case the second input of gate 41 is also enabled, and the output of the gate goes high to indicate that the system should operate in the direct mode. If either input to gate 41 remains low, it is an indication that the computer-generated address D is not within the direct area.

The number at the output of summer 42 is complemented as shown in FIG. 2, and the complemented bits are used as the four most significant bits in the address which is derived to access the ACS. In the present case, the ACS block number which is derived in this manner is 0001 or block 1 (the second block in the ACS) as required. The 12-bit offset in the computer-generated address is added to the ACS block number to derive the full 16-bit address D' for accessing the ACS.

In general, and with reference to decimal notation, let $N_B$ represent the block number indicated by address bits 12–15, let $N_F$ represent the first valid block number and let $N_L$ represent the last valid bock number. The complemented address block number is thus $15-N_B$, the output of summer 40 is thus $15-N_B+N_L$, and the output of summer 42 is thus $15-N_B+N_F$. If the computer address is not too high, then $N_L \geq N_B$ and the output of summer 40 must be greater than or equal to 15 as indicated. If the computer address is high enough then $N_B \geq N_F$ and the output of summer 42 must be 15 or less as indicated. Also, after the value $15-N_B+N_F$ is complemented the ACS block number is seen to be $15-(15-N_B+N_F)$, or $N_B-N_F$. Thus the ACS block number is the computer-generated address block number minus the number of unused blocks in the 64K computer address space below the direct area, the desired result.

It should be noted that if the two sets of address selection switches are set so that the first "valid" block number is greater than the last valid block number, then in no case can both inputs of gate 41 be enabled and the system will never operate in the direct mode. It should also be noted that from a programming point of view, the direct area may be used as any other area of conventional memory. No special programming considerations are required.

The illustrative embodiment of the invention is designed to work with the PDP-11 computer models sold by Digital Equipment Corporation. Memories which are attached to the UNIBUS bus system of such computers have word storage locations of 16 bits in length. However, either of the two 8-bit bytes in any word may be accessed. It is for this reason that 16 address bits can specify only 32K 16-bit words; one of the address bits is required to specify the upper or lower byte in a selected word.

Among the 56 signal lines in the UNIBUS set, there are 16 address lines (A(15:0)) and two control lines (CO,Cl). When a read operation is to be performed, the signals on the control linens represent a read operation and the lowest bit in the 16-bit address is ignored. Address bit 15 is the most significant and address bit 0 is the least significant, The 15 most significant bits of the address represent the two bytes contained in the same word storage location, and all 16 stored data bits are applied to the data lines. If the CPU is interested in only one of the two bytes, it processes only 8 of the 16 data bits accordingly. But as far as the memory is concerned, 16 data bits are read oout from a 16-bit word storage location.

But when a write operation is to be performed it is possible to write either a full 16-bit word or only a 8-bit byte, and in the latter case either the upper or lower byte of the work may be selected. If a complete work is to be written, the control line signals represent this, and the 16-bit word which is applied to the 16 data lines is written into the 16-bit storage location represented by the 15 most significant bits in the address. On the other hand, if only an 8-bit byte is to be written, the two control line signals represent a byte operation, but they do not identify which of the two bytes is to be written. Instead, the memory examines the low-order bit of the 16-bit address to identify either the upper or the lower byte which is contained in the word identified by the 15 most significant bits in the address. (It is the CPU which applies the 8 bits to be written on either the 8 lower data lines or the 8 upper data lines.)

When the system of our invention is operated in the direct mode, the same rules apply. This is obviously the case since the only address bit manipulations involve the 4 highest order bits. Whether a read or write operation occurs (*and, if the latter, whether a work or byte operation takes place) depends on the control line signals; and, in the case of a write byte operation, the upper or lower byte of the selected ACS location into which 8 bits are written depends on the value of the low-order bit in the 12-bit offset.

Mapping Mode

Referring to FIG. 1, the mapping area, like the direct area, consists of a variable number of contiguous blocks of 4096 addresses each. Each block is devided into two pages of 2048 addresses each. The boundaries for the mapping area are multiples of 4K, and consequently there is always an even number of pages in the mapping area. The pages are labeled $O$ through $N_M$. The upper and lower boundaries are not set by hardware switches. Instead, as will be described below, they are determined by a control word which is transmitted to the system and stored in special storage elements provided for this purpose. For an understanding of the mapping mode, it is sufficient to assume that the upper and lower mapping area boundaries are represented in the system, without paying any attention to how they are represented there in the first place.

When the system is operated in the mapping mode, any received address which is contained within one of the pages in the mapping area is operated upon to derive an address of a storage location in a respective page in the ACS. There are as many 2048-address pages in the ACS as there are 2048-address pages in the mapping area of the address space. As in the case of an operation in the direct mode, when an address is received which falls within the mapping area, the system first determines the starting address in the ACS of the respective page. Thereafter, the offset of the received address within its respective page of the mapping area is added to the starting address of the respective page in the ACS to determine the address of the location in the ACS which is to be accessed. The starting address of the respective page in the ACS is contained in an associated 16-bit storage location in the SMPM. Unlike prior art mapping techniques, this starting address may be arbitrarily set to any word access address within the ACS, and may be changed from time to time under program control. FIG. 1 shows the translation of an address M which is contained in page 1 of the mapping area to an address M' to access a respective location in page 1 of the ACS.

The major difference between the direct and mapping modes is in the selection of the locations of the pages in the ACS. As shown in FIg. 1, the pages in the ACS need not be contiguous, and they need not be confined to 4K, 2K or any other boundaries. As will be discussed with reference to FIG. 3 below, the pages in the ACS can even overlap each other. It is because the starting address of each page in the ACS need not be on a 4K, 2K or any other boundary that reference must be made to the SMPM in order to translate an address M to an address M'. An example of this address translation is shown in FIG. 3.

The seven lowest 4K blocks of the computer address space are shown on the left side of the drawing. Blocks 4 and 5 are those contained in the mapping area in the selected example. Since there is always an even number of pages in the mapping area, the boundaries for the mapping area are always multiples of 4K, and once again only four bits are required to define each of the boundaries — the number of the first valid block in the mapping area and the number of the last valid block in the mapping area. The control word to be described below contains 4 bits which define the "map start" and another 4 bits which define the "map end" as depicted in FIG. 3. In the example selected, block numbers 4 and 5 are represented as the first and last valid bocks in the mapping area.

Referring back to FIG. 1, the SMPM contains 256 16-bit words. The words at the lowest addresses in the SMPM are map "pointers", there being one map ointer for each page in the mapping area. Consequently, at most 32 of the 256 words in the SMPM are map pointers. Whenever an address M is received, the system determines which of the pages in the mapping area contains the address. The respective pointer in the SMPM is then examined. (In FIG. 1, the $N_M$ pages in the mapping area are shown associated with $N_M$ mapping pointers at the bottom of the SMPM.) This pointer represents the starting address of the respective page in the ACS. It is because the pointer values in the SMPM can be arbitrarily set and subsequently modified that the starting address for any page in the ACS can assume any value. The difference between the starting address in the mapping area and the actual address M transmitted to the system is an eleven-bit offset and this offset is added to the starting address derived from the SMPM for the respective page in the ACS to derive the address M' of the location in the ACS which is accessed.

Figure 3:
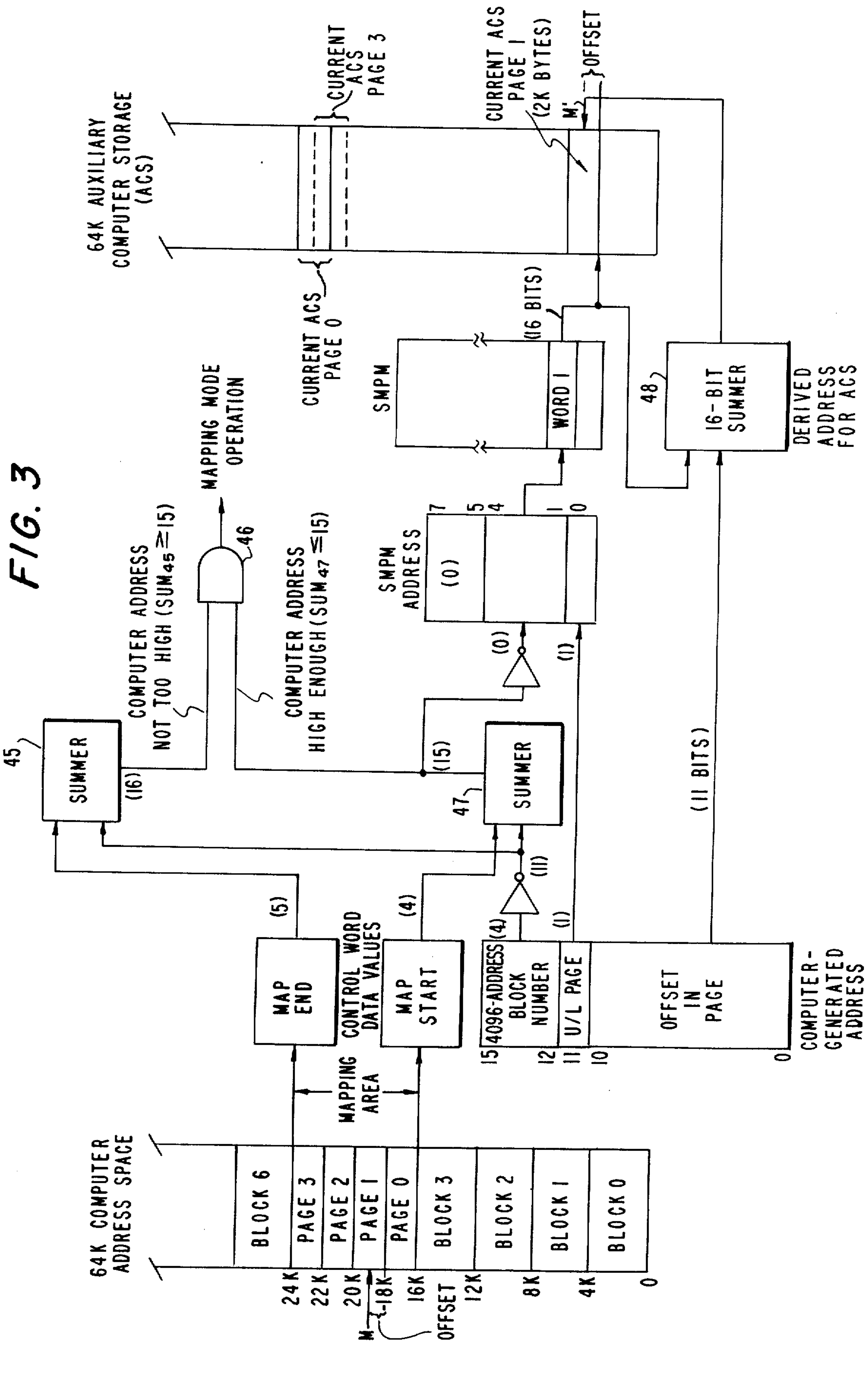
FIG. 3 depicts symbolically the operation of the system in the "mapping" mode.

Referring to FIG. 3, the 16-bit computer generated address consists of three parts. The four most significant bits 12–15 represent the block number of the address M. In the selected example, address M is contained in block 4 (which, in turn, consists of pages 0 and 1). Since each block consists of two pages, another bit, bit 11, in the computer-generated address is required to distinguish between the two pages in that block. A bit value of 0 for bit 11 represents the lower page of the two contained in the block, and a value of 1 represents the upper page. In the present case, since address M is contained in the upper page of block 4, bit 11 in the computer-generated address has a value of 1. The eleven lowest bits in the computer-generated address represent an offset — the difference between address M and the starting address of the respective page in the mapping area. Since each page in the mapping area has only 2K addresses, only eleven bits are required to represent the offset.

It must first be determined that address M falls within the mapping area. The technique for doing this is the same as that used to verify that a direct mode operation should take place. The 4-bit block number in the computer-generated address is first complemented and the complemented value is added to the last valid block number by summer 45. If the sum is greater than or equal to 15 (in this case, 16), it is an indication that the computer address is not too high and one input of gate 46 is enabled. The complemented block number is also added to the number of the first block in the mapping area by summer 47, and if the output (in this case, 15) is less than or equal to 15 it is an indication that the address M is high enough, that is, it is contained in the first valid block in the mapping area or one above it. In such a case the second input of gate 46 is also enabled, and the output of the gate goes high to indicate that an operation in the mapping mode should take place.

The output of summer 47 is complemented and the four complemented bits represent part of the 8-bit address which is required to access the SMPM. Since the map pointers are contained in locations with the lowest addresses in the SMPM, and since there can be at most 32 map pointers, it is apparent that the three most significant bits of the address used to access the SMPM when a mapping operation takes place must be 000. The four complemented bits from the output of summer 47 are used as bits 1–4 of the SMPM address. The least significant bit, bit 0, of the SMPM address is derived directly from bit 11 of the computer-generated address M.

In the example shown, the output of summer 47 is 1111 (decimal 15). When this value is complemented, bits 1–4 of the SMPM address assume the value 0000. Finally, since bit 11 in address M is 1, bit 0 in the SMPM address must be 1. Consequently, the SMPM address which is derived is 00000001 — to represent word 1 (the second word) in the SMPM which must be accessed.

In general, if $N_B$ represents the block number indicated by address bits 12–15, and $N_F$ represents the first map block number, then the output of summer 47 is $15-N_B+N_F$, and after this output is complemented bits 1–4 of the SMPM address represent $15-(15-N_B+N_F)$, or $N_B-N_F$. This is the relative map block number within the mapping area. By appending the U/L page bit to this 4-bit number, a 5-bit number is obtained for identifying up to 32 pages, that is, for identifying one of the 32 low-address locations in the SMPM.

The 2-bit SMPM word thus identified represents the starting address of page 1 in the ACS. This is depicted in FIG. 3 by the arrow extended to the starting address of ACS page 1. It should be noted that the term "current" is used to identify ACS page 1. The reason for this is that the location of each mapping page in the ACS is variable and it depends upon the starting address stored in the respective location in the SMPM. Whenever the starting address is changed the location of the respective ACS page changes. Accordingly, whenever the SMPM is accessed in the mapping mode, the 16-bit starting address represents the current, not permanent, starting address of page 1 in the ACS.

Of course, to derive the actual address M' which is used to access the ACS, the 11-bit offset must be added to the 16-bit starting address. This is accomplished by summer 48 which derives the actual address (M') used to access the ACS. (Although an arrow is shown extending from word 1 of the SMPM to the starting location of current ACS page 1 in FIG. 3, that arrow is symbolic only. The only use made of the 16-bit word read from the SMPM is to add it to the 11-bit offset in summer 48 to derive address M'.)

Two additional current ACS pages are shown in FIG. 3 — pages 0 and 3. They are shown as overlapping. That simply means that the starting address for page 0 which is stored in the SMPM is also contained within ACS page 3. That, in turn, means that some of addresses M which may be specified in pages 0 and 3 of the computer address space actually result in the accessing of the same storage locations in the ACS. It should be noted that mapping mode operations are indistinguishable from direct mode operations if the map pointers are never changed and if they refer to non-overlapping areas of the ACS.

The use of the mapping mode does not affect programming techniques or conventions. However, the programmer has the responsibility of making sure that the pointers are properly set for any mapping page computer address which may be used. One apparent use for the mapping mode is to place a series of programs sequentially in the ACS and run first one program and then another merely by changing a map pointer. IN other words, the transmission to the memory of our invention of the same sequence of addresses over and over again will gain access to different instruction sequences in the ACS if the map pointer for the same page in the computer address space is changed prior to the execution of each different program derived from the ACS. With many pages this technique may be expanded to maintain several programs and/or data areas directly accessible at any time. Also of importance is the fact that a set of data or instructions which requires fewer than 2K storage locations need not have an entire 2K-address page allocated to it. Because current pages in the ACS can overlap, and the starting address for a page may be anywhere, if two pages are made to overlap then one of the pages may be thought to be reduced in size, and it is in this reduced page that a data or instruction set smaller than 2K may be stored.

Mapping techniques in somewhat limited versions have been applied to some prior art CPU's. In general, these mapping techniques are not nearly as flexible as that of the invention, nor have the mapping operations actually taken place in the memory itself. Despite the advantages of the mapping technique of the invention, however, it is to be understood that mapping does not save computer address space. To gain access to N different locations in the ACS, it is still necessary to specify N addresses (each of these addresses having a different offset from the same page starting address) in the address space. The expansion of the effective memory for a limited address space is accomplished when the system is operated in the stacking mode as will be described below.

SMPM Mode

Referring to FIG. 1, the SMPM area, whose size is fixed at 512 addresses, is contained within 2K boundaries. In general, the SMPM area can comprise any quarter of the 2K address space which includes the four stacking areas (each having 512 addresses). The SMPM area itself is defined by 6 bits which represent its lower 1K boundary, and a hardware strap connection, to be described below, which represents whether the SMPM area comprises the lower or the upper half of the 1K address space above the lower boundary. The SMPM area always overlays one of the four stacking areas (in FIG. 1, the S-DC stacking area), and disables the respective stacking function.

Each address which is transmitted to the system and is contained in either the direct area or the mapping area results in the accessing of a storage location in the ACS. (In the mapping mode, the SMPM is first "consulted".) In the SMPM mode, however, the receipt of an address within the SMPM area results in the accessing of a storage location in the SMPM rather than the ACS; a word is read from the SMPM, or a word or byte is written into it. Although the SMPM contains only 256 words, as mentioned above, it is possible to access an individual byte in a word. It is for this reason that 512 addresses are required for the SMPM area in order to identify any one of the 512 bytes in the SMPM. As shown symbolically in FIG. 1, the SMPM area in the computer address space is associated with the entire SMPM (as opposed to the mapping area which is associated with at most 32 word locations in the SMPM). The receipt of an address SMPM in the address space is translated into an address SMPM' which gains access to the SMPM, as shown symbolically in FIG. 1.

The system can be operated in any one of three different stacking modes (the fourth is disabled depending on the quarter of the overall stacking area selected for the SMPM area). In each of these modes, the SMPM is examined at a specified word location to derive a 16-bit stack pointer, just as the SMPM is examined when the system is operated in the mapping mode to derive a 16-bit map pointer. The stack pointers represent storage locations in the ACS just as the map pointers represent page starting locations in the ACS. Junt as the map pointers in the SMPM may be changed, so the stack pointers in the SMPM may be changed. It is when the system is operated in the SMPM mode that new data can be written in or read from the SMPM.

When the system is operating in the direct mode or the mapping mode, the derived 16-bit address represents a word or lower byte location in the ACS (if the address is even), or the upper byte location of a word in the ACS (if the address is odd). During a read operation, as defined by the two bits on the control lines, a 16-bit word is read out of the ACS. During a write operation, as defined by the two bits on the control lines, a 16-bit word is written into the ACS (at the location whose even address is derived by the system), or a byte is written into the ACS (with a byte operation being defined by the control lines, and the upper or lower byte of the specified word being defined by the least significant bit in the derived address). When the system is operated in the SMPM mode, on the other hand, either a 16-bit word is read from the SMPM and applied to the data lines, or a word or byte on the data lines is written into the SMPM. The read/write operations performed in the SMPM are the same as those performed in the ACS. The SMPM can be thought of as an extension of the ACS which may be used as a small directly accessable memory and which may in addition perform the pointer functions associated with the mapping and stacking modes.

Since the primary function of the SMPM is to represent pointers, it might be thought that the only operations required in the SMPM mode would be to write 16-bit pointers. However, since the SMPM is a self-contained memory, it can be used for all possible read/write operations. Thus, in addition to writing 16-bit words in the SMPM, when the system is operated in the SMPM mode it is also possible to write an 8-bit byte or to read a 16-bit word. That portion of the SMPM which is not required for map or stack pointers may be used, for example, to contain a frequently used small program. In some cases, this will materially speed memory access and increase processing speed since the SMPM is a high-speed memory. (It is highspeed because in mapping and stacking operations, a pointer must be read from the SMPM and an address for accessing the ACS must be derived, in addition to performing the specified read or write function in the ACS — all within a single memory cycle. If speed is not important, the "SMPM" may actually be a 256-word section of the ACS.)

Figure 4:
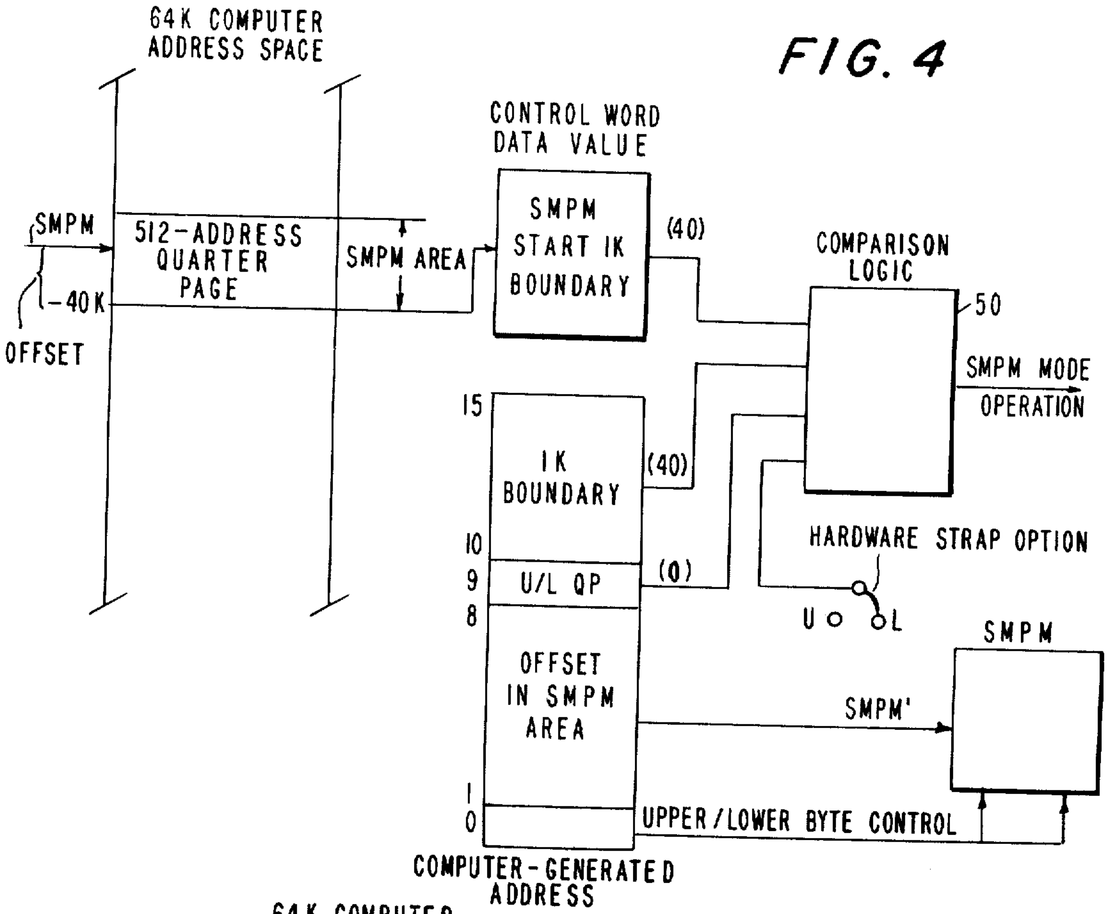
FIG. 4 depicts symbolically the operation of the system in the "SMPM" mode.

FIG. 4 depicts the manner in which an address SMPM in the SMPM area is translated into an address SMPM' for gaining access to the SMPM. As described above, the control word contains 6 bits which define a 1K boundary; the 512-address SMPM area is contained between this 1K boundary and the 1K boundary directly above it. (Since a page is 2K as shown on FIGS. 1 and 3, the SMPM area consists of a quarter-page.) The 1K lower boundary for the SMPM area is represented by the 6 most significant bits of the computer-generated address. In the example shown in FIG. 4, the lower boundary for the SMPM area is 40K. Comparison logic 50 compares the 6-bit lower boundary defined by the control word with the 6-bit boundary defined by the upper part of the computer-generated address to detect a match. If there is such a match, that is an indication that the system may have to be operated in the SMPM mode. But it will be recalled that the SMPM area may be in the upper or lower half of the IK address space defined by the lower boundary. A hardware strap option, represented symbolically in FIG. 4, defines whether the SMPM area is in the upper or lower half (quarter-page) of the 1K address space defined by the lower boundary. Bit 9 (U/L QP) of the computer-generated address is examined by comparison logic 50 to determine whether the computer-generated address is contained within the upper or lower half of the 1K address space defined by the hardware strap connection. The "lower" option corresponds to a bit value of 0 and the "upper" option corresponds to a bit value of 1. If the comparison logic verifies that the received address is in the correct half of the 1*K* address space corresponding to the SMPM start boundary, then the output of the comparison logic will indicate that the system should operate in the SMPM mode. (A third option will be described in the Detailed Description, but need not be understood for present purposes.)

Bits 1–8 in the computer-generated address define one of 256 word locations in the SMPM, and bit 0 defines one of the two bytes in that word, just as the least significant bit in any address used to access the ACS defines one of the two bytes in the word represented by the other 15 address bits. Whether a word is read from the SMPM and applied to the data lines, or whether a word or byte on the data lines is written into the SMPM, depends upon the states of the two control lines. If a write byte operation is to take place, then bit 0 in the computergenerated address can be either a 0 or a 1. If a word operation (read or write) is to be performed, then bit 0 in the computer-generated address is a 0.

Stacking Mode

The term "stacking" refers to accessing sequentially the contents of a series of storage locations in a memory buffer. There are both ascending and descending stack forms. In the former, a stack pointer may refer to the next-to-be-used location and be incremented automatically after each access. In a descending stack, the pointer may refer to the last-used location and be decremented before each access. In the prior art, stack manipulation has been accomplished within the central processor. In the memory of the invention, however, stacking is accomplished within the hardware of the memory. The significance of this is that a single address in the address space which is transmitted to the memory can control the accessing of words in a buffer of any size — even a buffer which comprises the full 64K capacity of the ACS.

The SMPM may contain up to 256 different stack pointers. Each address within the stacking area results in the accessing of a stack pointer. This stack pointer is used to access a particular location in the ACS — for reading or writing. The system can be operated in four different stacking modes. The differences between the modes relate to whether the stack pointer which is accessed in the SMPM is incremented or decremented, and when it is so incremented or decremented. Furthermore, for each of the three operative stacking modes, a word operation may be performed or a byte operation may be performed. The way in which the system is informed of the stacking mode in which it is to operate, and whether a word or byte operation is to take place, is controlled by transmitting six different addresses for identifying the same location in the SMPM. While all six addresses identify the same stack pointer in the SMPM, what is done with that stack pointer depends on the particular one of the six addresses which is received. It will also be recalled that each pair of addresses in the SMPM area accesses the same respective storage location in the SMPM (the low-order bit in the computer-generated address serving to identify the upper or lower byte in the case of a write operation. Consequently, there are actually eight different addresses which gain access to the same location in the SMPM. Just as the SMPM area in FIG. 1 is shown associated with the entire SMPM, so the stacking area is shown associated with the entire SMPM.

The overall SMPM and stacking area in the address space has a length of 2K and it is contained within 2K boundaries. In the example of FIG. 1, the lowest 512-address group within the 2K stacking area is the SMPM area (thereby disabling the S-DC function). Successive even and odd addresses within the SMPM area control an SMPM mode operation on the same location in the SMPM. Successive even and odd addresses in the S-I area control an access to the same location in the SMPM and cause the system to operate in the "automatic increment" mode. Similar remarks apply to successive even and odd address in each of the S-D and S-AC areas. The respective modes of operation are known as "automatic decrement" and "ascending stack check". (The disabled stacking mode in the example of FIG. 1 is referred to below as "descending stack check".) Depending on which of the two addresses in each of the four areas is specified (for the same access of the SMPM), a byte or a word operation takes place.

It is apparent that the eight different addresses which control access to the same SMPM location are identical in 13 bit positions. Two of the other three address bits define one of the four respective areas in the overall SMPM and stacking area so as to identify one of four modes in which the system should operate; the third bit controls either a byte operation or a word operation. The control word (to be described below) contains 6 bits which define a 1K boundary. (The SMPM area is in the upper or lower half of the 1K address space above this boundary depending on the strap connection). Only five bits are required to define a 2K boundary as the starting location of the overall 2K SMPM and stacking area. Accordingly, if the 1K boundary for the SMPM area which is defined by the 6 bits in the control word is even, that boundary is a multiple of 2K and the SMPM area is in the lower half of the overall 2*K* SMPM and stacking area. On the other hand, if the 1K boundary (which is also a 2K boundary) is identified as the start of the overall 2K SMPM and stacking area, and the SMPM area is in the upper half of the 2K address space.

In the usual case, the SMPM area is in the lower half of the overall 2K address space, and the hardware strap is connected to select the "lower" option. The reason for deviating from this practice will be described below, but for the moment it is assumed that the SMPM area starts at a 2K boundary.

The five most significant bits in the computer-generated address represent a 2K block and comparison logic 52 (FIG. 5) verifies whether this block contains the SMPM start 1K boundary by comparing the 5 upper bits in the 6-bit control word value to address bits 11-15. If the bits match, it is an indication that a stacking or SMPM mode operation should take place.

The two addresses within each of the 512-address groups in the SMPM and stacking area which are associated with the same storage location in the SMPM are separated by 512 addresses. Since bits 0–8 of the computer-generated address define one of 512 values, it is apparent that bits 9 and 10 of the address determine in which of the four quarters of the stacking area the address defined by the other 14 bits is contained. Since only 8 bits are required to represent one of the SMPM word locations, bits 1–8 are used to define a word address for the SMPM. Successive even and odd addresses within each of the four areas in the overall SMPM and stacking area have identical bits in positions 1–8 and consequently successive addresses control access to the same SMPM location. The low-order bit in the computer-generated address is used to define whether a word or byte operation takes place. A 0 represents a word operation and a 1 represents a byte operation.

Figure 5:
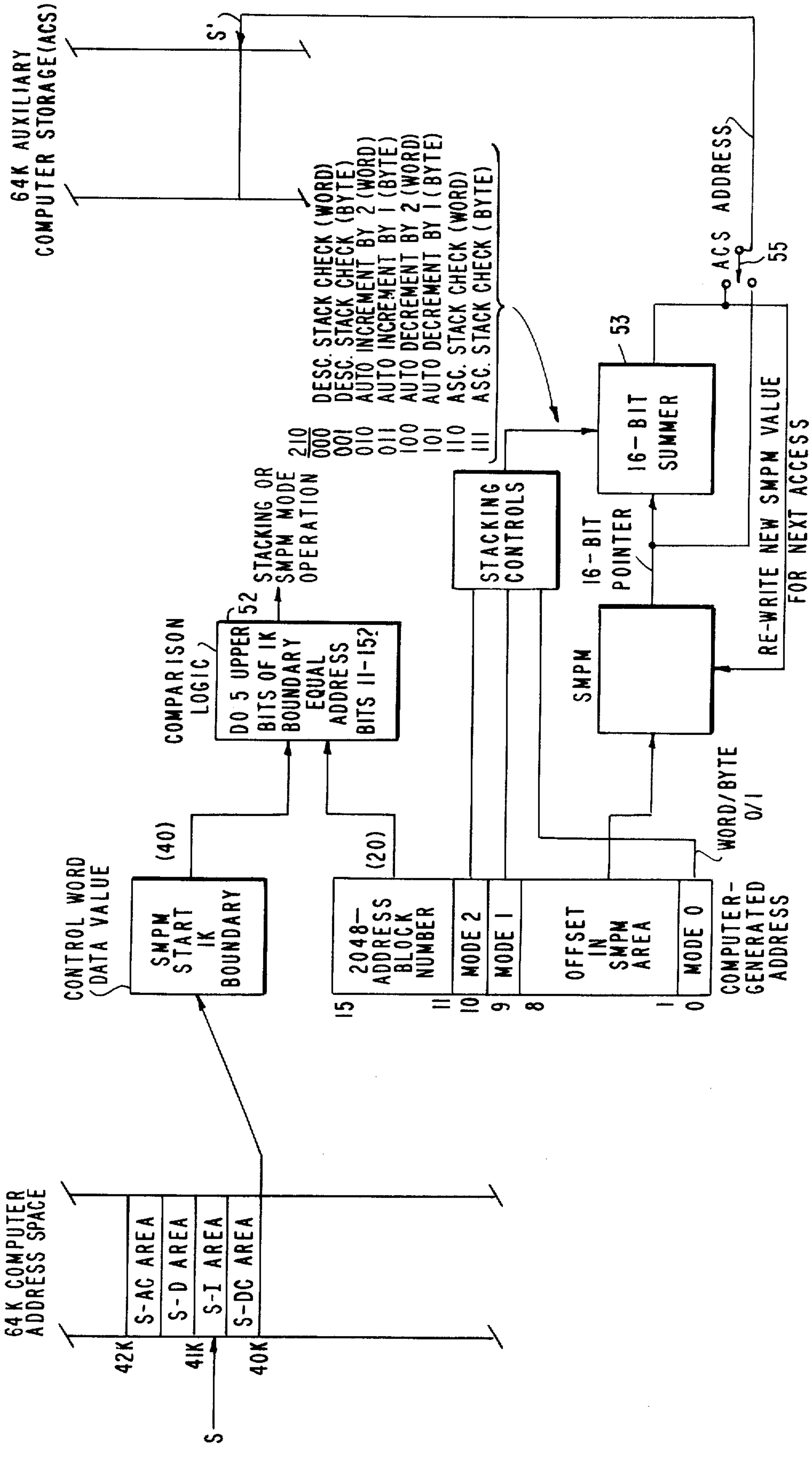
FIG. 5 depicts symbolically the operation of the system in the four "stacking" modes.
Figure 7:
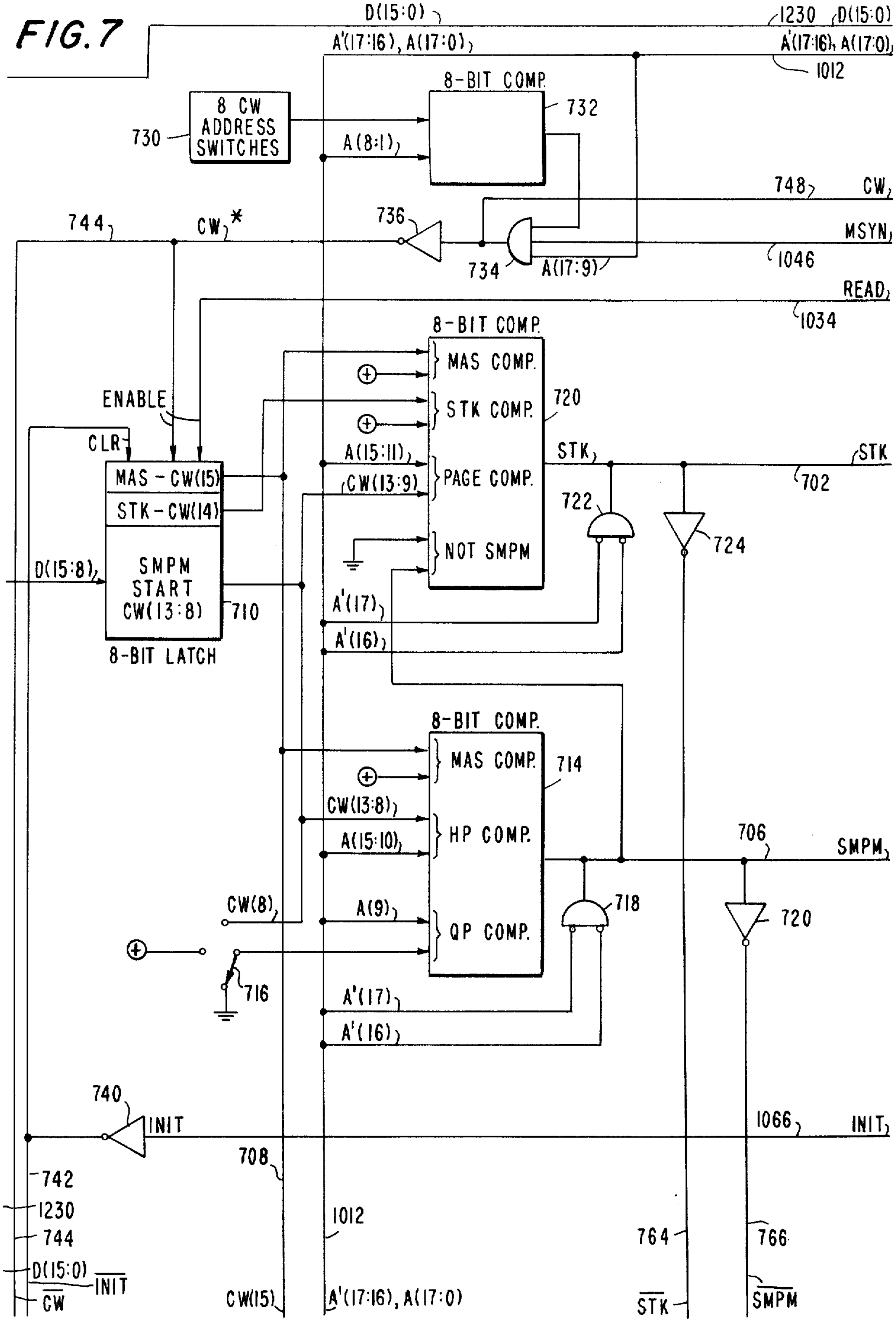
FIGS. 7–13 depict the illustrative embodiment of the invention, with the figures being arranged as shown in FIG. 14.

Bits 0, 9 and 10 of the computer-generated address are extended to logic circuits represented in FIG. 5 by the notation "stacking controls". The word which is read from the SMPM is extended to one input of 16-bit summer 53. The stacking control logic can control the pointer retrieved from the SMPM to be incremented or decremented, by a value of 1 or 2. The stacking control logic also causes the modified pointer to be re-written in the SMPM at the same location from which the original pointer was read. The 16-bit pointer (in some cases modified, and in others not) which is retrieved from the SMPM is the ACS address which is used when the system is operated in one of the three operative stacking modes. Switch 55 is symbolic only and is intended to show that the ACS address can be derived directly from the SMPM (efore being modified) or from the summer after the SMPM pointer value is modified, depending on the particular stacking mode in which the system is operated.

If the three "mode" bits 2, 1 and 0 (address bits 10, 9 and 0) in the computer-generated address represent a 000 or 001 code, then the system operates in the SMPM mode (because in the selected example the SMPM area overlays the S-DC area), and a word is read out of the SMPM and extended on the data lines, or a word or byte on the data lines is written in the SMPM. In such a case, summer 53 does not operate nor does any operation take place in the ACS. It is only when the three mode bits represent one of the other six combinations that summer 53 is used at all and a word is written into or read out of the ACS. Depending on which of the three stacking functions occurs, as will be described in more detail below, a pointer read out of the SMPM may be extended to the ACS either before or after it is changed by the summer and re-written in the SMPM.

FIG. 1 depicts symbolically the manner in which locations in two ACS buffers A and B (of different lengths) are accessed when an operation is performed in one of the four stacking modes. There is no predetermined number of buffer areas nor does a buffer area have a predetermined size. Each stack pointer in the SMPM simply identifies one of the 64K bytes in the ACS. Whenever an address transmitted to the system falls within one of the four stacking areas, the respective word in the SMPM is read and operated upon in accordance with the three mode bits in the received address. The word read from the SMPM may be modified and re-stored in the SMPM, and it may be modified before or after the word is used as an address to access the ACS. But as a stack pointer in the SMPM is continuously incremented or decremented, all that happens is thast the ACS word or byte which is identified by each stack pointer keeps changing and it is in this way that successive characters in a long message can be stored in sequence in the ACS even though the same address is continuously furnished to the system. The successive characters can be stored in a single buffer, and the size of the buffer simply depends on how many times the ACS is accessed. A buffer can begin anywhere in the ACS depending upon the value of the respective stack pointer when it is first placed in the SMPM(while the system is operated in the SMPM mode). The stack pointers are completely independent of each other and the map pointers. The stack pointers can refer to independent, overlapping or identical buffer areas within the ACS.

Figure 6:
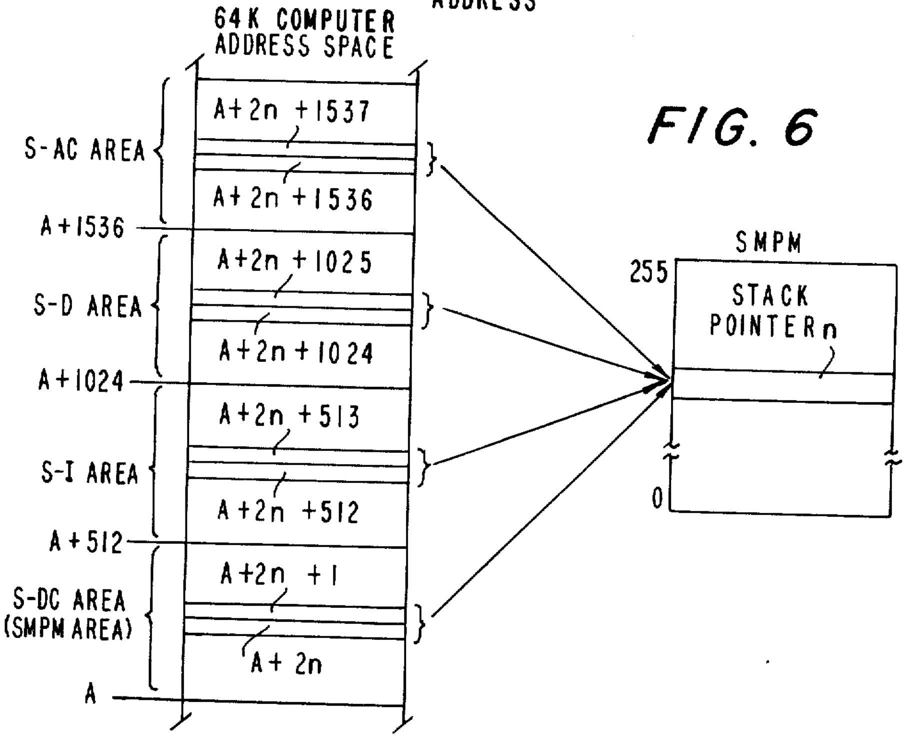
FIG. 6 depicts, in expanded form, the eight addresses in the overall SMPM and stacking area of the address space which are associated with each stack pointer in the stack and map pointer memory.

FIG. 6 depicts the four stacking areas within the 64K computer address space, with the SMPM area taking precedence over the S-DC area. This figure will be helpful in understanding the manner in which each location of the SMPM is accessed by 8 different addresses in the overall 2K SMPM and stacking area of the computer address space, as well as the functions which are performed in the four modes. It will be recalled that in the usual case, the SMPM area is directly above a 2K boundary. Thus address A depicted in FIG. 6 is a multiple of 2K. Each of the SMPM, S-I, S-D and S-AC areas shown in FIG. 6 comprises 512 addresses. The SMPM is shown as having 256 locations, one of which is shown as containing stack pointer $n$. Two of the 512 addresses in each of the four areas identify the same storage location $n$ in the SMPM. Addresses $A+2n$ and $A+2n+1$ in the SMPM area control in access to storage location $n$ ($0 \leq n \leq 255$) in the SMPM, and the other pairs of addresses in the other three areas which control an access to the same stack pointer n are separated from each other by 512 addresses.

Referring back to FIG. 5, bits 11–15 in the computer-generated address identify the 2K block which contains the SMPM and stacking areas. Thus bits 11–15 identify address A in FIG. 6. Bits 1–8 define an offset from a 512 address boundary, and bits 9–10 identify the 4 pairs of addresses corresponding to the 4 stacking modes shown in FIG. 6. Bit 0 of the computer-generated address identifies either the lower or the upper of the two addresses in each area. Bits 9 and 10 define one of four modes (corresponding to one of the four areas), and bit 0 of the address represents either a word or a byte operation.

Ordinarily, when bits 9 and 10 are both 0, an operation in the S-DC mode takes place. However, in the selected example, an operation in the SMPM mode takes place since the SMPM area is made to overlay the S-DC area. In such a case, the transmission to the system of either address $A+2n$ or $A+2n+1$ controls the reading of a word from the SMPM and its application to the 16 data lines or the writing of a word or byte which is on the 16 data lines in the SMPM. In the case of a write byte operation, bit 0 in the computer-generated address identifies either the upper or lower byte at location $n$ of the SMPM. Address $A+2n$ controls an access to the entire SMPM word in the case of a write word operation or to the lower byte in the case of a write byte operation. Address $A+2n+1$ controls the writing of 8 bits in the upper byte of word n of the SMPM in the case of a write byte operation.

When either of the two addresses in the S-I area which are shown in FIG. 6 is specified, the system operates in the automatic increment stacking mode. In such a case, stack pointer n is used to directly access the ACS. The pointer is then incremented and re-stored in the SMPM. But the pointer can be incremented by either 1 or 2, and which increment is used depends on which of the addresses $A+2n+512$ or $A+2n+513$ is specified. The ACS contains 8-bit storage locations. If a location in the ACS with an odd address is specified, then a byte operation is required. On the other hand, if a location having an even address is identified, then either a word or a byte operation may take place (depending on the control line signals). When data are being stored in or read out of a buffer, this is accomplished with either successive word or successive byte operations. In other words, successive bytes are accessed (in which case successive ACS addresses differ by 1), or successive words are accessed (in which case successive ACS addresses differ by 2). In the automatic increment stacking mode, when an even address such as $A+2n+512$ is extended to the system, after the ACS location identified by the stack pointer is accessed, the pointer is incremented by 2 so that when the same address is next transmitted the next word in the ACS will be accessed. An even address in the S-I area is transmitted to the system whenever an ascending word stack is required. On the other hand, when an odd address is transmitted to the sytem, the stack pointer in the SMPM is incremented by 1; the next time the same address is received by the system it will be the next byte in the ACS which will be operated upon. Thus odd addresses in the S-I area control ascending byte stacks and even addresses control ascending word stacks.

Mode bits 2 and 1 (address bits 10 and 9) in FIG. 5 locate an address in the S-I area, to the exclusion of the other three areas shown in FIG. 6, when a 01 code is represented. As shown in FIG. 5 in the code table adjacent to the "stacking controls", when mode bits 2 and 1 represent a 01 code, the system operates in the automatic increment (S-I) stacking mode. If mode bit 0 is a 0, then the stack pointer is incremented by 2 (to control an ascending word stack) after the ACS is accessed, and if mode bit 0 is a 1, then the stack pointer is incremented by 1 (to control an ascending byte stack) after the ACS is accessed.

It is thus apparent that successive words or bytes which are applied by a CPU to the data lines can be stored in up to 32K successive word locations or 64K successive byte locations without changing the address which appears on the address lines.

When mode bits 2 and 1 (address bits 10 and 9) represent the code 10, any address in the overall 2K stacking area necessarily is contained in the S-D area. When an address in this area is specified (provided it is not overlaid by the SMPM area), the system operates in the automatic decrement (S-D) stacking mode. The operations are similar to those in the automatic increment stacking mode except that the stack pointer in the SMPM is decremented rather than incremented and it is the modified value which is used in the ACS access. If an even address such as $A+2n+1024$ is specified, stack pointer $n$ is first decremented by 2 and the decremented value is used to access a word in the ACS. The decremented pointer is stored back in the SMPM. If an odd address such as $A+2n+1025$ is specified, then the stack pointer is decremented by 1 and thereafter a byte is the ACS is accessed and the decremented pointer value is stored back in the SMPM. The two codes for the automatic decrement stacking mode are shown in FIG. 5, with the value of the mode 0 bit once again controlling operations on either word stacks or byte stacks.

In the case of an ascending stack, the pointer read from the SMPM is used to access the ACS prior to its being incremented. Thus, referring to FIG. 5, the pointer read from the SMPM serves as the ACS address. (Switch 55 should be thought of as being in the lower position.) The pointer also passes through summer 53, where it is incremented by 1 or 2 and then it is re-written back in the SMPM. In the case of a descending stack, the pointer read from the SMPM is decremented prior to the accessing of the ACS. Thus, the pointer read from the SMPM is first applied to an input of the summer in which it is decremented by 1 or 2, and it is then re-written in the SMPM, and used to access the ACS. (Switch 55 should be thought of as being in the upper position.)

The automatic increment mode is used for reading or writing an ascending stack, or for reading a descending stack in reverse order. Similarly, the automatic decrement mode is used for reading or writing a descending stack, or for reading an ascending stack in reverse order. In either case, a sequential series of items may be inserted or removed, in either byte or word form, from a buffer or arbitrary length. Only eight addresses in the computer address space are "used up" for each stack. Up to 256 stacks may be active at any one time in a single system, and a total of 64K bytes may be accessed while "using up" only 2K program addresses. The "gain" is thus a factor of 32. By connecting up to 32 memories of the invention on the same bus system, with a different 2K area of the overall 64K address space being allocated to the SMPM and stacking areas in each system, a maximum of 64K times 32, or 2 megabytes, may be accessed.

When mode bits 2 and 1 represent a 11 code, an address otherwise in the overall 2K stacking area falls within the S-AC area. What happens in this mode is that the identified stack pointer is decremented and the decremented value is then used to access the ACS; the original pointer value, however, remains in the SMPM at the end of the operation. Once again, the value of mode bit 0 determines whether a byte stack or a work stack operation is performed. If mode bit 0 is a 0, the pointer value is decremented by 2 and then used to access the ACS. If the mode bit is a 1, the pointer value is decremented by 1 and then used to access a byte in the ACS. What an operation in the ascending stack check (S-AC) mode permits is an access to the most recent entry in an ascending word or byte stack, following which the stack may be controlled to continue to ascend by specifying addresses within the S-I area. In this way, the most recent entry in an ascending stack may be accessed without the respective pointer having a value at the end of the operation which is different from its value at the beginning of the operation.

When the SMPM area overlays one of the S-I, S-D or S-AC areas, rather than the S-DC area as in the selected example, then when mode bits 2 and 1 represent a 00 code, an address otherwise within the overall 2K stacking area falls within the S-DC area. In such a case, the identified stack pointer in the SMPM is not changed and is used to access the ACS. (The value of mode bit 0 again determines whether a byte stack or a word stack operation is performed.) Since the stack pointer for a descending stack always points to the last ACS location which was accessed, operation of the system in the descending stack check mode permits an access to the last location which was accessed without changing the pointer value.

The use of the stacking modes is highly advantageous when operations must be performed or sequential characters in a message. There are times, however, that access to a word or byte which is not at the top of an ascending stack, or the bottom of a descending stack, may be required. To gain access to a word or byte in the middle of a stack by operating the system in a stacking mode, the respective pointer value must be incremented or decremented continuously and this may require many memory cycles depending on how far the desired item is from the end of a stack. However, in those cases where immediate access to any word or byte in a stack is desired, a map pointer may be set to point to the respective buffer. In that way, any item of data can be accessed in a single memory cycle by operating the system in the mapping mode.

When programming a computer which operates in conjunction with the memory of our invention, it must be remembered that inserting or removing a string of items from a stack requires the use of only a single computer address. This is to be contrasted with conventional systems which require programming for controlling the decrementing or incrementing of a computer address before or after each memory access. By providing hardware functions in the memory of our invention, not only is there a savings in computer address space, but programs need not be written to control the incrementing or decrementing of memory addresses prior to or after each access. To form an ascending stack it is only necessary to initially set word location n in the SMPM with the address of the first location in the ACS buffer which is to be used. This is accomplished by operating the system in the SMPM mode, and transmitting an address $A+2n$ to the system at the same time that the value of the pointer is applied to the data lines. With the system operated in the SMPM mode in this manner, the stack pointer value is stored in word location $n$ of the SMPM. Items may then be accessed sequentially in ascending order by utilizing the same $A+2n+512$ or $As2n+513$ address for word and byte stacks respectively. Each access results in incrementing the pointer by 2 or 1 respectively. Items may then be accessed in reverse order once the buffer exists by utilizing the same $A+2n+1024$ or $A+2n+1025$ address. In the case of an ascending stack, the stack pointer always points to the next location to be used. A descending stack may be created in a similar manner by utilizing the same $A+2n+1024$ or $A+2n+1025$ address. In this case, a stack pointer always refers to the last-used location. Accessing a descending stack in reverse order may be accomplished by switching to the $A+2n+512$ or $A+2n+513$ address.

Since it is often desirable to provide a capability to access the most recent entry in an ascending or descending stack without permanently modifying a pointer, the system is designed to also operate in the ascending stack check mode and the descending stack check mode. Since these modes are usually less important than the other two, in the usual case the SMPM area is made to overlay one of the check areas, in which case one of the two least important functions is lost.

When programming a computer with which the memory of our invention is used, in the usual case different locations in the SMPM should be used to store stack and map pointers; the two types of pointers represent different information. Thus, if there are 6 map pointers, for example, the lowest 12 addresses in each stacking area should not be used to access buffers in the ACS. If they are, then each time a buffer is accessed and its respective stack pointer is changed, the starting location for one of the ACS map pages will be changed and the system will not operate properly in the mapping mode unless the computer software takes this into account.

As will be described below, it is possible to disable the system from operating in the stacking modes. (The control word includes one bit for selectively disabling all stacking functions if necessary.) But the SMPM mode is not disabled by the stacking bit in the control word. The system must be capable of operating in this mode if it is also to operate in the mapping mode; otherwise there is no way to write map pointers in the SMPM.

The overall SMPM and stacking area is always contained within 2K boundaries. In the usual case, the SMPM area comprises the lowest or highest quarter of the overall 2K address space. With reference to FIG. 4, it will be apparent that with the SMPM area in the lowest quarter of the stacking area, the six bits in the control word which define the 1K boundary, above which the SMPM area is located, will represent a 2K boundary, bit 10 in the computer-generated address will always be a 0 when the system is to be operated in the SMPM mode, and bit 9 will also be a 0 to correspond to the "lower" strap option. In this way, a 00 code in bit positions 9 and 10 of the computer-generated address represents an SMPM operation, and when the system is to be operated in one of the three operative stacking modes (FIG. 5) the code comprises one of the combinations 01, 10 or 11.

The mode bit codes 00, 01, 10 and 11 in bit positions 9 and 10 in a computer-generated address always define the four stacking areas shown in FIG. 5. Thus in every system, the same set of 512 addresses represent both SMPM operations and operations in one of the four stacking modes. The system gives priority to the SMPM mode, and the overlaid one of the for stacking mode capabilities is necessarily always lost. (With respect to priorities, it should also be apparent that the various areas depicted in FIG. 1 in the address space may overlap if they are so selected. Since an address which is recognized by the system as falling within one of the predetermined address space areas necessarily controls a particular type of operation, a sequence of priorities is necessary to resolve all conflicts. The priority sequence is in the following order: control mode, SMPM mode, stacking mode, mapping mode, direct mode.)

Suppose that up to four systems of the invention are to be used together and it is desired to define the same overall 2K SMPM and stacking area for all systems. (If more than four systems — up to the maximum number of 32 — are connected to the same bus system, then different 2K SMPM and stacking areas in the address space must be selected for them.) In such a case, in order to localize an operation in the SMPM mode to only one of the four systems, the SMPM area must be in a different quarter of the overall 2K SMPM and stacking area in each system. It is for this reason that 6 bits in the control word for each system are used to define a 1K boundary and that the strap option is provided to select the upper or lower half of the 1K space above this boundary — bits 9 and 10 in the computer-generated address can thus identify any one of four SMPM areas within the same overall 2K SMPM and stacking area. Each system would be set up (via its respective control word and its respective strap option) to recognize an SMPM address within a different one of the four 512-address groups in the common 2K address area.

However, it will be apparent that the stacking modes for all systems whose SMPM areas are contained within the same 2K address space must be disabled. Otherwise, one system will operate in the SMPM mode while the other systems would all operate in one of the stacking modes — and all would use the same data lines. This cannot be permitted. Thus, if at least two memories have their SMPM areas within the same 2K stacking area address space, then the stacking modes in these memories must be disabled.

Control Mode

As shown in FIG. 1, the system responds to a single address, somewhere within the upper 512 addresses of the 64K computer address space, to operate in the control mode. The system includes eight switches for defining the control word address. The address of the control word is assumed to have a 0 in the least significant bit position and a 1 in each of the seven most significant bit positions. The eight switches define the values of the other eight bits which determine the control word address. When the system recognizes the control word address, the 16-bit word which is applied by the CPU to the data lines is stored in a special set of 16 storage elements. This 16-bit control word remains stored in the system until it is changed, and it defines operations in the other modes.

Bit 15 of the control word is a master on/off bit for all modes except the direct and control modes. If the MAS bit is a 0, then the system can only be operated in the direct and control modes. By adjusting the two sets of four switches each which define the boundaries for the direct area to 0000 and 1111, the direct area will assume a maximum size of sixteen 4096-address blocks. Thus the ACS can be used to almost its maximum capacity and the system can function as a conventional memory. (The ACS cannot be used to full capacity because the control word mode cannot be disabled and it takes priority over the direct mode in the case of a conflict.) The control mode is not disabled when the MAS bit is set to a 0 for the simple reason that were this mode disabled, there would be no way to change the control word and the system would be restricted permanently to operate only in the direct mode after the restriction is first imposed.

Bit 14 in the control word, if a 0, disables the stacking modes. If the STK bit is a 0, all three stacking functions are disabled. The reasons for disabling the stacking modes have been described above.

Bits 8–13 of the control word are required for defining the SMPM area. These six bits define a 1K boundary. The SMPM area consists of either of the two 512-address blocks directly above this boundasry. In other words, the SMPM area is in either the upper or lower half of the 1K address space which is directly above the address defined by bits 8–13 in the control word. The upper or lower half of this 1K space for the SMPM area is determined by the strap connection. Bits 8–13 in the control word actually define the stacking areas as well as the SMPM area. If the 1K boundary represented by bits 8–13 is an even number, then the overall 2K address space for the SMPM and stacking areas starts at this address. On the other hand, if the 1K boundary represented by the 6 bits is odd, then the overall SMPM and stacking area starts at the next lower 2K boundary.

Bits 0–3 of the control word define the numer of the first valid block in the mapping area, and bits 4–7 define the number of the last valid block in the mapping area. The map start and map end block numbers in the control word serve the same functions for the mapping area as the two sets of four switches serve for the direct area; they define upper and lower bounds. (Although in the illustrative embodiment of the invention the boundaries for the direct area are controlled by switches, it will be apparent that another control mode could be provided for defining the direct area bounds under software control, just as the mapping area is defined under software control. Similarly, hardware switches could be provided to define bounds for the mapping area and the SMPM and stacking areas. In the usual case, however, the direct area boundaries are changed much less frequently than the others and it is for this reason that hardware switches are provided for the direct area boundaries; the control word does not have enough bits in it to define all boundaries and thus the boundaries which are changed the most infrequently are set up by hardware switches.)

As will be described below, when the system is first turned on the storage elements for the control word are reset so that the system can operate in only the direct and control modes. If any of the other modes are desired, then the computer should execute an initialization program for operating the system in the control mode so that computer address space can be allocated for the mapping and/or stacking functions.

Whenever the control word address is recognized, a 16-bit control word on the data lines extended to the system is written in the 16 special storage elements provided for representing the control word. However, the system does not provide for the reading of the control word (in a manner comparable to that in which any word stored in the SMPM can be read when the system is operated in the SMPM mode). This is of no moment, however, because the control word can be stored elsewhere for access by the computer (e.g., even in a location of the ACS contained in one of the direct blocks).

DETAILED DESCRIPTION

Overall System Configuration and Timing

The illustrative embodiment of our invention is a memory for operating with the PDP-11 computer systems marketed by Digital Equipment Corporation. As is well known in the art, such a system includes a UNIBUS bus to which a central processor and all peripheral equipments are connected. Address, data and control information are transmitted along the 56 lines of the bus. Connections need not be made to all of the lines of the bus when our invention is practiced, and accordingly only the required connections are shown in the drawing.

The auxiliary memory (ACS) itself can be any of many memories designed for connection to a UNIBUS. In order to control the unique memory operations contemplated by our invention, the UNIBUS to which the ACS is connected is not the UNIBUS to which the processor is connected. This is depicted most clearly in FIGS. 7–13, the figures being arranged as shown in FIG. 14. At the bottom of FIGS. 10 and 12 various lines are extended to the PDP-11 UNIBUS. All signals to and from the processor are transmitted over these lines. At the right side of FIG. 13 there is shown a 64K auxiliary memory 1300 connected to various address, data and control lines. These lines comprise a UNIBUS which is completely internal to the overall memory of our invention. It is circuitry on FIGS. 7–13 that convert control, address and data signals on the PDP-11 UNIBUS to respective signals on the internal UNIBUS for extension to the auxiliary storage, and vice versa. In this manner, any conventional memory adapted to be interfaced to a UNIBUS can be used as the 64K auxiliary storage at the right side of FIG. 13; no changes need be made in it because it is connected directly to control, data and address lines which function as do those in a conventional UNIBUS. Similarly, while the processor does not communicate directly with the auxiliary storage, it does not "know" this because it simply transmits and receives the usual control, address and data signals over the PDP-11 UNIBUS.

Although not shown in the drawing, it is to be understood that all bus lines are provided with pull-up resistors returned to a high potential. It is in this way that open-collector bus drivers can be used, as is the standard practice. Also, the outputs of several elements in FIGS. 7–13 are shown tied together in wire-OR or wire-AND configurations. These include the junctions of the following element groups: 814 and 816; 836 and 838; 714 and 718; 720 and 722; 1219 and 1220; and 904, 906, 908 and 910. In each of these cases, although not shown in the drawing, it is to be understood that the junctions are returned through pull-up resistors to positive potential sources, and that the driving elements are of the open-collector type.

Figure 12:
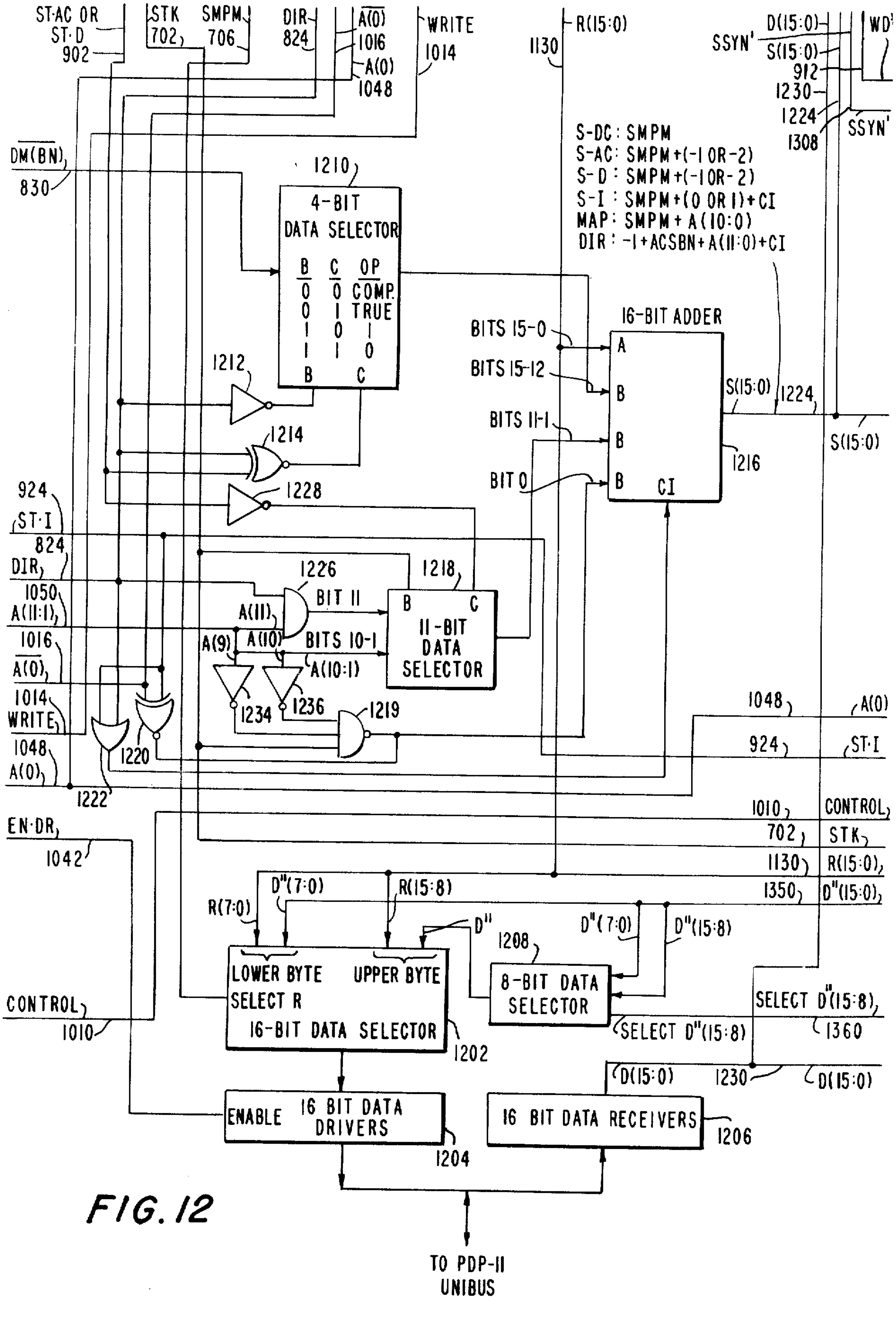

Before proceding with a descriptiion of the detailed circuitry, it will be helpful to review the signal sequences which are transmitted over a UNIBUS whenever a conventional memory is accessed. FIG. 12 depicts 16 bit data drivers 1204 and 16 bit data receivers 1206 connected to the 16 data lines in a conventional UNIBUS. Two-way transmission over each data line permits a respective driver and receiver to be connected to the same line. The 16-bit data selector 1202 extends 16 bit signals to the 16 inputs of data drivers 1204. When the ENABLE inputs of the 16 bit data drivers are energized, the drivers transmit the 16 bit signals extended to them over the UNIBUS data lines. Similarly, data from a processor appearing on the 16 data lines are received by the 16 bit data receivers 1206 and applied to the 16 lines in the D(15:0) cable 1230 which are extended to various parts of the system of our invention.

Figure 10:
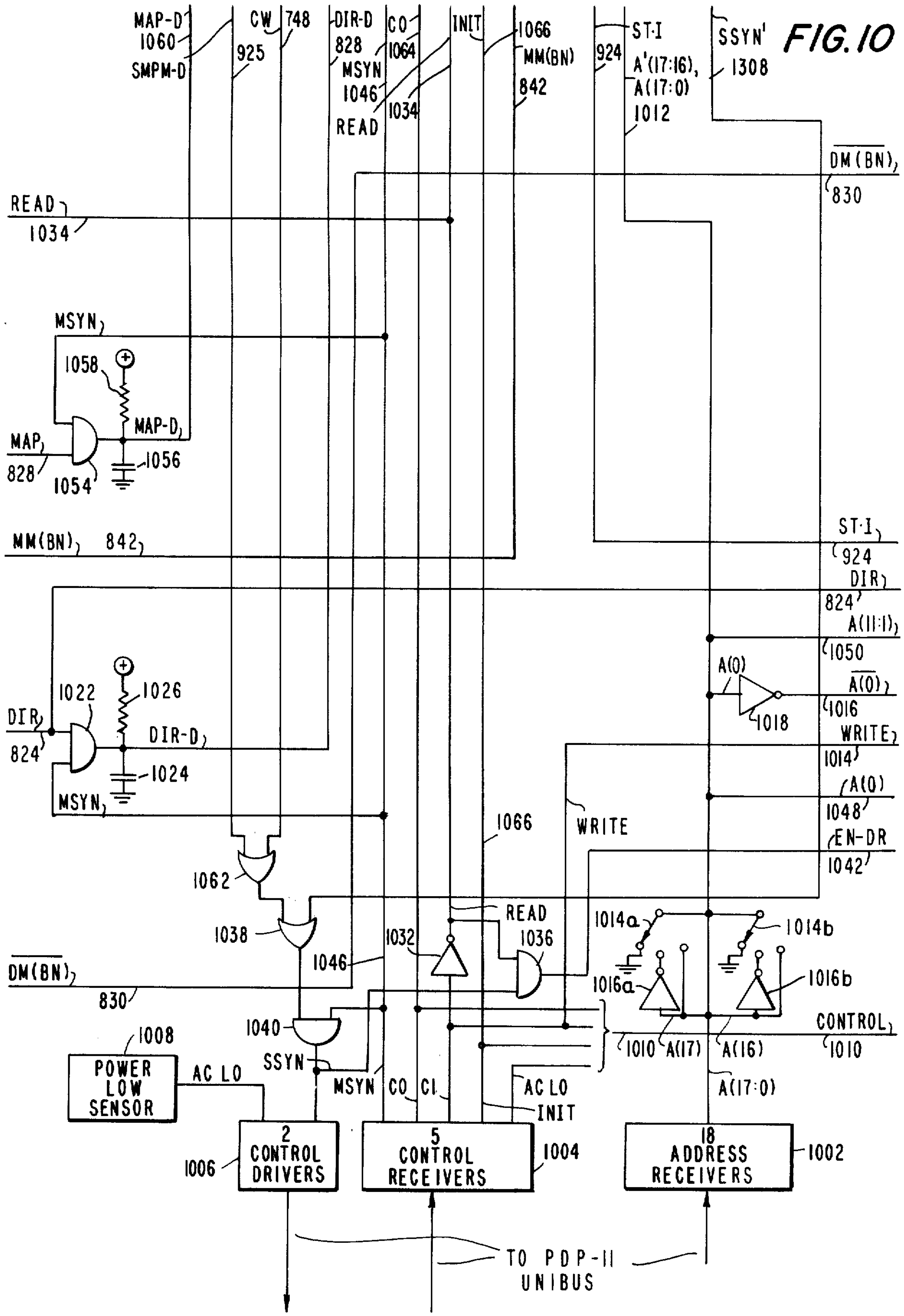
Figure 11:
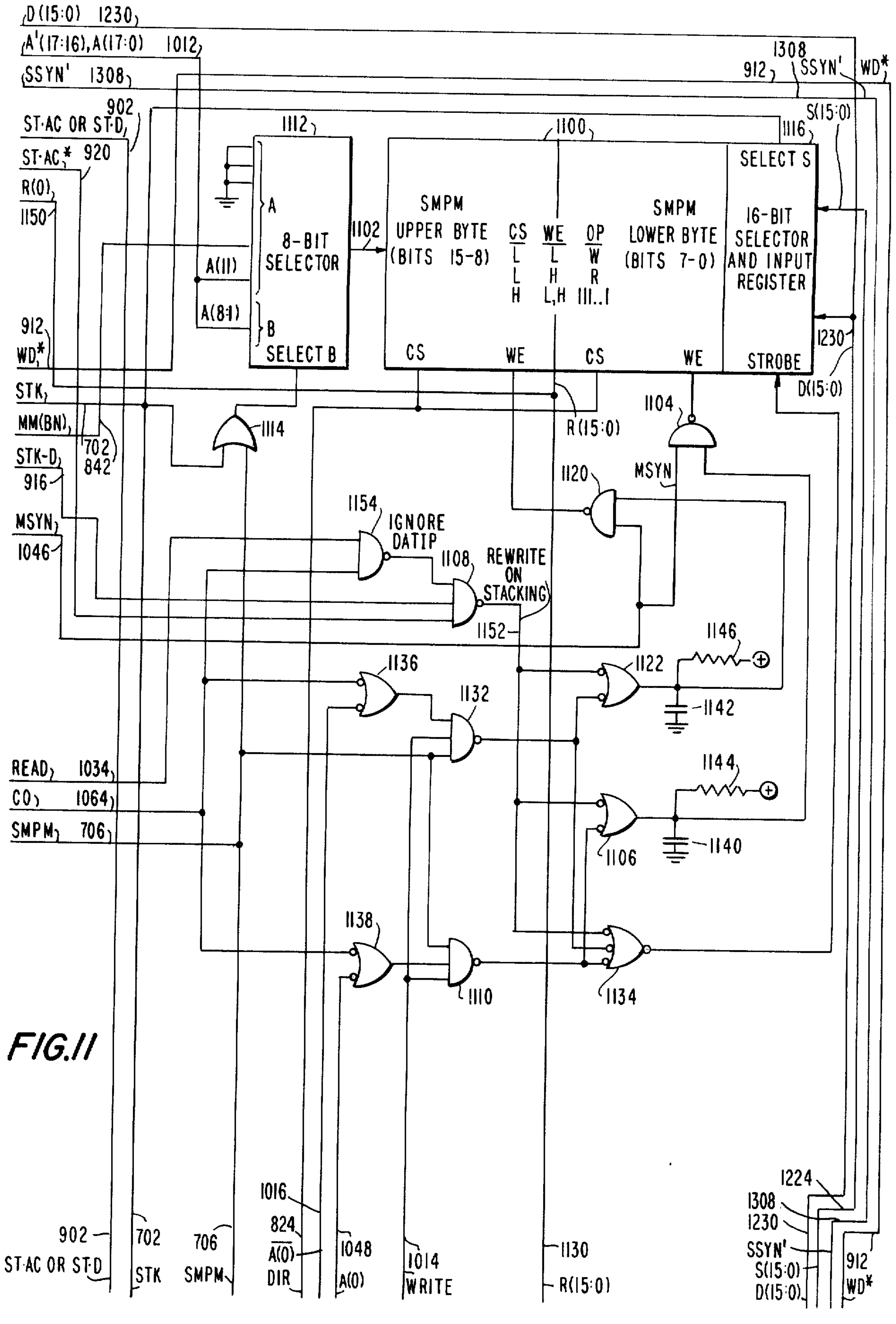

As shown on FIG. 10, 18 address lines are extended to address receivers 1002. An 18-bit address which is extended over the UNIBUS to the various peripheral equipments is detected by the address receivers and the 18 bits are applied to cable A(17:0). Although only 16 address bits are used to access the auxiliary memory and the SMPM, the PDP-11 family of computers is provided with an 18-bit address capability. The two upper bits, A(17) and A(16), are "extension" bits which allow the addressing capability to be increased by a factor of 4. The manner in which the two upper bits are used will be explained below, but it is to be understood that address bits A(15:0) correspond to the 16 address bits referred to above in the General Description.

Five control lines in the PDP-11 UNIBUS are extended to five control receivers 1004. The INIT signal is asserted when the start key on the computer console is depressed, when a reset instruction is executed or when a power up sequence occurs. The INIT signal is usually used to clear and initialize peripheral devices by means of the RESET instruction, and the INIT signal does just that in the present system. The AC LO signal is used in peripheral devices to terminate operations in preparation for a power loss. The AC LO signal, as will become apparent below, is extended to the auxiliary memory through drivers 1302; the auxiliary memory can thus respond to the AC LO signal just as it does when the memory is connected directly to the computer UNIBUS. (The INIT signal is also extended to the auxiliary memory through drivers 1302 so that the memory can operate on such a signal just as it does when the memory is connected directly to the processor UNIBUS. Similar remarks apply to the two other control signals C0 and C1 as will be described below.)

The C0 and C1 signals determine the type of operation which takes place. When C1 is a 0 a read operation takes place, and when C1 is a 1 a write operation takes place. On a write operation, a bit value of 0 for C0 represents a word operation and a bit value of 1 for C0 represents a byte operation. The C0 bit represents something else in the case of a read sequence; as is known is the art, if C0 is a 1 it inhibits the restore cycle in destructive read-out devices. The C0 and C1 bits control their usual sequences in the auxiliary memory. But the same bit signals are also used by the circuitry of FIGS. 7–13 to control the translation of address and data signals between the PDP-11 UNIBUS and the internal UNIBUS.

The MSYN control signal which is received by any peripheral device on a UNIBUS is used in conjunction with the SSYN "answer" signal which is transmitted back by that device to the UNIBUS in a manner which will be described shortly. Two control drivers 1006 are shown on FIG. 10 for extending two control signals from the memory of our invention to the PDP-11 UNIBUS. One of the signals which is thus transmitted is the SSYN signal, the generation of which will be described below. The other is an AC LO signal which is transmitted by some peripheral devices to indicate a loss of power. The power supply for the system (not shown) can be provided with a "power low" sensor shown only symbolically by the numeral 1008 for detecting the start of power loss. In such a case, an AC LO signal can be transmitted to the UNIBUS (at which time it will be received by the processor and other peripheral units just as an AC LO signal is received by the system of our invention). The detection of a loss of power is not part of the present invention and accordingly the power low sensor is shown only symbolically. In fact, it can be omitted. The only control lines which are shown are those required for the proper operation of the system. For example, the well-known parity bit lines PA and PB are omitted. Similarly, the several priority transfer lines in a UNIBUS are omitted. If it is desired that the auxiliary memory which is used as block 1300 have any additional control line connections, then the control lines can be extended from the PDP-11 UNIBUS to the internal UNIBUS for extension to the auxiliary memory through receivers and drivers comparable to elements 1004 and 1302.

In the case of a read operation on a conventional memory, the processor causes the MSYN ("master sync") line to go low (the assertion state on a UNIBUS) approximately 150 nanoseconds after address and control signals are applied to the address and control lines. Any memory which is interfaced to the UNIBUS and recognizes the transmitted address then interprets the C0 and C1 control bits as representing a read operation, and applies the 16 bits of the word which is read to the 16 data lines. At the same time, the memory causes its SSYN ("slave sync") line to go low. After the processor (master) recognizes the SSYN signal and the data bits, it causes the MYSN line to restore (to the upper level), following which the address bits are removed from the address lines. When the memory (slave) recognizes the end of the MSYN assertion state, it restores the SSYN line and ceases to apply data to the data lines.

A similar sequence takes place in the case of a write operation in a conventional memory. The master first transmits address, data and control bits, following which the MSYN control line is caused to go low. The memory performs a write operation following which it causes its SSYN line to go low. When this is recognized by the master as an indication that the write operation has been completed the master causes the MSYN line to go high, and the address, control and data signals to be removed from the UNIBUS. When the slave recognizes that the MSYN line has gone high, that is, that the master has been properly informed that the write operation has been completed, the slave causes its SSYN line to go high.

Four of the control signals — AC LO, INIT, C0 and C1 — are extended directly over CONTROL cable 1010 to four control drivers 1302. When these drivers are enabled, as will be described below, the four control signals are extended over the CONTROL' cable 1304 to 64K memory 1300. The control drivers are enabled only after the control circuitry verifies that a memory operation is to take place. The four control signals are interpreted by the ACS just as they are when the ACS is connected directly to the four respective control lines in a conventional UNIBUS configuration.

The MSYN control signal which is received from the processor is not extended directly to the auxiliary memory. Instead, it is operated upon as will be described below and an equivalent signal MSYN' is extended over conductor 1306 to the auxiliary memory. The auxiliary memory executes the "usual" read or write operation and applies its usual slave sync signal to the SSYN' conductor 1362 in the internal UNIBUS. This slave sync signal, as will be described below, is used to generate the SSYN signal for extension to the processor; the SSYN signal must be generated since the processor "thinks" that it is operating on a conventional memory. In other words, the circuitry of our invention must furnish an MSYN' signal to the auxiliary memory to initiate a memory operation, and it must operate upon an SSYN' signal from the memory to generate a SSYN signal for the processor to inform it that the required operation has been completed. (As will become apparent below, the SSYN signal to the processor can be generated in an alternate fashion as well, since in the control word and SMPM sequences the auxiliary memory is not even involved in the operation and accordingly does not generate a SSYN' signal.)

Since the auxiliary memory is designed to transmit and receive 16-bit data words over 16 data lines, the internal UNIBUS includes a cable D'(15:0) containing 16 data lines. When the ENABLE inputs of the 16 bit data drivers 1310 are energized, the 16 data bits on the D(15:0) cable 1230 which originate on the PDP-11 UNIBUS are extended to the ACS 1300 over cable D'(15:0). The 16 bit data drivers 1310 are enabled whenever a word or a byte is to be written into the auxiliary memory; all that is required is to extend the data bits from the PDP-11 UNIBUS to the memory. Similarly, when a read operation takes place the auxiliary memory applies data bits to the conductors in cable D'(15:0). The data bits are extended through 16 bit data receivers 1312 to the D''(15:0) cable 1350. As will be described below, eight of the data bits pass through 8-bit data selector 1208 where they can be switched from one group of lines to another. But for present purposes it is sufficient to understand that the data bits on cable D''(15:0) are transmitted through 16-bit data selector 1202 to the 16 bit data drivers 1204 at which time they are applied to the data lines in the PDP-11 UNIBUS.

The last group of signal lines which are extended to the auxiliary memory are the 16 address lines in the A'(15:0) cable. The corresponding address lines in the PDP-11 UNIBUS are not extended directly to the lines on which addresses are transmitted to the auxiliary memory. This must be the case since, as described at length above, an important aspect of the present invention is the modification of an address received by the overall memory prior to the application of an address to the auxiliary storage itself. As far as the auxiliary storage itself is concerned, however, it is totally unaware that the received address was not derived directly from the PDP-11 UNIBUS. As far as the auxiliary memory is concerned, it operates as though it were connected to the PDP-11 UNIBUS. Similarly, all other peripheral units, as well as the processor, which operate in conjunction with the memory of our invention and are connected to PDP-11 UNIBUS operate just as though the auxiliary memory were connected directly to their bus system.

All data, address and control drivers shown in the drawing are made of chip Nos. SN7438. All data, address and control receivers are made of chip Nos. SP-380. The number of chips used in each case is a function of the number of bits to be handled. All drivers and receivers invert signals between their inputs and outputs. Thus on both the PDP-11 and the internal UNIBUS, a 1 or an assertion state is represented by a low potential. But on the other conductors in FIGS.

7-13, a 1 or an assertion state is represented by a high potential. (The only exceptions are those conductors whose letter designations are followed by an asterisk; their assertion levels are low.)

Addresses which are received from the data processor are extended through the 18 address receivers 1002 to an 18-conductor cable A(17:0). The two most significant address bits represent one of four possible codes. These two bits are treated differently from the 16 other bits which actually represent an address within the 64K computer address space depicted on FIG. 1. Cable 1012, which is extended to various parts of the system, includes 20 conductors which carry 20 address bits — the 18 original address bits A(17:0) and two additional address bits A'(17:16). For all modes other than the control word mode, the system is designed to recognize an address only if address bits A'(17;16), derived from address bits A(17:16), represent 00. But the computer itself may be programmed to identify the memory of our invention with any one of the four codes 00, 01, 10 or 11 for address extension bits A(17:16). To allow this programming flexibility, address bits A(17) and A(16) are operated upon to derive two other address bits A'(17) and A'(16) which are both 0 only when the two-bit A(17:16) code which identifies a proper "quadrant" is transmitted on the address lines. Toward this end, switches 1014*a* and 1014*b*, and inverters 1016*a* and 1016*b*, are provided.

With the switches in the positions shown, both of conductors A'(17) and A'(16) are low, and they represent a 00 code. No matter what values for address bits A(17) are A(16) are transmitted by the processor, the system can recognize addresses within the functional areas depicted on FIG. 1; there is no discrimination as to which quadrant contains the addresses and the two most significant address bits A(17:16) are effectively ignored, except in the control word mode as will be described below.

On the other hand, suppose that it is desired to have the system respond only to addresses in the highest quadrant, that is, addresses for which address bits A(17) and A(16) represent a 11 code. In such a case, both of the switches 1014*a* and 1014*b* are connected to the outputs of respective inverters 1016*a* and 1016*b*. It is only when a 11 "quadrant" code is received that 0's will appear on address lines A'(17) and A'(16) within the system so that addresses can be recognized.

Each switch can also be connected directly to a respective one of conductors A(17) or A(16). Suppose, for example, that the system should recognize only addresses for which the two most significant bits represent a 10 code. In such a case, switch 1014*a* should be connected to the output of inverter 1016*a* and switch 1014*b* should be connected to its rightmost position which couples conductor A'(16) directly to conductor A(16). In such a case, it is only when a 10 code is received over the UNIBUS that conductors A'(17:16) will represent a 00 code to enable the system operation.

As will be described below, an operation in the stacking, mapping, SMPM or direct mode is initiated only if address bits A(15:0) represent an address within the respective functional area of the computer address space, and even then only if address bits A'(17:16) represent a 00 code. It is the position of switches 1014*a* and 1014*b* that allow address recognition to be restricted to any one of four quadrants if that is desired. But a control word operation takes place only if address bits A(17:16) represent a 11 code, as will be described below. The upper 4K addresses in the upper quadrant are used as hardware addresses in a PDP-11 system. The latches which store the control word and which will be described below are "hardware" of the type usually specified by addresses in the upper 4K of the upper quadrant. Accordingly, address bits A(17:16) are required to verify that an operation is to take place in the control word mode; the control word address is always in the upper 512 addresses of the fourth quadrant.

Direct Mode Sequence

Figure 8:
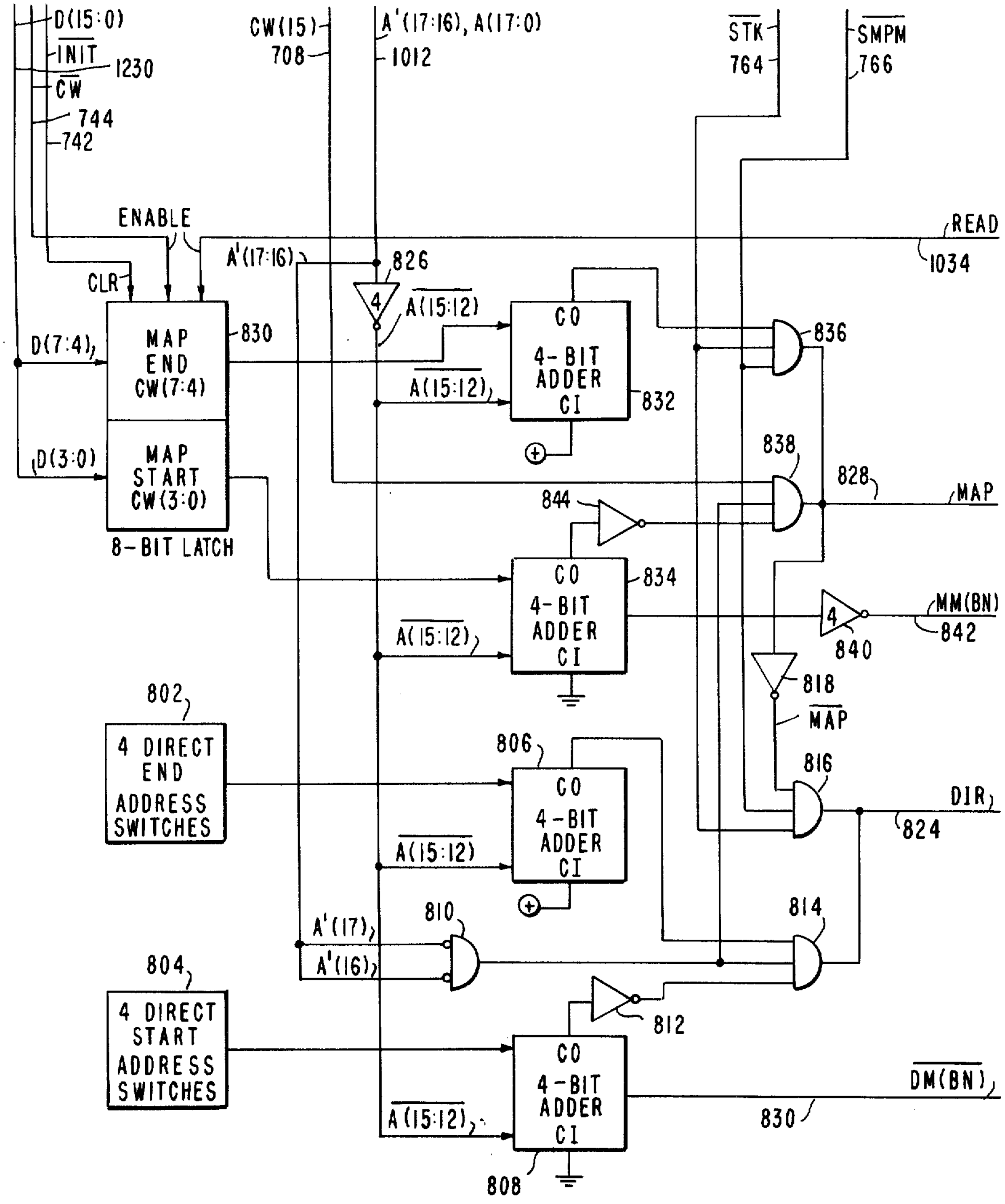
Figure 9:
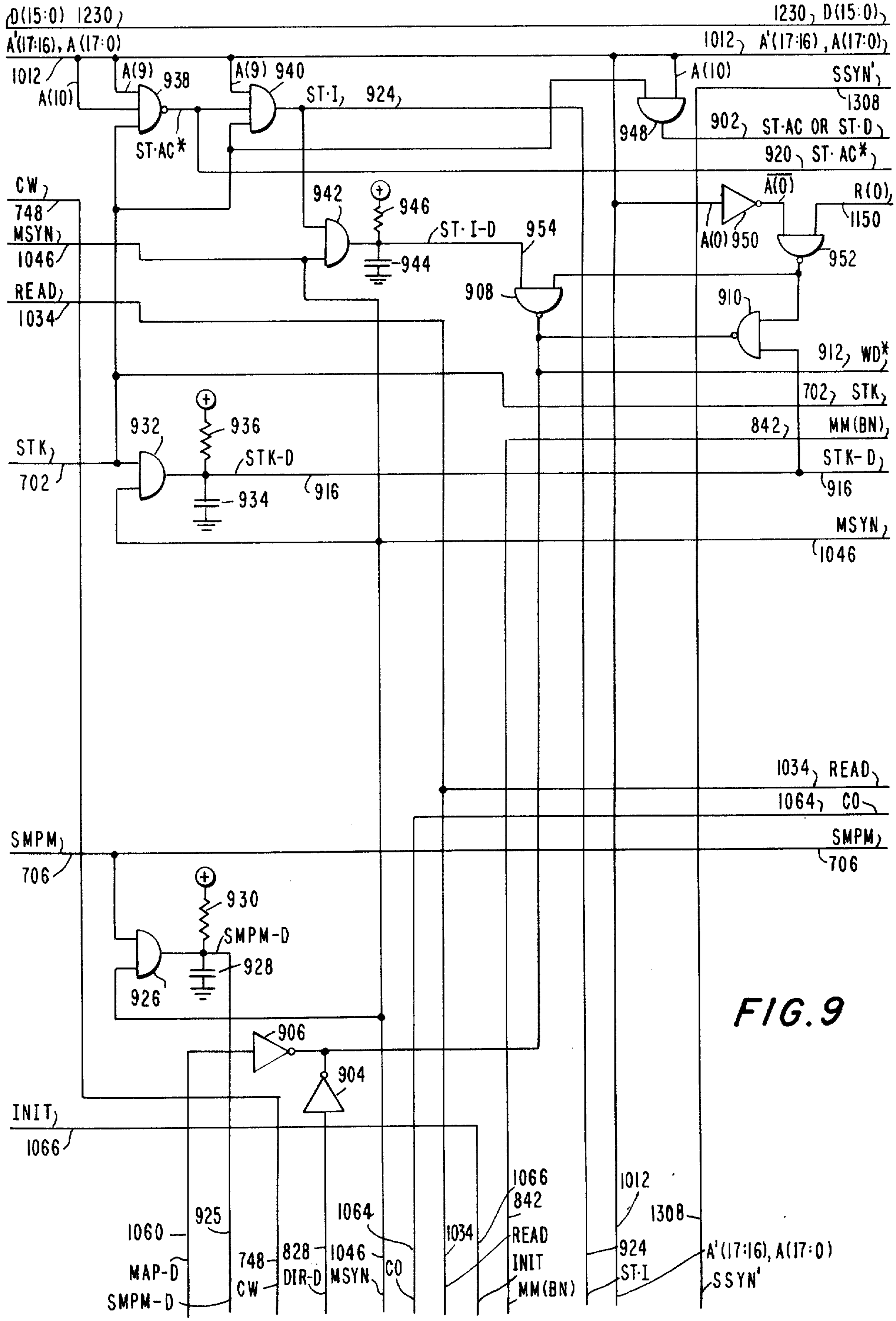

The 20 address conductors in cable 1012 are extended to the circuitry at the bottom of FIG. 8 which functions to determine whether a received address is within the direct area. Four switches symbolized by the numeral 804 are provided to represent the first valid block number in the direct area. The four address bits are extended to a first of two four-bit inputs of adder 808 (chip No. SN74283). Four inverters 826 are provided for complementing address bits A(15:12), and the four complemented address bits are extended to the second 4-bit input of adder 808. Referring to FIG. 2, it will be recalled that address bits 15:12 of each computer-generated address represent the block number, and the complemented block number must be added to the first valid block number as indicated by summer 42 in FIG 2. Adder 808 in FIG. 8 corresponds to summer 42 in FIG. 2. If the output of summer 42 is equal to or less than 15, then as indicated in FIG. 2, the computer address is high enough, that is, it is contained either within the first block or a block above it in the direct area. If the computer address is high enough and the sum derived by adder 808 is equal to or less than 15, then the carry output (CO) of the adder will represent a 0. (The carry input (CI) of the adder is connected to a low level since there is no reason to provide a carry input to the adder.) If the carry output of the adder is low, then inverter 812 applies a high level potential to one input of AND gate 814 to indicate that the computer address is high enough.

Referring once again to FIG. 2, it will be noted that summer 40 adds the block number of the last valid block in the direct area to the complemented bits which represent the block number in the computer-generated address. This function is accomplished by adder 806 (chip No. SN74283) on FIG. 8. The four switches symbolized by numeral 802 represent the 4-bit block number of the last valid block in the direct area, and these four switches are extended to a first 4-bit input of adder 806. The complemented address bits A(15:12) are extended to the other input of the adder. If the computer address is low enough, then as indicated on FIG. 2 the addition of the last valid block number to the complemented value of the block number in the computer-generated address should be greater than or equal to 15. A convenient way to test for this condition is to apply an "artificial" carry input to adder 806 by connecting its CI input to a high level. If the sum of the last valid block number and the complemented block number in the computer-generated address is greater than or equal to 15, then the output of adder 806 will be greater than or equal to 16. This, in turn, implies that a carry is generated by the adder and that its CO output goes high. Since this output is connected to a second input of gate 814, this input is energized if the computer address is not too high.

With the upper and lower inputs of gate 814 energized it is an indication that the received address is contained within a block number which in turn is contained within the direct area. But prior to an operation in the direct mode, the system must verify that the received address is contained within the proper quadrant. As described above in connection with switches 1014*a* and 1014*b*, and inverters 1016*a* and 1016*b*, the received address is within a proper quadrant only if address bits A'(17) and A'(16) represent a 00 code. These two address bits are extended to inverting inputs of gate 810, and the output of this gate goes high only if the two address bits represent a 00 code. Since the output of gate 810 is connected to the third input of gate 814, it is apparent that the output of gate 814 goes high whenever the received address is contained in a proper quadrant of the 256K expanded address space as well as in the direct area of the 64K computer address space to which the system responds.

The output of gate 814 is tied to the DIR conductor 824. It is when this conductor goes high that the system operates in the direct mode. In order for the conductor to go high gate 814 must operate after the received address has been verified to be within the direct area. But it will be recalled that the direct mode of operation is of the lowest priority. In the event that the various areas of the computer-address space overlap and a particular address is contained within two or more of the areas, in each case the system operates in the mode of highest priority. An operation in the direct mode which would otherwise take place is disabled if the system also determines that an operation in the stacking, mapping or SMPM mode should occur. It is gate 816 on FIG. 8, whose output is also tied to DIR conductor 824, that prevents the DIR conductor from going high if the system determines that an operation in one of the three other modes of higher priority should take place. The $\overline{\text{STK}}$ conductor 764 is ordinarily high; it goes low only when a stacking operation is required as will be described below. Similarly, the $\overline{\text{SMPM}}$ conductor 766 is ordinarily high; this conductor goes low only when an operation in the SMPM mode is called for. Finally, the MAP conductor 828 on FIG. 8 is ordinarily low and goes high only when an operation in the mapping mode is required. Inverter 818 functions to apply a normally high potential to the $\overline{\text{MAP}}$ conductor, and this conductor goes low only when an operation takes place in the mapping mode. The three conductors — $\overline{\text{STK}}$, $\overline{\text{SMPM}}$ and $\overline{\text{MAP}}$ — are extended to the three inputs of gate 816. If all three conductors are high, indicating that an operation is not required in any one of the three respective modes, then the output of gate 816 does not pull down conductor 824. Consequently, when the normally low inputs of gate 814 go high, the potential on the DIR conductor 824 goes high to signal an operation in the direct mode.

Referring back to FIG. 2, it will be recalled that the complemented output of summer 42 is the block number in the auxiliary computer storage which must be accessed. Since adder 808 in FIG. 8 corresponds to summer 42 on FIG. 2, the 4-bit output of the adder on cable 830 represents the complement of the block number in the ACS which contains the address to be accessed. Accordingly, conductor 830 in FIG. 8 is labeled $\overline{\text{DM(BN)}}$ to represent the complemented value of the block number in the direct mode.

This 4-bit value is extended to the 4-bit input of data selector 1210 on FIG. 12. The data selector has two control inputs B and C, and a 4-bit output corresponding to the 4-bit input. The codes shown within the block representing the data selector depict the operations which are performed on the 4 input bits in accordance with the code represented by control signals at the B and C inputs. If the control code is 00, then as indicated in the table within the data selector each of the four input bits is complemented prior to its appearance at a respective one of the four outputs. Similarly, a 01 code results in the direct transmission of the four input bits to the four outputs. A 10 code causes all of the output bits to be 1's no matter what the value of the input bits, and a 11 code causes all four outputs to be 0's no matter what the value of the input bits. Referring back to FIG. 2, it will be apparent that to derive the ACS block number from the output of summer 42 (which appears on the $\overline{\text{DM(BN)}}$ conductor), it is necessary to operate data selector 1210 in the complementing mode (corresponding to the function of the inverters depicted at the output of summer 42 on FIG. 2). For an operation in this mode, both of the B and C inputs of the data selector must be low.

The DIR conductor is connected through inverter 1212 to the B input of the data selector. Consequently, when the system is operated in the direct mode and the DIR conductor goes high, the B input of the data selector goes low. The DIR conductor is also extended to one input of gate 1214. The other input to this gate is connected to the ST·AC OR ST·D conductor 902. This conductor goes high, as will be described below, when certain stacking operations are to be performed. When the system is operated in the direct mode, the conductor is low. Consequently, one input of gate 1214 is low and the other is high when the system is operated in the direct mode. Since the output of the gate is inverted, it is apparent that the output is low when the system is operated in the direct mode. And with both input C and input B of data selector 1210 low, each of the four input bits is complemented, as required.

Referring to FIG. 2, it will be recalled that the address for the ACS is actually derived by combining the ACS block number with the 12-bit offset in the computer-generated address. This is accomplished by adder 1216 on FIG. 12. The adder is provided with two sets of 16-bit inputs. The 16 inputs of set A are connected to the 16 conductors in the R(15:0) cable 1130. Whenever a word is read from the SMPM, as will be described below, 16 bits are applied to the conductors in this cable. But when the system is operated in the direct mode, the SMPM is not consulted and each of its outputs (the inputs of set A of adder 1216) is at a high potential (representing a 1). (The SMPM can cause its outputs to go low during a read operation only if the chip select — CS — control inputs are low. Since these inputs are connected to the DIR conductor which is high during an operation in the direct mode, as indicated by the code within the SMPM block, the SMPM output consists of 16 1's. This will be described in greater detail shortly.)

Input set B of adder 1216 is divided into three groupings. The first group, containing bits 15–12, has inputs connected to the outputs of data selector 1210. Consequently, the ACS block number is extended to the four most significant inputs of set B of adder 1216. The 11 outputs of 11-bit data selector 1218 are extended to bit inputs 11-1 of adder 1216. As will be described shortly, the 11 bits extended from data selector 1218 to adder 1216 represent the offset in the computer-generated address. Finally, bit 0 of the 16-bit input set B of adder 1216 is connected to the output of gate 1219. One of the inputs to this gate is connected to the STK conductor 702. Since this conductor goes high only when a stacking operation is to take place, when the system is operated in the direct mode the STK input of gate 1219 is low. With one input of the gate low, the output of gate 1219 is high. But the bit 0 input of set B of adder 1216 is also connected to the output of gate 1220. One input of this gate is connected to ST·I conductor 924 which only goes high when a particular stacking function is to occur as will be described below. When the system is operated in the direct mode, this conductor is low. The other input of gate 1220 is connected to the A(0) conductor 1016. The A(0) bit is derived by inverter 1018 from thhe A(0) bit received by the system. With the ST·I conductor always low when the system is operated in the direct mode, the inverted output of gate 1220 is always the complement of its A(0) input, that is, the output of the gate is always the value of the A(0) bit. Since gate 1219 in the direct mode does not affect the bit 0 input of set B of adder 1216, it is apparent that the value of the bit applied to the adder depends on the operation of gate 1220, and the bit represents address bit A(0). Consequently, since data selector 1218 operates to apply address bits A(11:1) to bit inputs 11-1 of input set B of adder 1216, and gate 1220 functions to apply the value of address bit A(0) to the bit 0 input of set B, it is apparent that the 12-bit offset appears at bit inputs 11-0 of set B of the adder while the ACS block number appears at inputs 15-12 of set B of the adder.

The bit values represented at the 16 inputs of set B of adder 1216 are all that are required to derive the ACS address which is to be accessed. However, adder 1216 is used in other modes, and it is provided with a set of 16 A inputs as well as a carry input (CI). Those inputs must be taken into account even when the system is operated in the direct mode. When the system is operated in this mode, the carry input (CI) is always high, as are all of the A inputs. The effect of adding a value of 111 . . . 1 at the A inputs to the other bit values applied to the adder B inputs is to subtract 1 from the sum. (In binary arithmetic, the addition of 111 . . . 1 to a binary value is equivalent to subtracting 1 from it.) The artificial generation of a carry input counterbalances the substraction of 1 from the sum so that the net effect of the summer operation is to add the ACS block number to the 12-bit offset in the computer-generated address. This is indicated by the code shown adjacent to the adder on FIG. 12. When the system is operated in the direct mode, the sum is formed by subtracting 1, adding the ACS block number, adding the 12-bit offset, and adding a carry. The output of the adder is a 16-bit address on the S(15:0) cable 1224 which represents the address in the ACS which is to be accessed.

The carry input is generated by OR gate 1222, one of whose inputs is connected directly to DIR conductor 824. The value 111 . . . 1 is forced on the 16 conductors in the R(15:0) cable 1130 by causing the SMPM to apply bit values of 1 to all 16 of its outputs. The SMPM consists of two 256 8-bit bytes of storage. Each of the upper and lower byte halves has two inputs — CS and WE. As indicated in the center of the SMPM block 1100, a different operation takes place depending on the value of the control signals CS and WE applied to each half of the SMPM. If both inputs are low, a write operation ensues; if the CS input is low while the WE input is high, a read operation ensues; and if the CS input is high, then no matter what the WE input is all of the output conductors are forced to high levels. Since the DIR conductor 824 is coupled directly to the CS input of each half of the SMPM, and this conductor is high when the system is operated in the direct mode, the SMPM causes all 16 of its outputs to go high. (The symbol CS represents "chip select" and the symbol "WE" represents "write enable.")

The 16-bit address on the S(15:0) cable 1224 represents the address in the ACS which is to be accessed. This 16-conductor cable is extended to the S input of 16-bit data selector and register 1316 on FIG. 13. As will be described below, another set of 16 conductors is extended to the 16 inputs in the R set of the data selector and register. Either set of 16 inputs can be selected to have its bit values stored and extended to the 16 outputs in cable 1318 depending upon whether or not the SELECT R input is energized; if the SELECT R input is high, the R input is selected. Otherwise, the S input is selected. Since the SELECT R input is connected to the ST·I conductor 924, which conductor is low when the system is operated in the direct mode, it is apparent that the S inputs are selected for storage and extension to the 16 conductors in cable 1318. When address drivers 1344 are enabled, as will be described below, the address stored in register 1316 is extended to the ACS. Consequently, when the system is operated in the direct mode, the 16-bit address which is extended to the ACS over the internal UNIBUS address lines is derived by adding the ACS block number to the 12-bit offset in the computer generated address.

Thus far it was assumed that inputs 11-1 of the B set of adder 1216 have applied to them address bits A(11:1) in the computer-generated address. This is accomplished by 11-bit data selector 1218 on FIG. 12. The operation codes which characterize the operations of this data selector are the same as the codes depicted for data selector 1210.

Address bit A(11) is applied to one input of gate 1226, and the other input of this gate is connected to the DIR conductor 824. Consequently, the bit 11 input of data selector 1218 has applied to it the value of the A(11) bit. Address bits A(10:1) are applied directly to the bit 10-1 inputs of the data selector. When the system is operated in the direct mode, the STK conductor 702 is low so that the B input of data selector 1218 is at a low level. As described above, the ST·AC or ST·D conductor 902 is normally low. Inverter 1228 thus causes a high potential to be applied to the C input of data selector 1218. With the BC code for data selector 1218 thus being a 01, the data selector operates in the "true" mode. That is, the 11 input bits are extended directly through the data selector without being changed to the 11 output conductors. These 11 bits are used as the input values for bits 11-1 of the B set of adder 1216.

In the illustrative embodiment of the invention, data selectors 1210 and 1218 are made of chips Nos. 74H87. Data selector 1210 requires only one chip; data selector 1218 requires three chips. Data selector and register 1316 is made of four chip Nos. SN74298. Adder 1216 comprises four chip Nos. SN74283.

Thus far, the derivation of the address A'(15:0) for the ACS has been described when the system is operated in the direct mode. But it is still required to extend the necessary control and synchronization signals to the ACS in order for it to operate as a conventional memory. The C0 and C1 control signals are extended over control cable 1010 to CONTROL' cable 1304 through drivers 1302. But in order for the control signals to be extended to the ACS, the ENABLE input of drivers 1302 must go high. Similarly, before any operations can take place in the ACS, the MSYN' sync signal must go low.

The data processor causes the MSYN line in the PDP-11 UNIBUS to go low after the signals on the address and control lines (and the signals on the data lines in the case of a write operation) have settled. The MSYN line 1046 at the output of the respective one of receivers 1004 thus goes high; it is extended to inputs of several gates which select an operational mode, but the only one of these gates which has all of its inputs energized when the system operates in the direct mode is gate 1022. One input to this gate is connected to DIR conductor 824 which goes high when gate 814 operates, and the other input to gate 1022 is connected to conductor 1046. Thus the output of gate 1022 goes high when the system is operated in the direct mode. It is the output of this gate going high that controls the accessing of the auxiliary memory.

While a conventional memory can operate on the MSYN signal immediately after it appears on the UNIBUS, the immediate extension of the MSYN signal to memory 1300 may present a problem. This is due to the fact that the address A'(15:0) which is extended to the memory is derived only after data selectors 1210 and 1218 operate, followed by the operation of adder 1216. To allow the signals on the S(15:0) cable 1224 to settle prior to their storage in register 1316 and their extension along with an MSYN' signal to the memory, a short delay is introduced by the provision of capacitor 1024 and resistor 1026 at the output of gate 1022. The output of gate 1022 does not go high immediately when the MSYN conductor 1046 goes high. Instead, capacitor 1024 holds the output of the gate low. The gate output does not rise to the high level until approximately 50 nanoseconds after both gate inputs have gone high. The delayed high-level potential appears on the DIR-D conductor 828 which is extended to the input of inverter 904. Four gates 904, 906, 908 and 910 have their outputs connected to the WD* conductor 912. Ordinarily, the output of each gate is high and conductor WD* is normally held at a high potential. When any one of the gate outputs goes low, conductor WD* goes low to signal that an access should be made to the ACS. (The use of an asterisk in the letter designation for conductor 912 indicates that the respective assertion level is low.)

The WD* conductor 912 is extended to the STROBE input of data selector and register 1316. It is not until a negative step is applied to the STROBE input of the selector that the 16 bits at either input set S or input set R are stored and extended to address cable 1318. The delay at the output of gate 1022 allows the address bits at the S input set of data selector 1316 to settle prior to the strobing of the data selector. The low-level signal on the WD* conductor 912 is also inverted by inverter 1322 so that a positive step is applied to the ENABLE input of control drivers 1302. It is at this time that the four control signals are extended over CONTROL' cable 1304 to the ACS. The CO and C1 control signals inform the ACS which of the four possible read/write operations is to take place. The inverted WD* signal is also applied to the ENABLE input of drivers 1344 so that the address stored in register 1316 is extended to address cable A'(15:00) of the ACS.

But the ACS should not begin its operation until after the address lines have settled. (it is for a comparable reason that the processor usually transmits the MSYN signal approximately 150 nanoseconds after the address, data and control signals are transmitted over the UNIBUS.) The MSYN' signal on conductor 1306 is derived at the output of gate 1326. One input of this gate is connected to the output of inverter 1322 which goes high when the WD* signal goes low. The WD* conductor 912 is connected to the input of inverter 1328. While the output of this inverter goes high, the rise in the output is delayed by capacitor 1330 and resistor 1332. It is only after a delay of 40 nanoseconds that the second input of gate 1326 goes high. It is at this time that the MSYN' conductor 1306 extended to the ACS goes low to initiate a memory access sequence in the ACS. (The delay introduced at the output of inverter 1328 need not be as long as the 150 nanoseconds by which the processor delays the generation of the MSYN signal; this longer delay is required to compensate for skewing effects in driver, receiver and transmission line tolerances. These effects are not as great in the case of a short interval UNIBUS and consequently a shorter delay is permissible. The delay is a function of the ACS which is used. In the illustrative embodiment of the invention, the ACS which is used is the memory included in a PDP-11 computer, and for such a memory a delay of 40 manoseconds is sufficient.)

For any write operation the C1 control bit is a 1. (Whether a word or a byte operation takes place depends on the value of control bit CO.) A 1 bit value on a UNIBUS is represented by a low-level signal. Since data bit receivers 1004 invert all signals received, the C1 line at the output of receivers 1004 goes high when a write operation is to be performed. On FIG. 13, the C1 conductor is extended to one input of gate 1334. The other input of this gate is connected to the output of inverter 1322 which goes high when the WD* signal is asserted. Consequently, in the case of a write operation, the output of gate 1334 goes high. The positive step at the ENABLE input of data drivers 1310 causes the 16 data bits on the D(15:0) cable 1230 to be extended through the data drivers to the data lines D'(15:0) which are extended to the ACS. It is the value of the CO bit in cable 1304 that informs the ACS whether a word or a byte is to be written and, as described above, it is the value of address bit A'(0) which identifies which group of 8 data bits in cable D'(15:0) is to be used in the case of a write byte operation.

On the other hand, if a read operation is to be performed, the C1 conductor at the output of control receivers 1004 is low, and the output of inverter 1032 is high. The output of the inverter is connected to READ conductor 1034. One input of gage 1036 is thus high; as will be described shortly, this controls the transmission of a data word read from the ACS over the PDP-11 UNIBUS. The C1 bit extended to the ACS controls a read operation, the 16-bit word which appears on cable D'(15:0) being extended through data receivers 1312 to the D''(15:00) being extended through data receivers 1312 to the D''(15:00) cable 1350.

After the ACS has written a word or a byte in the case of a write operation, or after the ACS has applied 16 data bits to cable D'(15:0) in the case of a read operation, the SSYN' control conductor 1362 goes low; as described above, a peripheral unit connected to a UNIBUS applies a low-level signal to its SSYN line to acknowledge that the command given to it has been executed. The low-level SSYN' signal is inverted by inverter 1336 so that a high-level signal appears on SSYN' conductor 1308. This conductor is extended to one input of OR gate 1038 (FIG. 10) so that the output of the gate goes high to energize one input of gate 1040. The other input to gate 1040 is connected to the MSYN conductor which has been high since the start of the sequence. Consequently, the output of gate 1040 goes high at this time to indicate that the ACS has responded to the read or write command. The output of gate 1040 which goes high thus represents a SSYN signal which can be transmitted to the processor and interpreted as the usual SSYN signal. Since the assertion level for the processor signal is low, the SSYN output of gate 1040 is inverted by the respective control driver 1006.

The output of gate 1040 is also extended to one input of gate 1036. In the case of a read operation, as described above, the other input of gate 1036 is also high. At this time the EN-DR conductor 1042 goes high to energize the ENABLE input of the 16 bit data drivers 1204. These drivers must be enabled prior to their functioning to extend the data word read from the ACS to the data lines in the PDP-11 UNIBUS. Drivers 1204 are enabled only in the case of a read operation.

But the 16-bit data word on the D''(15:0) cable 1350 is not applied directly to respective ones of the 16 inputs of drivers 1204. The form of the data transmitted to the processor depends on the type of operation in progress. The reason for this relates to read operations on successive bytes in the stacking modes.

If successive 16-bit words in the ACS are required by the processor, then the transmission of the same even address (in one of the stacking areas) causes 16-bit words in successive word locations to appear on the 16 data lines in the PDP-11 UNIBUS. The same address is transmitted to the memory over the PDP-11 UNIBUS in successive cycles and bit A(0) of the address is a 0. On the other hand, if the processor requires successive bytes, bit A(0) of the address which is repetitively transmitted over the PDP-11 UNIBUS is a 1, and the ACS address A'(15:0) is incremented by 1 (rather than by 2) in each cycle. Although 16 bits appear on the processor UNIBUS data lines whenever a read operation is performed, in the case of a read byte operation the processor automatically extracts the lower byte when the transmitted address is even and it automatically extracts the upper byte when the transmitted address is odd. But since for the proper operation of the memory of our invention, the processor is required to transmit an odd address for any byte operation in a stacking mode, it is apparent that the processor will always extract the upper byte on the data lines. For this reason, when any byte is to read in a stacking mode, the byte, whether it is the upper or lower byte of a 16-bit word, is made to appear on the upper byte data lines in the PDP-11 UNIBUS.

Data selector 1202 (chip Nos. SN74S157) has two sets of inputs — R and D''. Eight inputs in both sets are grouped together as the "lower byte" and the other eight inputs in both sets are grouped together as the "upper byte". If the SELECT R input is high, then the R set of 16 inputs is selected for extension to drivers 1204. Otherwise, the D'' set of 16 inputs is selected. Bits D''(7:0) in cable 1350 are extended directly to the eight "lower byte" D'' inputs of the data selector. This 8-bit set is also extended to one of the 8-bit input sets of 8-bit data selector 1208 (chip Nos. SN74S157). Data bits D''(15:8) are extended to the other 8-bit input set of data selector 1208. Either of the two sets of 8 bits is extended through data selector 1208 to the 8-bit upper byte input D'' of data selector 1202 depending on the state of the SELECT D'' (15:8) conductor 1360. If this conductor is low, then data bits D''(7:0) are extended through data selector 1208 to the 8 upper byte D'' inputs of data selector 1202. If the conductor 1360 is high, then data bits D''(15:8) are extended through data selector 1208 to the 8 upper byte D'' inputs of data selector 1202.

The STK conductor 702 is connected to one input of gate 1340. This conductor goes high only when a stacking operation is to be performed. Consequently, when the system is operated in the direct mode the conductor is at a low-level potential and the output of gate 1340 is high. With the SELECT D''(15:8) conductor 1360 in its normal high state, data bits D''(15:8) are extended through data selector 1208 to the upper byte D'' inputs of data selector 1202. Consequently, the eight bits in the lower byte of each word which is read from the ACS appear on the lower byte D'' inputs of data selector 1202 (as they always do) and the eight bits in the upper byte of each word which is read from the ACS appear on the eight upper byte D'' inputs of data selector 1202. The full 16-bit word read from the ACS can thus be made to appear on the PDP-11 UNIBUS data lines simply by holding low the SELECT R input of data selector 1202. This control input is connected to the SMPM conductor 706 which goes high only when the system is operated in the SMPM mode. Thus in the direct mode, the D'' inputs of data selector 1202 are selected as required.

It is only when a byte in the ACS is required by the processor during a stacking mode operation that it is desirable for both upper and lower bytes read from the same word location in the ACS during successive cycles to appear on the upper byte data lines in the PDP-11 UNIBUS even though the same address is transmitted to the memory during each cycle (with the address having an A(O) bit value of 1 to control a byte operation). In such a case, the A(O) address conductor 1048, which is connected to one input of gate 1340, is high to enable that input. A second input of the gate is enabled by the STK conductor 702 being high. The third input of the gate goes high when address bit A'(0) which is extended to the ACS is a 0.

During successive stacking mode cycles when the same address is transmitted to the memory by the processor, address bit A'(0) switches values in order to access successive bytes (when address bit A(0) from the processor is a 1), as will be described below. When bit A'(0) is a 0, to indicate that the lower byte in the accessed ACS word is to be examined, the output of inverter 1342 is high and it is at this time that the SELECT D''(15:8) conductor goes low. The lower byte bits D''(7:0) which are read from the ACS are thus applied by data selector 1208 to the upper byte D'' inputs of data selector 1202. Consequently, the lower byte in the accessed data word appears in the upper byte data lines of the PDP-11 UNIBUS. When bit A'(0) is a 1, which is represented by a high potential on cable 1318, the output of inverter 1342 is low and the SELECT D'' (15:8) conductor remains in its normal high state. Consequently, the upper byte D''(15:8) appears at the upper byte D'' inputs of data selector 1202. Thus it is apparent that when the system is operated in a stacking mode and successive bytes are to be accessed (represented by addres bit A(0) being a 1), since address bit A'(0) extended to the ACS alternates in value during successive cycles, successive lower and upper bytes of the same data word always appear in the same upper byte data lines. In this way, the processor which alway extracts the upper byte on the data lines when address bit A(0) is a 1 is always furnished with the proper byte even if it is a lower byte in the ACS. The fact that during each cycle the lower byte read from the ACS also appears on the lower byte data lines is of no moment; the processor ignores the lower byte data lines during a read byte operation when address bit A(0) is a 1.

It should be noted that a comparable complexity is not required in the case of a write operation in a stacking mode. If a byte is to be written, the processor applies it to both the upper and lower byte data lines. Which of the two groups of identical data bits is used by the ACS depends on the value of address bit A'(0), that is, whether the upper byte or the lower byte of the accessed word is to be written.

Of course, the entire discussion above is applicable only to read operations in a stacking mode when the STK conductor 702 is high in the first place for enabling the output of gate 1340 to go low. When a read operation is performed in the direct mode, data selector 1208 always selects data bits D''(15:8) for application to the upper byte D'' inputs of data selector 1202 so that the full 16-bit word read from the ACS appears on the 16 data lines.

Gate 1040 on FIG. 10 always operates after the ACS has generated its SSYN' signal to control the transmission of an SSYN signal to the processor. (As described above, data drivers 1204 are enabled as well when gate 1040 operates only in the case of a read operation.) After the processor recognizes the SSYN signal, it causes its MSYN line to be restored to its normally high state. This has two effects on the system. First, the output of gate 1022 goes low causing the WD* conductor 912 to return to its normally high state. (Gate 1022, as well as the other gates whose outputs are delayed, are of the open collector type. Thus a delay is introduced only when a gate output goes high; the gate output goes low immediately when required by the inputs). The output of inverter 1322 goes low and this in turn causes the output of gate 1326 to go high. It is when this gate output goes high that the ACS is informed over the MSYN' control line that the processor is terminating the transaction. The ACS responds in the usual fashion by causing its SSYN' line to similarly go high. This line is coupled through OR gate 1038 to one input of gate 1040. Actually, since the MSYN line from control receivers 1004 is coupled to the other input of gate 1040, the output of gate 1040 is restored to its normally low state as soon as the MSYN control line in the PDP-11 UNIBUS goes high. Thus, immediately upon the restoration of the MSYN control line to its normally high state, the output of gate 1040 goes low to control the respective one of drivers 1006 to cause the SSYN control line in the PDP-11 UNIBUS to go high as required. Although the SSYN line on the PDP-11 UNIBUS is restored immediately following the restoration of the MSYN line, while the MSYN' signal to the ACS is delayed by gates 1022 and 904, this is of no moment because the processor always waits 75 nanoseconds after it restores the MSYN line before initiating a new transaction. It should also be noted that the delay at the input of gate 1326 in generating the MSYN' signal does not appear when the signal is to be restored because of the direct connection of the output of inverter 1322 to one input of gate 1326.

Mapping Mode Sequence

Referring to FIGS. 2 and 3, it will be noted that the block number contained in the computer-generated address is operated upon in an almost identical manner when the system is operated in both the direct and mapping modes. (For a direct mode operation, the modified block number is used as the four most significant bits in the derived address for the ACS; for operations in the mapping mode, the modified block number is used as bits 4:1 in the SMPM address.) The circuitry on the upper half of FIG. 8 is comparable to that on the lower half and serves both to determine that an operation in the mapping mode is to take place and to drive the complement of the 4-bit sum which represents one of the 16 possible blocks which may comprise the mapping area (the derived block number is a relative number within the mapping area, rather than an absolute block number in the computer address space).

An 8-bit latch 830 (chip No. SN74116) is provided for storing the 4-bit block number at the start of the mapping area and the 4-bit block number at the end of the mapping area. Referring back to FIG. 1, the 8 bits which thus define the mapping area comprise bits 7:0 of the control word. (The manner in which these 8 bits of the control word are actually stored in latch 830 will be described below in connection with the control mode sequence.) Control word bits CW(3:0) are extended to one set of inputs of adder 834 (chip No. SN74283) and control word bits CW(7:4) are extended to one set of inputs of adder 832 (chip No. SN74283). Adder 834 functions to add the map start block number to the complemented address bits $\overline{A(15:12)}$ (corresponding to the function of summer 47 in FIG. 3). An artificial carry input is not generated and the 4-bit output is complemented by 4 inverters 840. The resulting 4-bit number on MM(BN) cable 842 is used as bits 4:1 of the SMPM address which is derived for accessing the SMPM (whose respective map pointer is in turn used to derive the address used for accessing the ACS).

But before any mapping mode operation takes place, based upon the thus calculated relative mapping page block number, it is necessary to determine that the computergenerated address is contained within the mapping area. Referring to FIG. 3, it will be recalled that the computergenerated address is high enough if the output of summer 47 is equal to or less than 15. This is equivalent to a carry bit not being generated at the CO output of adder 834. If the CO output remains low, it is inverted by inverter 844 for enabling one input of gate 838. Another input to gate 838 is connected to the output of gate 810, which latter gate, as described in connection with the direct mode sequence, enables its output when the computer-generated address is contained in a quadrant to which the overall memory system should respond. If address bits A'(17) and A'(16) are both O's, then the output of gate 810 goes high to enable the second input of gate 838. The third input of gate 838 is connected to the CW(15) conductor 708. This conductor is connected to the most significant bit stored in 8-bit latch 710 (chip No. SN74116), which latch stores bits CW(15:8) of the control word. It will be recalled with reference to FIG. 1 that bit 15 in the control word is a "master" bit which if a 0 prevents stacking, SMPM and mapping operations. Assuming that bit 15 of the control word is a 1, the third input of gate 838 is enabled. Although the output of gate 838 can thus go high, MAP conductor 828 may nevertheless be held low by the output of gate 836.

This latter gate is used to verify that the computer-generated address is not too high. Adder 832 on FIG. 8 corresponds to summer 45 on FIG. 3. The adder derives the sum of the block number of the last valid block in the mapping area as represented by control word bits CW(7:4), and complemented address bits A(15:12). As indicated on FIG. 3, if the sum is greater than or equal to 15, then the computer-generated address is not too high. As in the case of adder 806, rather than to examine the sum computed by adder 832, an artificial carry input is generated; thus, if the computer address is not too high, a carry output will be generated by the adder. The CO output of the adder is extended to one input of gate 836. The other two inputs of the gate are connected to the $\overline{\text{STK}}$ conductor 764 and the $\overline{\text{SMPM}}$ conductor 766. Both of these conductors are high in potential if stacking and SMPM mode operations are not indicated. (These two conductors serve to prevent a mapping sequence if either one of the higher priority stacking or SMPM operations is required; it will be recalled that they serve the same function in connection with the derivation of the DIR signal.) If the outputs of both of gates 836 and 838 are high, MAP conductor 828 goes high to indicate than an operation in the mapping mode should follow. (The MAP signal is inverted by inverter 818 to derive the MAP signal as described above in connection with the direct mode sequence to inhibit the operation of gate 816 since the mapping mode has priority over the direct mode.)

The MAP conductor 828 is extended to one input of gate 1054. The other input of this gate is connected to MSYN conductor 1046. After the processor has transmitted the MSYN signal over the PDP-11 UNIBUS to the system, the output of gate 1054 goes high if the MAP conductor is high. Capacitor 1056 and resistor 1058 are provided to delay the MAP-D conductor 1060 from going high for 70 nanoseconds after both inputs to gate 1054 go high. The MAP-D conductor is extended through inverter 906 to the WD* conductor 912. It will be recalled that when the system is operated in the direct mode the DIR-D conductor 828 which is coupled to the WD* conductor through inverter 904 causes the latter conductor to go low prior to the accessing of the ACS. A delay of 50 nanoseconds is provided at the output of gate 1022, however, in order to allow sufficient time for the ACS address to be derived prior to the WD* conductor being forced low to initiate the accessing of the ACS. In a similar manner, when the system is operated in the mapping mode, the delay at the output of gate 1054 is provided in order to allow the ACS address to be derived prior to conductor WD* going low. (A 70-nanosecond delay is provided rather than a 50-nanosecond delay because of the additional steps required in the derivation of an ACS address for a mapping mode operation.)

The four complemented mapping block address bits NM(BN) on cable 842 are extended to four of the eight inputs in set A of 8-bit selector 1112 (two chip Nos. SN74S157). The selector is provided with two groups of inputs (A and B) of eight inputs each. One of the 8-input groups is extended to the 8-conductor output cable 1102 through the selector depending on whether the SELECT B control input is high or low. If the control input is high the B inputs are selected, and if the control input is low the A inputs are selected. One of the inputs to OR gate 1114 is the STK conductor 702 and the other input is connected to the SMPM conductor 706. These two conductors go high when the system is operated in respective stacking and SMPM modes. When the system is operated in the mapping mode, both inputs are low and the output of gate 1114 is low. Consequently, it is the A set of inputs which is extended through selector 1112 to cable 1102 to serve as the 8-bit address for the SMPM 1100.

Referring to FIG. 3, the 8-bit SMPM address is derived when the system is operated in the mapping mode by forcing the three upper bits to be 0's, by using the four block number bits as address bits 4:1, and by using address bit A(11) as bit 0 of the SMPM address. With reference to the a inputs of selector 1112, it will be noted that the three upper inputs are grounded (representing 0's), inputs 4:1 are coupled to the 4 conductors in MN(BN) cable 842, and the least significant input is connected to conductor A(11) in address cable 1012. In this manner, with the SELECT B input low, the SMPM address which is extended to the SMPM is derived in the manner depicted in FIG. 3.

Each half of the SMPM consists of eight 256×1 memories. The memories are preferably of the semiconductor type to allow fast operations. The same 8-bit address on cable 1102 is extended to each of the two submemories in the SMPM so that for each access of the SMPM a 16-bit word can be read or written. Whether a read or a write operation takes place depends on the CS and WE signals. In the case of a write operation in the SMPM (which does not take place when the sytem is operated in the mapping mode), a 16-bit word appears on either the S(15:0) cable 1224 or the D(15:0) cable 1230 input to the 16-bit selector and input register 1116. Which of the two 16-bit words is selected for writing depends upon whether the SELECT S input is high or low, as will be described below. When the STROBE input of the selector and input register goes low, as will be described below, the selected 16-bit input is stored in a set of 16-storage elements (input register). The 16-bit word thus stored, or one of its two bytes, is then written in the SMPM at the address specified on cable 1102. The SMPM may be comprised of chip Nos. 3106A. The selector and input register may be comprised of chip Nos. SN74298. (Actually, to make these memory and selector/register elements compatible with each other, 16 inverters must be furnished between the seletor/registor and the SMPM; each of the bits stored in the input register must be inverted before it is applied to the data line inputs of the SMPM. These inverters are not shown in FIG. 11 since the SMPM and selector/register are depicted only as functional block elements in the first place.)

The CS input of each half of the SMPM is connected to the DIR conductor 824. This conductor is low when the system is operated in the mapping mode. For reasons now to be described, the WE input of each half of the SMPM is high when the system is operated in the mapping mode. As indicated by the operation codes depicted in the SMPM block, when the CS input is low and the WE input is high for either of the two submemories, a read operation takes place. Consequently, the 16-bit map pointer stored at the derived SMPM address is applied to the R(15:0) data line output cable 1130 of the SMPM.

As will be described below, the STK-D conductor 916 goes high only when the system is operated in the stacking mode. This conductor is connected to one input of gate 1108. Since the conductor is low when the system is operated in the mapping mode, the output of gate 1108 is high. One input of each of gates 1132 and 1110 is connected to the SMPM conductor 706. Since this conductor is high only when the system is operated in the SMPM mode, when the system is operated in the mapping mode the outputs of gates 1132 and 1110 are also both high. Since the outputs of gates 1108, 1132 and 1110 are connected to all of the inputs of gates 1122, 1106 and 1134, the outputs of gates 1122 and 1106 remain low, and the output of gate 1134 remains high. It is because the output of gate 1134 remains high that data is not strobed into input register 1116. (During a mapping mode operation, a word is to be read from the SMPM, not written.) It is because the low output of each of gates 1122 and 1106 forces the output of a respective one of gates 1104 and 1120 to remain high that the WE control input of each half of the SMPM remains high when the system is operated in the mapping mode, so that a word can be read from the SMPM.

The map pointer read from the SMPM appears on the R(15:0) cable 1130. The 16-bit map pointer is applied to the 16 A inputs of adder 1216. With reference to FIG. 3, it will be recalled that the 16-bit map pointer which is read from the SMPM is used as one of the inputs to summer 48 (which corresponds to adder 1216 on FIG. 12). Also as shown in FIG. 3, the other input to summer 48 (adder 1216) which is required when the system is operated in the mapping mode are address bits A(10:0).

The B inputs of adder 1216 are divided into three groups (as shown on FIG. 12). Bit inputs 15-12 are derived from the output of data selector 1210. When the system is operated in the mapping mode, inputs 15-12 in the B set of adder 1216 should be forced to be 0's since the only B inputs required are those on which address bits A(10:0) appear. As depicted in the block representing selector 1210, each of the four output bits of the selector is forced to a 0 as required in the mapping mode when both of the B and C control inputs are high. The B control input of the data selector is connected to the output of inverter 1212 whose input is connected to DIR conductor 824. Since this conductor is low when the system is operating in the mapping mode, the B control input is held high. The C control input of the data selector is connected to the output of gate 1214. One of the inputs to this gate is also connected to DIR conductor 824. The other input is connected to the ST·AC or ST·D conductor 902 which is also low when the system is operating in the mapping mode. With both inputs to gate 1214 low, the output is high so that the C control input of data selector 1210 is high as well as the B input. It is in this way that bits 15-12 at the B data input set of adder 1216 are all forced to 0 when the system is operated in the mapping mode.

The B bit inputs 11-1 of adder 1216 are derived from 11-bit data selector 1218. Referring to FIG. 3, it will be noted that bit 11 is not required by summer 48 (adder 1216). Consequently, the bit 11 input of data selector 1218 is forced to be 0 when the system is operated in the mapping mode. Address bit A(11) is extended to one input of gate 1226 but the other input of this gate is connected to the DIR conductor 824. No matter what the valve of address bit A(11), when the system is operated in the mapping mode and the DIR conducor 824 is low, the bit 11 input of the data selector is a 0. Address bits A(10:1) in cable 1050 are extended directly to the bit inputs 10-1 of the data selector. When the system is operated in the mapping mode, the B input of the data selector is low since it is connected to the STK conductor 702. The ST·ACOR ST·D conductor 902 is connected through inverter 1228 to the C input of the data selector. Since this conductor is also low when the system is operated in the mapping mode, the C input of the data selector is high. Reffering to the operation code table depicted in data selector 1210 (which table is also applicable to data selector 1218), when the B input is low and the C input is high, the bit inputs to the data selector are transmitted to the outputs with no modification. Consequently, address bits A(10:1) are extended directly to respective B inputs of adder 1216, and bit 11 of the B inputs of the adder is always a 0.

Summer 48 on FIG. 3 is shown as requiring address bit A(0). This bit is derived at the output of gate 1220. One input of this gate is connected to the ST·I conductor 924 which is low when the system is operated in the mapping mode. The other input to the gate is connected to the $\overline{A(0)}$ conductor 1016. If this input is high, then the output of gate 1220 is low, and if this input is low, then the output of gate 1220 is high. Since gate 1220 thus functions as an inverter when the system is operated in the mapping mode, and bit $\overline{A(0)}$ is the complement of bit A(0), it is apparent that the output of gate 1220 is low when bit A(0) is a 0 and it is high when bit A(0) is a 1. Since the output of gate 1220 is connected directly to the bit 0 input of input set B of adder 1216, bit A(0) is applied directly to this input. Of course, this input of the adder is also connected to the output of gate 1219. But since one input of this gate is connected to the STK conductor 702 which is low when the system is operated in the mapping mode, the output of gate 1219 does not affect the bit 0 input in set B of adder 1216.

The carry input (CI) of adder 1216 is connected to the output of gate 1222. The two inputs to this gate — the ST·I conductor 924 and the DIR conductor 824 — are both low when the system is operated in the mapping mode, and consequently there is no carry input to the adder. The adder thus functions to add the map pointer from the SMPM to address bits A(10:0) as shown by the legend adjacent to the adder. The sum appears on the S(15:0) cable 1224 and is the derived address for the ACS. This address is applied to the S input of selector and input register 1116 but since the selector/register is not strobed when the system is operated in the mapping mode, nothing is written into the SMPM.

The derived address on the S(15:0) cable 1224 is extended to the 16-bit S input of data selector and register 1316. When the system is operated in the mapping mode, the ST·I conductor 924 is low so that the SELECT R control input of data selector and register 1316 is low. Consequently, it is the 16-bit address at the S input of the data selector and register which is stored and extended to cable 1318 when the element is strobed. This takes place when the WD* conductor 912 goes low. When this conductor does go low after the appropriate delay introduced by capacitor 1056 and resistor 1058 at the output of gate 1054 on FIG. 10 (to allow sufficient time for the ACS address to be derived after MAP conductor 828 first goes high), address drivers 1344 are enabled and address bits A'(15:0) are extended to the ACS. At the same time the control signals are extended to the ACS, and after the delay introduced by capacitor 1330 and resistor 1332, the MSYN' is extended to the ACS. A read or write operation takes place at this time. In the case of a write operation, the data bits D(15:0) from data receivers 1206 are extended through data drivers 1310 (which drivers are enabled when gate 1334 operates only in the case of a write operation) to cable D'(15:0). Whether a word or a byte is written depends on the value of control bit CO. In the case of a write byte operation the byte is determined by address bit A'(0). If a read operation is to be performed, the 16 data bits D'(15:0) read from the ACS are extended through data receivers 1312 to data selector 1202 and data selector 1208. Since the SELECT D''(15:8) conductor remains high in all modes except for a read byte operation in a stacking mode, data bits D'(15:8) are extended to the D'' upper byte inputs of data selector 1202 and the full 16-bit word which is read from the ACS is extended to data drivers 1204. The data drivers are enabled when the EN·DR conductor 1042 goes high; this conductor goes high in the case of a read operation in the mapping mode just as it does when the system is operated in the direct mode. The sync signal sequence (involving the MSYN, SSYN, MSYN' and SSYN' signals) is the same in the mapping mode as it is in the direct mode.

In the illustrative embodiment of the invention, each 4K block of the computer address space is divided into two pages of 2K addresses each; each map pointer identifies the starting address of a 2K-address page in the ACS, and 11 address bits, A(10:0), are used as an offset to identify one of the ACS locations in the page. The two pages comprising each 4K-address block in the ACS need not be contiguous; their respective map pointers may identify starting locations separated by any number of addresses.

But in some applications it may be more efficient to select a different page size. For example, if a typical "page" of information used by the processor has only 512 data bytes, it might be more efficient to allocate only 512 addresses to each page. In the system of our invention, the page size can be increased or decreased. To double the page size, for example, the 4-bit mapping mode SMPM address bits MM(BN) could be used to derive an SMPM address of the form OOOOXXXX, rather than an SMPM address of the form OOOXXXXY, where the least significant bit Y is address bit A(11) ("U/L page"— see FIG. 3). In such a case, the offset in the page would represent one of 4K addresses and address bits A(11:0), rather than address bits A(10:0), would be extended through selector 1218 to adder 1216. On the other hand, suppose the page size is to be only 512 bytes. In such a case, the SMPM address would be of the form OXXXXYYY, where SMPM address bits XXXX are the 4bit MM(BN) code and SMPM address bits YYY are address bits A(11:9). Since only nine address bits would be required to represent an offset in a page of this reduced 512-byte size, only address bits A(8:0) would be extended through selector 1218 to adder 1216.

As is known in the art, "jumper" blocks may be provided to establish hardware connections for defining a page size, and for determining which of the computer-generated address bits are extended to selector 1112 and which are extended through selector 1218 to the adder 1216. A first jumper block would be used to couple the four MM(BN) bits to the proper inputs of selector 1112 and to couple the proper number of the computer-generated address bits to the selector inputs. Another jumper block together with enabling logic which operates in the mapping mode, would be used for coupling the proper number of the computer-generated address bits to inputs of selector 1218. The proper configurations depending on the desired page size will be apparent to those skilled in the art.

SMPM Mode Sequence

Referring to FIG. 1, it will be recalled that bits CW(13:8) of the control word represent the 1K boundary in the computer address space above which the 512-address SMPM area is contained. With reference to FIG. 4, it will be recalled that a strap connection was stated to determine whether the SMPM area was in the upper or the lower half of the 1K address space directly above this 1K boundary.

The 1K boundary is stored in the six lowest positions of 8-bit latch 710. The control word bits CW(13:8) which define the boundary are stored in the 8-bit latch during the control mode sequence to be described below. The six bits are extended to six inputs of 8-bit comparator 714(two chip Nos. 8242).

Although the comparator compares one set of eight bits to another set of eight bits, it is most convenient to think of the comparator as performing three different comparisons. The first, shown at the top of comparator 714, simply verifies that the MAS bit — CW(15) — is a 1. The MAS bit, which must be a 1 if the SMPM mode is not disabled, is compared to a respective bit of value 1 which is derived by connecting the respective input of the comparator to a positive potential as shown.

The SMPM start boundary represented by bits CW(13:8) is compared to address bits A(15:10), as depicted in FIG. 4. It is only when a received address is within the 1K area whose lower boundary is defined by address bits A(15:10) that an operation in the SMPM mode should take place. Since a page in the computer address space consists of 2K addresses, a 1K address space consists of a half-page, and consequently the comparison of bits CW(13:8) to bits A(15:10) functions to detect a half-page (HP) match as indicated within comparator 714.

As the last set in the comparison, address bit A(9) is compared to the "strap option" bit which places the SMPM area in either the upper or the lower half of the half-page defined by the SMPM start bits. In effect, this last comparison verifies that the quarter-page which contains the computer-generated address is the same as that defined by the strap option. Switch 716 is a three position switch. In the position shown, the bit to which address bit A(9) is compared is a 0, thereby defining the lower quarter page. If the switch is in the middle position, it is connected to a positive potential so that the upper quarter page is defined. Although not described in the General Description above, there is yet another option which can be employed and that is to place switch 716 in the uppermost position in which it is connected to the output of the least significant bit CW(8) in latch 710. In such a case, the same bit CW(8) which is used in the comparison with address bit A(9) is used in the comparison with address bit A(10). If address bit CW(8) is a 0, in which case the SMPM start 1K boundary is even, then bit A(9) must be a 0 for comparator 714 to energize its SMPM output. On the other hand, if the least significant bit CW(8) which defines the SMPM start 1K boundary is a 1, then address bit A(9) must be a 1 in order for the comparator to energize its SMPM output. What this means is that if switch 716 is placed in the uppermost position shown on FIG. 7, then the SMPM area is necessarily in the bottom quarter of the 2K address block which contains the overall SMPM and stacking areas or it is in the upper quarter of the same 2K block. The SMPM area cannot be selected to fall within one of the two middle 512-address areas. The advantage of placing switch 716 in the uppermost position is that it permits the SMPM area to be varied under software control without requiring a manual change in the position of switch 716. If the control word is changed to define a new 1K boundary, the 1K address space above which contains the SMPM area, then that in and of itself defines whether the SMPM area is in the upper or lower half of that 1K address space, depending upon whether the 1K boundary is odd or even.

Assuming that comparator 714 determines that the received address is within the SMPM area, its output goes high. The SMPM conductor 706 can be held low, however, by gate 718. The two inputs to this gate are address bits A'(17) and A'(16), and gate 718 functions in the same manner as gate 810. It is only if the received address is in a proper quadrant that an $\overline{\text{SMPM}}$ mode operation can take place. Inverter 720 is provided to obtain the SMPM signal on conductor 766. As described above, if an SMPM mode operation is to take place, conductor 766 is low in potential to prevent the MAP conductor 828 or the DIR conductor 824 from going high since the SMPM mode has a higher priority than the mapping and direct modes.

The high potential on SMPM conductor 706 is extended through OR gate 1114 to the SELECT B input of selector 1112. With this input of the selector high, the B group of inputs is selected for extension to cable 1102. The B group of inputs consists of address bits A(8:1). As shown in FIG. 4, it is this group of 8 address bits which defines one of the 256 word locations in the SMPM. The SMPM conductor 706 is also extended to the SELECT R input of 16-bit data selector 1202. With the SELECT R input held at a high level, it is the R(7:0) group of data bits which is selected for extension to the lower byte inputs of drivers 1204 and the R(15:8) group of data bits which is selected for extension to the upper byte inputs of drivers 1204. When the system is operated in the SMPM mode, a word is either written into the SMPM or read out of it. When a word is read out of the SMPM it appears on the R(15:0) cable 1130. As in the case of any read operation, as determined by the Cl control bit, gate 1036 operates to energize the EN DR conductor so that drivers 1204 are enabled to transmit a 16-bit word on the PDP-11 UNIBUS data lines.

If a word or a byte is to be written into the SMPM, the data bits received from the processor appear on the D(15:0) cable 1230. (In the case of a write byte operation, the same byte appears on both the upper and lower byte data lines.) It will be recalled that the selector/register 1116 has two groups of 16-bit inputs S and D. Group S is selected only if the SELECT S input is high. Since this input is connected to the STK conductor 702 which is low when the system is operated in the SMPM mode, it is input group D which is selected. Consequently, data appearing on the D(15:0) cable 1230 can be written into the input register 1116 when the STROBE input goes low.

When the system is operated in the SMPM mode, in the case of a read operation a full 16bit word is read and applied to the data lines in the PDP-11 UNIBUS. In the case of a write operation, however, either a word or a byte can be written; in the case of a write byte operation, either an upper or a lower byte can be written. The several gates shown below the SMPM determine which of the several operations takes place.

As described above, the outputs of gates 1108, 1132 and 1110 are all ordinarily high. This, in turn, keeps the outputs of gates 1122 and 1106 low, and the output of gate 1134 high. In the case of a read operation, control bit Cl is a 0. Conductor Cl at the output of control receivers 1004 is thus low is potential and WRITE conductor 1014 remains low. Since this conductor is connected to one input of each of gates 1132 and 1110, the outputs of both of these gates remain high. One of the inputs of gate 1108 is connected to the STK-D conductor 916 which goes high only when an operation is performed in a stacking mode. Consequently, when the system is operated in the SMPM mode the output of gate 1108 also remains high. Thus all of the inputs of gates 1122, 1106 and 1134 remain high when a read operation is being performed in the SMPM mode. The STROBE input of selector/register 1116 remains high; this is the required operation since in a read sequence a data word should not be written into the SMPM. The outputs of gates 1122 and 1106 both remain low, so the outputs of both of gates 1104 and 1120 remain high Thus the WE input of each half of the SMPM is high. Since the CS input of each half of the SMPM is connected to the DIR conductor 824 which is held low when the system is operated in the SMPM mode, as shown in the table within the SMPM block, a read operation takes place. The 16-bit word at the location specified by the 8-bit address on cable 1102 is applied to the R(15:0) cable 1130 for extension through data selector 1202 to data drivers 1204.

The data are not applied to the PDP-11 UNIBUS data lines, however, until the ENABLE input of the drivers goes high. Since the Cl control bit is a 0 in the case of a read operation, the output of inverter 1032 is high to enable one input of gate 1036. When the processor transmits the MSYN control signal, one input of gate 1040 goes high. It is when the other input of this gate goes high that the SSYN output of the gate goes high to control both the operation of gate 1036 so that data drivers 1204 can operate and the transmission of an SSYN signal through one of control drivers 1006 to the processor. (The processor "expects" an SSYN signal from a peripheral unit at the same time that it receives data in the case of a read operation.) The SSYN control signal in the direct and mapping modes originates on the SSYN control line from the ACS which is extended through OR gate 1038. But when the system is operated in the SMPM mode, the ACS is not accessed in the first place. Accordingly, a signal through OR gate 1038 must be derived in some other way. For this reason OR gate 1062 is provided. One input of this gate is connected to the SMPM-D conductor 925. This conductor is connected to the output of gate 926. The two inputs to this gate are the SMPM conductor 706 and the MSYN conductor 1046. The SMPM conductor is high when an operation in the SMPM mode takes place. As soon as the processor transmits the MSYN sync signal, both inputs of gate 926 are enabled. The output of the gate does not rise immediately, however, due to a 90-nanosecond delay caused by capacitor 928 and resistor 930. The SMPM-D conductor 925 is delayed from going high until after a word has been read from the SMPM and appears at the 16 inputs of data drivers 1204. It is only then that a high-level signal is developed on the SMPM-D conductor 925 for extension through OR gates 1062 and 1038 to control the transmission of both data and a SSYN signal to the processor.

After the processor receives the data together with the SSYN control signal, the MSYN control line in the PDP-11 UNIBUS is restored. Since one input of gate 1040 is now at a low level, the output of the gate goes low and the SSYN control line is similarly restored.

In the case of a write operation in the SMPM mode, the STK-D conductor 916 remains low, as it does in the case of a read operation in the SMPM mode. Consequently, the output of gate 1108 remains high and has no effect on the operations of gates 1122, 1106 and 1134. The WRITE conductor 1014 is high in the case of a write operation. This conductor is connected to one input of each of gates 1132 and 1110. Another input of each of these gates is connected to the SMPM conductor 706 which is high. Thus the output of each of these gates assumes a state depending upon the state of the respective third input which, in turn, is controlled by respective gates 1136 and 1138.

One input of each of gates 1136 and 1138 is connected to the CO conductor 1064. This conductor is low (representing a CO bit of value 0) when a word, as distinguished from a byte, is to be written. Since the CO conductor is connected to each of gates 1136 and 1138, the outputs of both gates go high to energize the third input of each of gates 1132 and 1110. The output of each of these gates thus goes low. Since outputs of each of these gates are coupled to inputs of all of gates 1122, 1106 and 1134, the output of gate 1134 goes low to strobe the selector and input register 1116, and the output of each of gates 1122 and 1106 goes high. The outputs of gates 1122 and 1106 are delayed from going high immediately, however, because of the provision of the delay circuits comprising capacitors 1140 and 1142, and resistors 1144 and 1146. It is the negative step at the output of gate 1134 that causes the data word on the D(15:0) cable 1230 to be stored in the input register associated with the SMPM. The outputs of gates 1122 and 1106 are delayed from going high for 60 nanoseconds after the data word has been stored in the input register. When the outputs of the gates go high, one of the inputs of each of gates 1104 and 1120 is enabled. As soon as the MSYN signal is received from the processor, the outputs of each of the gates goes low. Thus the WE input of each half of the SMPM is low together with the CS input. Consequently, as indicated in the table within the SMPM block, a write operation takes place and a full 16-bit word is written in the SMPM.

If a byte is to be written into the SMPM rather than a full word, the CO conductor 1064 is high in potential. Which of gates 1136 and 1138 now causes its output to go high depends on the state of the other input to the gate. The A(0) conductor 1048 is connected to an input of gate 1138. This conductor is low when a lower byte is to be written in the SMPM (since the address transmitted by the processor is necessarily even) so that the output of gate 1138 is high. This in turn causes the output of gate 1134 to go low so that the double-byte word on the data lines can be strobed into selector and input register 1116, and the output of gate 1106 to go high after a delay introduced by capacitor 1140 and resistor 1144. But since the output of gate 1110 is not connected to an input of gate 1122, the output of this latter gate remains low. Consequently, it is only the output of gate 1104 which goes low when the MSYN signal is received from the processor. Since the output of gate 1120 remains high, a byte is written into only the lower-byte half of the SMPM.

On the other hand, if bit A(0) is a 1, then the $\overline{A(0)}$ conductor 1016 is low rather than the A(0) conductor 1048. In this case it is the output of gate 1136 which goes high rather than the output of gate 1138, and it is the output of gate 1132 which goes low rather than the output of gate 1110. Since the output of gate 1132 is connected to an input of gate 1122, rather than to an input of gate 1106, it is gate 1122 whose output goes high after the output of gate 1134 goes low. After the double-byte input word is strobed into the input register it is the output of gate 1120 which goes low when the MSYN signal is received so that a byte is written into the upper byte half of the SMPM.

The sync signal sequence transmitted over the PDP-11 UNIBUS for a write operation (word or byte) is identical to the sequence for a read operation described above.

Stacking Mode Sequence

It is comparator 720 (two chip Nos. 8242) that functions to determine whether a received address is within the stacking area, as well as whether a stacking operation should take place even if the received address is within the stacking area. The 8-bit comparator is provided with four sets of paired inputs. The upper set is comparable to the upper set in comparator 714; the MAS bit CW(15) of the previously stored control word is compared to a 1 bit in order to determine that the master bit was previously set. It is only if the MAS bit is a 1 that stacking, as well as SMPM and mapping, operations should take place. Similarly, the stacking bit CW(14) in the control word is compared to a 1 bit at the second set of inputs of comparator 720 to verify that the stacking mode has been enabled.

It will be recalled that the 512-address SMPM area can be made to overlay any one of the four 512-address stacking areas. Since the SMPM mode has a higher priority than the stacking mode, if the received address is within the SMPM area, then a stacking operation must be inhibited. The lower pair of inputs in comparator 720 is provided for this purpose. The SMPM conductor 706 is extended to one of the inputs. This conductor is low, representing a 0, only if an SMPM operation is not to be performed. The bit represented by the state of the SMPM conductor is compared to a 0 bit to determine whether a stacking operation should be inhibited.

The 2K-address stacking area, as shown in FIG. 1, is contained within 2K boundaries. The lower 2K boundary is defined by the five most significant bits of the 6-bit SMPM start 1K boundary represented by control word bits CW(13:8) in 8-bit latch 710. The five most significant bits CW(13:9) are extended to five inputs of the second lowest set of comparator 720. Address bits A(15:11) are extended to the other five respective inputs of this set. The comparator compares the respective bits to determine whether the five upper bits of the SMPM start 1K boundary match address bits A(15:11) as shown in block 52 of FIG. 5, that is, whether the received address is contained in the 2K-address page defined by bits CW(13:9). (Comparison logic block 52 in FIG. 5 indicates that a stacking or an SMPM mode operation should take place if the two sets of five bits each match. That is only because in the representation of FIG. 5 it is not shown how the SMPM mode has priority over the stacking mode. In the actual circuit, comparator 720 also checks that the received address is not within the SMPM area. Consequently, when the output of the comparator goes high it is an indication that a stacking operation should take place.)

When comparator 720 detects an 8-bit match, it enables the STK conductor 702 to go high. The conductor can be held low, however, if the output of gate 722 is low. As shown, this gate simply prevents the STK conductor from going high if address bits A'(17) and A'(16) are not both 0's. The gate serves the same function as gate 718 and gate 810. Inverter 724 derives a low potential on the $\overline{\text{STK}}$ conductor 764 whenever the STK conductor 702 is high. As described above, a low potential on conductor 764 serves to inhibit operations in the mapping and direct modes since the stacking mode has a higher priority.

The STK conductor 702 is extended to one input of gate 932. The other input of this gate is connected to the MSYN conductor 1046. The output of the gate is enabled to go high as soon as the MSYN signal is received from the processor. However, the output of the gate is delayed from going high for 70 nanoseconds by capacitor 934 and resistor 936. The delay is comparable to those at the outputs of gates 1022, 1054 and 926.

When the system is operated in the stacking mode, any one of four different sequences can take place. As shown on FIG. 5, the sub-mode in which the system is operated depends on address bits A(10) and A(9). Various gates are provided on FIG. 9 to develop signals which are subsequently used depending upon the particular sub-mode which is specified by these two address bits. The STK conductor 702 is extended directly to one input of gate 938. The other two inputs of this gate have applied to them address bits A(10) and A(9). Only if all three inputs are high does the output of the gate (ST·AC*) go low. Referring to FIG. 5, it will be noted that if the system is to be operated in the stacking mode (represented by STK conductor 702 being high), and if address bits A(10) and A(9) represent a 11 code, then the received address is within the S-AC area and an ascending stack check operation should be performed. In this sub-mode of operation, the respective stack pointer is decremented for gaining access to the ACS so that the last stored word or byte can be read; the stack pointer left in the SMPM at the end of the cycle is unchanged from its value at the start of the cycle so that it points to the next location in the ACS in which a word may be written. It is when the ST·AC* conductor 920 goes low, that an operation in this sub-mode is indicated.

Two of the inputs to gate 940 are connected to the STK conductor 702 and to address bit conductor A(9). The third input of gate 940 is connected to the output of gate 938. Since two of the inputs of gate 940 are the same as two of the inputs of gate 938, and the output of gate 940 can go high only if the output of gate is high, it follows that the output of gate 940 can go high only if the third input A(10) of gate 938 remains low when the other two inputs are high. This means that the output of gate 940 goes high only if it has been determined that an operation should be performed in the stacking mode, and address bits A(10) and A(9) represent a 01 code. As indicated in FIG. 5, if address bits A(10) and A(9) represent a 01 code, the received address is within the S-I area and the system should be operated in the automatic increment sub-mode. When gate 940 operates, the ST·I conductor 924 goes high to indicate that the stack pointer represented by the other address bits should be used to access the ACS, following which it should be incremented and restored in the SMPM. The ST·I conductor 924 is extended to one input of gate 942. The other input to this gate is connected to the MSYN conductor 1046. The output of the gate is thus enabled to go high as soon as the MSYN signal is received when the system is to be operated in the automatic increment sub-mode. However, the output of the gate is delayed from going high immediately by capacitor 944 and resistor 946. The ST·I-D conductor connected to the output of gate 942 goes high to enable the operation of gate 908 only after 55 nanoseconds have elapsed following receipt of the MSYN signal.

One input to gate 948 is connected to the STK conductor 702. The other input to the gate is connected to the A(10) address bit conductor. Consequently, the output of gate 948 goes high only if an operation in the stacking mode should take place, and only if address bit A(10) is a 1. As indicated in FIG. 5, address bit A(10) is a 1 whenever the system should be operated in the ascending stack check sub-mode or the automatic decrement sub-mode. (In the latter mode, the respective stack pointer is first decremented, and the decremented value is then used to access the ACS and for writing in the SMPM.) The ST·AC OR ST·D conductor 902 thus goes high whenever the system is to be operated in either of these two sub-modes, that is, the received address is within either the S-D area or the S-DC area shown on the left of FIG. 5.

Gate 952 is provided to detect an invalid operation. When the system is operated in the stacking mode, a 16-bit stack pointer is read from the SMPM either to be used directly to access the ACS or to be modified prior to the accessing of the ACS. If a word operation is to take place, the address extended to the ACS must be even. Even if the address which is read from the SMPM is modified prior to the accessing of the ACS, the address is changed by a value of 2 in the case of a word operation. Consequently, no matter what sub-mode the system is operated in when a stacking operation is to be performed, if it is a word operation which is required the least significant bit R(0) read from the SMPM should be a 0. Since a word operation always takes place in any one of the four stacking submodes when address bit A(0) is a 0, it is apparent that when address bit A(0) is a 0, if bit R(0) which is read from the SMPM is a 1 then something is wrong. It is gate 952 which detects this. Inverter 950 serves to invert the A(0) address bit so that bit $\overline{A(0)}$ serves as one input to gate 952. The other input to this gate is bit R(0) which is read from the SMPM and appears on conductor 1150. If address bit A(0) is a 0, then the $\overline{A(0)}$ input of gate 952 is high. If bit R(0) is a 1 at this time, indicating an error, then the output of gate 952 goes low. Since the output of this gate is connected to one input of gate 908 as well as to one input of gate 910, the output of neither of these gates can go low. The two outputs are connected to the WD* conductor 912 which must go low in order to access the ACS. The output of one or both of the two gates must go low when the system is operated in the stacking mode in order to access the ACS, as will be described below, and both gates are disabled from having their outputs go low if the R(0) bit is a 1 when the A(0) bit is a 0. Since the ACS is not accessed if neither gate output goes low, the ACS cannot generate the SSYN signal and this in turn prevents the SSYN signal from being generated back over the PDP-11 UNIBUS to the processor. The processor eventually times out if the SSYN signal is not received within the prescribed interval following the generation of the MSYN control signal, at which time it can be determined that an error has arisen.

When the system is operated in the stacking mode, as described immediately above, the WD* conductor 912 can be forced to go low to access the ACS by either gate 908 or gate 910. Gate 910 operates when the STK-D conductor 916 goes high and gate 908 operates when the ST·I-D conductor 954 goes high. It should be noted that whenever the ST·I-D conductor goes high the STK-D conductor must also go high inasmuch as the two conditions for the operation of gate 932 are that the STK and the MSYN conductors be high, while these same two conditions (as well as others) are required for the operation of gate 942. The reason for providing the additional gate 942 is that when the system is to be operated in the automatic increment sub-mode, there is no need to modify the address read from the SMPM prior to the accessing of the ACS. It will be recalled that in this mode the SMPM address is used directly, and the address is incremented prior to its restoring in the SMPM. Consequently, when the system is operated in the automatic increment sub-mode, the maximum amount of time is not required for the derivation of the ACS address. The address read from the SMPM need not be modified prior to the acessing of the ACS. The delay at the output of gate 932 is longer than the delay at the output of gate 942. Consequently, the WD* conductor 912 goes low sooner after receipt of the MSYN signal when the system is operated in the automatic increment sub-mode then it does when the system is operated in one of the three other stacking sub-modes. The delay at the output of gate 942 is only 55 nanoseconds, as compared with the 70-nanosecond delay at the output of gate 932.

When the system is operated in the stacking mode, the SMPM conductor 706 is low. Consequently, the output of each of gates 1132 and 1110 is high. The outputs of these gates are extended to several of the inputs of gates 1122, 1106 and 1134. Since the outputs of gates 1132 and 1110 are high, they have no influence on the outputs of gates 1122, 1106 and 1134. These latter three gates each has its single remaining input connected to the output of gate 1108. Consequently, whether or not gates 1122, 1106 and 1134 operate in the stacking mode to control writing in the SMPM depends solely upon the operation of gate 1108.

The STK-D conductor 916 is extended to one input of gate 1108. This conductor always goes high when the system is operated in the stacking mode. However, there is a delay between receipt of the MSYN signal and conductor 916 going high because of the delay at the output of gate 932. Consequently, when the MSYN signal is received to energize one input of each of gates 1120 and 1104, the STK-D conductor 916 is still low. The output of gate 1108 is thus high; this forces the outputs of gates 1122 and 1106 to remain low, and the output of gate 1134 to remain high. With the output of gate 1134 high, selector and input register 1116 is not strobed; this is desired because at the start of a stacking operation a word is to be read from the SMPM, not written into it. A word is to be written back into the SMPM (in some of the stacking sub-modes) only at the end of the operation. With the output of each of gates 1122 and 1106 low, the second input of each of gates 1120 and 1104 is low. Consequently, the outputs of these two gates are high and the WE input of each half of the SMPM is high. Since the CS input of each half of the SMPM is connected to the DIR conductor 824 which is low during a stacking sequence, the CS/WE code at the start of each stacking cycle is 01. As indicated in the table within the SMPM, this results in a read operation as required.

The STK conductor 702, which goes high even prior to receipt of the MYSN signal, is extended through OR gate 1114 to the SELECT B input of 8-bit selector 1112. With this input high, 8-bit input set B of the selector is extended to address cable 1102 of the SMPM. Address bits A(8:1) are thus used to access the SMPM. As indicated in FIG. 5, it is this set of address bits in the computer-generated address which is used to access the SMPM in the stacking mode. The proper stack pointer is thus read from the SMPM and appears on the R(15:0) data lines 1130 as required.

The 16-bit stack pointer is applied to the 16 inputs of set A of adder 1216. The adder is used to change the stack pointer if necessary, depending on the sub-mode in which the memory is operated. The stack pointer on cable 1130 is also extended to the R input of data selector 1316. When the system is operated in the automatic increment sub-mode the ST·I conductor 924 is high so that the SELECT R input of the data selector and register is high. Consequently, the stack pointer read from the SMPM is extended directly through the selector and register, without modification, to address drivers 1344 when the data selector and register is strobed. This happens as soon as the WD* conductor 912 goes low. In the case of an operation in the automatic increment sub-mode, it is gate 908 which causes this signal to be generated after only a short delay at the output of gate 942 (the delay being sufficient to allow the reading of a stack pointer from the SMPM). A word or a byte is then written into the ACS in the usual way, or a word is read from it, depending upon control signals CO and C1. As described above, in the case of a read byte operation, the output of gate 1340 goes low if address bit A(0) is a 1 so that the lower byte of a word read from the ACS appears on the upper byte data lines as well as the lower byte data lines. Following the operation of the ACS, the SSYN signal is generated in the usual way to inform the processor that the requested data is available.

But the transaction has not really been completed because it is necessary to restore an incremented stack pointer back in the SMPM at the same address which still appears on cable 1102. The stack pointer appears at input set A of adder 1216. The adder must function to add either a value of 1 or 2 to the stack pointer depending on whether a byte or a word operation is being performed, following which the incremented stack pointer must be restored in the SMPM.

When the system is operated in the stacking mode, the DIR conductor 824 is low. Consequently, inverter 1212 applies a high potential to the B control input of data selector 1210. One input of gate 1214 is connected to the ST·AC OR ST·D conductor 902 which is low in potential when the system is operated in the automatic increment stacking sub-mode. The other input of this gate is connected to the DIR conductor 824 which is also low. Consequently, the output of the gate is high so that input C of the data selector is high along with input B. As indicated in the table within the data selector, when the BC control inputs represent a 11 code, the output of the data selector consists of 4 0's. Thus, bit inputs 12–15 of the B set of adder 1216 are all 0's.

With respect to data selector 1218, its B input is connected to the STK conductor 702 which is high when the system is operated in the stacking mode. Its C input is connected through inverter 1228 to the ST·AC OR ST·D conductor 902 which is low. Consequently, both inputs of data selector 1218 represent a 11 code, and inputs 1–11 of set B of the adder are also forced to represent 0's.

One input of OR gate 1222 is connected to the ST·I conductor 925 so that the output of the OR gate goes high to energize the CI input of adder 1216 when the system is operated in the automatic increment stacking sub-mode. Consequently, the stack pointer is always incremented by at least 1 when the system is operated in the automatic increment submode. This is necessary since even if a byte operation is being performed the stack pointer must be incremented by 1. It is only when a word operation is being performed that the stack pointer must be incremented by 2 rather than 1. This is accomplished by causing the bit 0 input of set B of the adder to be a 1 when a word operation is being performed. Two of the inputs of gate 1218 are connected to the outputs of inverters 1234 and 1236, the inputs of which are the A(9) and A(10) address bits. When the system is operated in the automatic increment mode, address bit A(9) is a 1 so that the output of inverter 1236 is low. Consequently, the output of gate 1219 is enabled to remain high and gate 1219 has no influence on the operation of adder 1216. But the bit 0 input of set B of the adder can be forced to go low by the operation of gate 1220. One input of this gate is connected to the ST·I conductor 924 which is high when the system is operated in the automatic increment stacking sub-mode. Thus only if the $\overline{A(0)}$ conductor 1016 is high does the output of gate 1220 go high. Thus the output of gate 1220 represents the complement of address bit A(0). If the address bit is a 1, indicating a byte operation, the output of gate 1220 goes low so that the bit 0 input of set B of adder 1216 represents a 0. As a result, the SMPM address is incremented only by 1, as represented by the high-level potential at the CI input of the adder. On the other hand, if address bit A(0) is 0, indicating a word operation, the output of gate 1220 remains high along with the output of gate 1219 so that the bit 0 input of set B represents a 1. In such a case, the stack pointer read from the SMPM is incremented by 2. As indicated in the legend associated with the adder on FIG. 11, when an address is received within the S-I area, the output of the adder on S(15:0) cable 1224 is always equal to the value of the stack pointer itself, plus a forced carry input, either 0 or 1 depending on whether a word or a byte operation is being performed.

The incremented stack pointer is applied to the S input of data selector and register 1316, but that is of no moment because the SELECT R input of the data selector is high and remains high until after the processor has restored the MSYN signal. It is the incremented stack pointer which is extended to the S input of 16-bit selector and input register 1116 which is of importance because it is the incremented stack pointer which is now restored in the SMPM at the same address which is still represented on address lines 1102.

It will be assumed for the moment that the output of gate 1154 remains in its normally high state. In such a case, one input of gate 1108 is high. Another of the inputs to this gate is connected to the ST·AC* conductor 920 which remains high when the system is operated in the automatic increment stacking sub-mode. The third input of the gate is connected to the STK-D conductor 916 which is low at the start of the cycle but which goes high toward the end of the cycle following the delay introduced at the output of gate 932. The output of the gate, connected to the REWRITE ON STACKING conductor 1152, goes low when the STK-D conductor goes high to indicate that the modified stack pointer must be re-written in the SMPM. With conductor 1152 low, the output of each of gates 1122 and 1106 goes high, and the output of gate 1134 goes low. However, the changes in the outputs of gates 1122 and 1106 are delayed slightly as described above. As soon as the output of gate 1134 goes low, the modified stack pointer is strobed into input register 1116. As soon as the outputs of gates 1122 and 1106 rise, the outputs of both of gates 1104 and 1120 go low. The WE inputs of the SMPM are now low along with the CS inputs and consequently the modified stack pointer is re-written in the SMPM. The incremented stack pointer value can now be used in the next cycle.

It should be noted that re-writing in the SMPM takes place during the same time period that the ACS is being accessed. (Actually, unlike operations in the other stacking sub-modes, when an automatic increment sequence is in progress, accessing of the ACS begins prior to SMPM re-writing because the WD*conductor goes low prior to the STK-D conductor going high because the delay at the output of gate 942 is shorter than te delay at the output of gate 932, as described above.) The re-writing is controlled by the MSYN signal on conductor 1046 which is applied to one input of each of gates 1104 and 1120. The MSYN control line is not restored by the processor until long after the writing operation in the SMPM has been completed because the processor must first receive the SSYN signal and this signal is generated only after the SSYN' signal is generated by the ACS. The SSYN' signal is generated only after the relatively slow ACS has performed the necessary read or write operation so that there is sufficient time for re-writing in the SMPM to take place even though the re-writing is essentially independent of the accessing of the ACS and the restoration of the control lines.

The only re-writing exception occurs when the output of gate 1154 is low so that the output of gate 1108 cannot go low. The output of gate 1154, identified as an IGNORE DATIP condition, is low only if the two inputs of gate 1154 are high. These two inputs are connected to the READ conductor 1034 and the CO conductor 1064. It will be recalled that the READ conductor has on it a signal which represents the complement of the Cl bit. Consequently, if both inputs to gate 1154 are high, it is an indication that the CO bit is a 1 and the Cl bit is a 0. This is the code for a DATIP operation in a PDP-11 system. This operation is an ordinary read, except that it is always followed by a write operation. (The DATIP operation normally sets a pause flag in a read-out device such as a core memory which inhibits the usual restore cycle). If a write operation is to follow the read operation then the word which is to be written must be stored in the same location in the ACS from which a word was just read. But if the stack pointer is incremented following the DATIP read operation, then it would identify the next higher location. It is for this reason that on a DATIP read operation the write sequence for the SMPM does not take place and the previously used stack pointer value remains in the SMPM. (This is true for all four stacking sub-modes). On the subsequent ACS write operation, the system goes through the usual sequence and a word or byte is written. It is at the end of this cycle that the incremented stack pointer value is rewritten in the SMPM in preparation for the next cycle because the output of gate 1154 is in its normally high state.

In the automatic decrement stacking sub-mode, it will be recalled that the stack pointer is first decremented. It is the decremented value which is used to access the ACS and which is restored in the SMPM. As described above, since the stack pointer must be modified before it is used to access the ACS, more time must be allowed (than in the automatic increment sub-mode) after the MSYN signal is received before the WD* conductor 912 goes low to control accessing of the ACS. It is gate 910 which operates alone in the automatic decrement sub-mode (as well as in the ascending stack check and descending stack check modes) without gate 908 to cause the WD* conductor 912 to go low.

In the automatic increment sub-mode the SELECT R input of data selector and register 1316 is high because the ST·I conductor 924 is high. That is the reason that the stack pointer read from the SMPM is used for accessing the ACS. But when the system is operated in the other three stacking sub-modes, the ST·L conductor 924 is low. Consequently, it is the address at the output of adder 1216 that is used for accessing the ACS.

The stack pointer is read from the SMPM just as it is when the system is operated in the automatic increment sub-mode and is applied to the 16 bit inputs of set A of adder 1216. The stack pointer must be decremented by 1 in the case of a byte operation and it must be decremented by 2 in the case of a word operation, as indicated on FIG. 12 in the legend adjacent to the adder. When a received address is within the S-D area, the stack pointer read from the SMPM is decremented by 1 or 2.

Since the DIR conductor 824 is low when the system is operated in any stacking sub-mode, inverter 1212 applies a high potential to the B input of data selector 1210. Since the ST·AC or ST·D conductor 902 is high when the system is operated in the automatic decrement sub-mode, one input of gate 1214 is high. The other input, connected to DIR conductor 824, is low. Consequently, the output of the gate is low so that a 0 code appears at the C input of the data selector. In such a case, all four outputs of the data selector are forced to bit values of 1. The B input of 11-bit data selector 1218 is high since the STK conductor 702 is high. The C input is low as a result of the operation of inverter 1228 on the high potential appearing on the ST·AC or ST·D conductor 902. Thus, data selector 1218 also applies bit values of 1 to its 11 outputs. In this way, the 15 upper bits in the B input set of adder 1216 are all 1's. The bit 0 input is a 1 or a 0 depending on the output of gate 1220. (Once again, gate 1219 has no effect on the bit value. When the system is operated in the automatic decrement sub-mode, address bit A(10) is a 1; inverter 1236 holds one input of gate 1219 low so that the gate output is not forced low.) The ST·I conductor 924 connected to one input of gate 1220 is low. Consequently, the output of the gate is high only if the $\overline{A(0)}$ conductor 1016 is low. Thus, the output of gate 1220 is high only if address bit A(0) is a 1. If it is, indicating a byte operation, the bit 0 input of set B of the adder is a 1 along with the 1–15 bit inputs. Thus the B set of inputs consists of 16 1's, and when added to the stack pointer has the effect of decreasing the stack pointer by 1 — the correct value in the case of a byte operation. On the other hand, if address bit A(0) is a 0, indicating a word operation, the 16-bit value applied to the B set of inputs of the adder is 111 . . . 110 which has the effect of decreasing the stack point by a value of 2. In both cases, a carry input is not generated because the two inputs of OR gate 1222 are both low.

The decremented stack pointer is then stored in registers 1316 when the WD* conductor 912 goes low, and it is the decremented stack pointer which is used to access the ACS. The decremented stack pointer value is also re-written in the SMPM after the STK-D conductor goes high (assuming that the operation in progress is not a DATIP operation). In these respects, the system operates as it does in the case of an automatic increment sequence.

When the system is operated in the ascending stack check sub-mode, the stack pointer read from the SMPM is first decremented and used to access the SMPM. But at the end of the overall sequence, the stack pointer stored in the SMPM should not be different from its value at the start of the sequence. This is accomplished simply by having the system operate for the most part in the automatic decrement sub-mode, but then preventing the SMPM rewrite operation.

When the system is operated in the ascending stack check sub-mode, as described above the ST.AC* conductor is low in potential. This conductor is connected to one input of gate 1108. The output of the gate thus remains high during the entire operation. Since the REWRITE ON STACKING conductor 1152 must go low to control rewriting in the SMPM during any stacking operation, the SMPM stack pointer which is read is not changed.

The actual decrementing of the stack pointer read from the SMPM which takes place in the ascending stack check sub-mode is identical to that which takes place in the automatic decrement mode. That is because the various operations are controlled by a high potential appearing on the ST·AC or ST·D conductor 902 and, as described above, this conductor is high when the system is operated in both of these sub-modes. The legend in FIG. 12 adjacent to adder 1216 thus shows the same adder operations being performed when addresses in the S·D and S·AC areas are received.

The fourth stacking sub-mode is the descending stack check; the stack pointer read from the SMPM is used without modification to access the ACS, and the stack pointer in the SMPM is not changed. There is no special gate and conductor for developing a special signal such as ST·I ST·AC* or ST·AC OR ST·D as in the cases of the other sub-modes. Instead, operations in the descending stack check sub-mode take place by "default", that is, the arrangement of the various circuits is such that the proper operations take place without requiring the derivation of any additional special control signals.

Since the DIR conductor 824 is low, inverter 1212 causes the B input of data selector 1210 to be high. Since both inputs of gate 1214 (DIR and ST·AC OR ST·D) are low the output of the gate, connected to the C input of data selector 1210, is high. Consequently, since the control code input for the data selector is 11, the four outputs of the data selector all represent 0 bit values. Similarly, with the B input of data selector 1218 high since it is connected to the STK conductor 702, and the C input of this data selector also being high since it is connected through inverter 1228 to the low ST·AC OR ST·D conductor 902, the 11 bits at the output of data selector 1218 are also all 0's. The CI input of adder 1216 is low because the two inputs of OR gate 1222 are connected to the DIR conductor 824 and the ST·I conductor 924 both of which are low. In order to force the bit 0 input of set B of the adder to a 0, inverters 1234 and 1236 are provided. When the system is operated in the descending stack check mode, both of address bit A(10) and A(9) are 0's, as indicated in FIG. 5. Consequently, two of the inputs of gate 1219 are high. The third input, connected to the STK conductor 702, is also high. Thus when the system is operated in the descending stack check mode, the output of gate 1219 goes low to force the bit 0 input of set B of the adder to represent a 0. Thus, the stack pointer read from the SMPM in the ordinary way is extended through adder 1216 without any modification. This is indicated by the legend adjacent to the adder; when the received address is within the ST·DC area, the output of the adder is simply equal to the stack pointer read from the SMPM.

The output of the adder is operated upon just as it is when the system is operated in the automatic decrement mode. Since the ST·I conductor 924 is low, the S input of data selector 1316 is selected so that the unmodified stack pointer value is used as the address for the ACS. And the unmodified stack pointer is re-stored in the SMPM in the usual way (unless a DATIP operation is in progress, in which case the unmodified stack pointer is rewritten in the SMPM in the immediately following write cycle). Of course, although there is no need to re-write the stack pointer in the SMPM since it should not be changed, there is no need to provide special circuitry for preventing the re-writing inasmuch as the stack pointer is not changed by adder 1216 when the system is operated in the descending stack check sub-mode.

Control Mode Sequence

Referring to FIG. 1 it will be recalled that the control word address is within the upper 512 addresses in the 64K computer address space. This means that the seven most significant address bits A(15:9) are all 1's. Since the control word is a 16-bit word and must be identified by the processor by an even address, only eight address bits A(8:1) are required to identify the actual position of the control word within the upper 512 addresses. The control word address is determined by the setting of eight address switches 730 which are used for comparison purposes with address bits A(8:1). The eight address switch bit values together with the computer-generated address are applied to the two sets of inputs of 8-bit comparator 732 (two chip Nos. 8242). If a match is detected one input of gate 734 is enabled. Another nine inputs of this gate have applied to them address bits A(17:9). (In actual practice, more than one gate may be required to handle so many inputs and gate 934 is intended to indicate an overall "AND" function.) Not only must address bits A(15:9) be 1's, but addrers bits A(17:16) must be ls's as well; the system can be operated in the control mode only if the control word address is in the upper quadrant as described above.

The remaining input of gate 734 is connected to the MSYN conductor 1046. The output of the gate goes high to indicate that an operation should be performed in the control mode after the control word address has been received followed by the MSYN signal from the processor.

The control mode sequence is relatively simply. It simply entails the writing of the 16-bit word on the D(15:0) data cable 1230 in the two 8-bit latches 710 and 830. Each of these latches can be cleared as described above during normal initialization procedures. When an INIT control signal is received from the processor, the INIT conductor 1066 goes high. Inverter 740 applies a low-level signal to $\overline{\text{INIT}}$ conductor 742 which is extended to the clear input of each of the two latches. This resets the latches. By clearing the latches during initialization procedures, the MAS and STK bits CW(15:14) are reset to 0's. This disables the mapping and stacking modes so that the ACS can be accessed only in the direct mode.

In order to write a word into each latch, both of its enable inputs must be forced low. When the system is operated in the control mode, the output of inverter 736, the CW* conductor 744, goes low to apply a low potential to one of the ENABLE inputs of each of the latches. The other ENABLE input of each latch is connected to the READ conductor 1034 which is low only on a write operation specified by the processor. Consequently, it is only when the processor specifies a write operation along with the address of the control word that the two latches are enabled. The upper byte which is to be written and which appears on the data lines is applied to the inputs of latch 710, and the lower byte is applied to the inputs of latch 830.

It should be noted that neither the ACS nor the SMPM is accessed in the control mode. But the processor expects to receive an SSYN signal or else it will time out. For this reason, it is necessary to generate an "artificial" SSYN signal, just as one is generated when the system is operated in the SMPM mode. The output of gate 734 is connected to the CW conductor 748. This conductor is extended to one input of OR gate 1062, just as the SMPM-D conductor 924 is extended to the other input of this gate. When the CW conductor 748 goes high, it controls the transmission of an SSYN signal to the processor just as such a signal is transmitted under control of the SMPM-D conductor going high when the system is operated in the SMPM mode. It should be noted that the CW signal is generated by gate 734 immediately upon receipt of the MSYN control signal from the processor; it need not be delayed as the SMPM-D signal is delayed when the system is operated in the SMPM mode, insofar as the generation of the SSYN signal is concerned. This is because when the system is operated in the control word mode, the SMPM is not accessed. All that is involved is a simple writing of a data word in two 8-bit latches, and this takes place so fast that the SSYN signal can be generated immediately after the MSYN signal is received.

Priority Logic

The system of FIGS. 7–13 is connected via one UNIBUS to a PDP-11 processor and via another internal UNIBUS to an ACS of up to 64K size. But in many applications it is advantageous to allow two separate processors to have access to the same computer storage. With reference to our invention, in such a case a first system (FIGS. 7–13) would have its various receivers and drivers (FIGS. 10 and 12) connected to a first processor UNIBUS, and a second system (FIGS. 7–13) would have its various receivers and drivers connected to a second processor UNIBUS. Both systems would have their internal bus lines (at the right of FIG. 13) connected in parallel to the lines extending from the shared ACS 1300. However, if such a "simple" parallel connection is attempted, conflicts may arise if one processor attempts to access the ACS while the other processor is already operating on the ACS. For this reason, each system should include "priority logic" for resolving conflicts. Such priority logic is shown in FIGS. 15 and 16, with FIG. 15 being placed to the left of FIG. 16. The circuitry on these two figures to the left of ACS 1300 should be substituted for the circuitry on FIG. 13 in each system, it being understood that the various lines from the two systems which share the ACS are connected in parallel on the internal UNIBUS. For the most part, FIG. 15 includes the circuitry of FIG. 13, with the majority of the priority logic being shown on FIG. 16. (The elements on FIGS. 15 and 16 which are the same as those on FIG. 13 have the same numeral designations.) The priority logic prevents one processor from gaining access to the ACS when the internal UNIBUS is under control of the other.

The conductors and cables on the left side of FIG. 15 are identical to those at the left of FIG. 13. Thus it is apparent that the circuitry shown on FIGS. 15 and 16 can be substituted for the circuitry shown on FIG. 13. On the right side of FIG. 16 the ACS 1300 is shown. It is to be understood that the conductors and cables from two separate systems are connected in parallel (as in the case of conventional UNIBUS connections) to the ACS, with a set of pull-up resistors (now shown) being provided for the bus lines.

The priority logic of each system includes five terminals shown at the bottom of FIG. 16 — WD1*, WD2*, SS, EC1* and EC2*. When two systems are connected in parallel, one is selected to be the "master" (highest priority) and the other is considered to be the "slave" (lowest priority). The five terminals in each system are wired as shown in FIG. 17. The WD2* terminal of the master is connected to the WD1* terminal of the slave, the EC2* terminal of the master is connected to the EC1* terminal of the slave, and the SS terminal of the slave is grounded. All other terminals have no connections made to them. Typically, if two complete systems (FIGS. 7–12, 15 and 16) are included in the same enclosure, each system might be contained on a single circuit board, with the 10 terminals depicted in FIG. 17 appearing on the back plane. The necessary jumper connections may thus be made easily. Pull-up resistors 1650 and 1652 are provided so that the driving gates (1624, 1630 and 1638) can be of the opencollector type.

As will become apparent below, it is the grounding of the SS terminal in the slave system which makes the other system the master. If only one system is connected to the ACS, no connections are made to its terminals. Since the SS terminal is not grounded, the single system operates as a master. Even if only one system is connected to the internal UNIBUS, it still makes requests of its priority logic for the ACS just as in the two-system case. In this manner, all systems may be made identical even though the priority logic is not really necessary for a single system which is connected to the ACS.

The grounding of the SS terminal in a slave system causes the output of the respective gate 1630 to remain high. Thus the slave cannot force its EC1* terminal to go low. Instead, the EC1* terminal in the slave can be forced low only by virtue of a strap connection when the master causes its EC2* terminal to go low.

As will become apparent below, it is the state of flipflop 1606 in the master which determines which system controls the internal UNIBUS. A request for the UNIBUS is made when either of the inputs to gate 1626 in the master goes low. The master makes such a request when its WD* conductor 912, connected to one input of gate 1626, goes low. When the same conductor in the slave goes low, the signal appears at the WD1* terminal of the slave. The strap connection from the WD1* slave terminal to the WD2* master terminal causes the other input of gate 1626 to go low to indicate a request for UNIBUS control by the slave.

A request for UNIBUS control is granted when the EC1* terminal of a system goes low. The master grants all requests, including those of the slave. When the master grants its own request, the output of its gate 1630 goes low to apply a low potential directly to its EC1* terminal. At the same time, the output of gate 1638 in the master remains high, to hold the EC1* terminal of the slave high by virtue of the rightmost strap connection in FIG. 17. The slave cannot cause its EC1* terminal to go low directly; the SS terminal ground connection in the slave prevents the output of gate 1630 in the slave from pulling down its EC1* terminal. The slave's EC1* terminal goes low only when the EC2* terminal in the master goes low.

Consider first the case in which the internal bus is not in use and a request for its use is made by the master system. Flip-flop 1604 in the master is normally in the 1 state with its Q output being high. This enables one input of gate 1616. Since the internal bus is not in use, the SSYN' conductor 1362 is high, and the output of inverter 1336 is low. This low signal is inverted by inverter 1618 to apply a high potential to a second input of gate 1616. But the third input of gate 1616 is connected to the normally low output of gate 1626. The output of this gate is normally low because both of its inputs are normally high. One of the gate inputs is connected to the WD* conductor 912 (in the same system, the master) which is normally high. The other input of gate 1626 is connected to the master WD2* terminal. This terminal is connected via a strap to the slave WD1* terminal which is normally high. As soon as a request for access to the ACS is made by the master system, the WD* conductor 912 in the master goes low to force the output of gate 1626 to go high. At this time gate 1616 operates to apply a positive step to the CLK (clock) input of flip-flop 1606. This flip-flop assumes a state in accordance with the potential applied to its D input when a positive step is applied to its CLK input. The D input is connected to the WD* conductor 912 which controls the clocking of the flip-flop in the first place. Consequently, a O is stored in the master flip-flop 1606 when a request for access to the ACS is made by the master and the Q output of the flip-flop goes low while the $\overline{Q}$ output goes high.

The $\overline{Q}$ output of the flip-flop is connected to one input of gate 1630. The other input of the gate is connected through resistor 1622 to potential source 1620. Although this other input of the gate is connected to the SS terminal, no connection is made to the SS terminal in the master. Consequently, in the master this input of gate 1630 is always high and when the $\overline{Q}$ output of flip-flop 1606 goes high, the output of gate 1630 goes low. It is the low potential at the output of this gate (on terminal EC1*) that controls the accessing of the ACS. Inverter 1628 inverts the signal so that a high potential is applied to conductor 1644. This conductor is extended directly to the ENABLE inputs of drivers 1302 and 1344. Consequently, control and address information is extended to the ACS. The conductor is also extended to one input of gate 1334, the other input of which is connected to the Cl control conductor. Gate 1334 operates to enable drivers 1310 in the case of a write operation, just as the same-numbered gate functions in FIG. 13. Conductor 1644 is also connected to one input of gate 1508, the other input to which is connected over conductor 1602 to the output of inverter 1336. When the ACS generates the SSYN' signal, gate 1508 operates for controlling the application of the SSYN' signal to conductor 1308 as in the case of the circuit shown on FIG. 13.

Referring to FIG. 13, it will be recalled that a delay is provided at the output of inverter 1328 for delaying the generation of the MSYN' signal to the ACS until after the bit signals on the bus lines to the ACS have settled. The same delay is provided in the circuit of FIG. 16. After the output of master gate 1630 goes low, the MSYN' signal is generated, but only after a delay of 40 nanoseconds. How the delay is generated will be described below.

With flip-flop 1606 in the master being in the 0 state, the Q output of the flip-flop is low. Consequently, the output of gate 1638 is high. The high potential on the EC2* terminal in the master is extended over a jumper connection to the EC1* terminal in the slave as shown in FIG. 17. The high potential on the EC1* terminal in the slave prevents the outputs of inverters 1628 and 1632 in the slave from going high so that the slave system cannot gain control of the internal UNIBUS. Although the slave system includes a gate 1630, whose output is connected to its EC1* terminal, one input to gate 1630 in the slave unit is connected to the SS terminal which is grounded. Consequently, the output of gate 1630 in the slave cannot pull the EC1* terminal in the slave low.

After the ACS performs the operation dictated by the states of the control lines from the master, the SSYN' conductor 1362 goes low. The output of inverter 1336 goes high to control the output of gate 1508 to go high as described above. The output of inverter 1618 goes low at this time so that the output of gate 1616 goes low. The negative step at the clock input of flip-flop 1606 has no effect on the state of the flip-flop. The important thing is that even if the slave is waiting to gain control over the internal UNIBUS. it cannot do so until gate 1616 once again operates. And that can happen only after the SSYN' line is restored and the output of gate 1618 goes high; the state of flip-flop 1606 in the master — which controls which system has access to the ACS — should not change until after the operation in progress has been completed. The EC1* terminal in the master remains low and the EC2* terminal in the master remains high (to hold the EC1* terminal in the slave high) throughout the ACS operation. When the SSYN' line restores, flip-flop 1606 in the master can change state if the slave desires control of the internal UNIBUS. as will be described below. But if it does not wish control, the potentials on the EC1* and EC2* terminals do not change. (Drivers 1302 and 1344 remain enabled but that is of no consequence. The ACS does not function unless it receives a MSYN' signal.)

If the master then requests service again, its WD* signal is passed through gates 1626 and 1616, and the master flip-flop 1606 is clocked. Since conductor 912 is once again low in potential, the flip-flop remains in the 0 state, and the EC1* and EC2* terminals do not change in potential.

It should be noted that if only one system is connected to the internal UNIBUS, it operates as a master, as just described. The disabling high potential at the EC2* terminal is not necessary because there is no slave to disable, but the signal is generated nevertheless. Although a normally high potential from a slave does not appear on terminal WD2* in the master, the rightmost input of gate 1626 is still held high by the connection of the input through resistor 1650 to a potential source.

Suppose that the slave system now requests an access to the ACS with its WD* conductor 912 going low. In each system, one input of gate 1624 is connected through resistor 1646 to a positive potential. Thus the potential at the output of gate 1624 follows the potential of the respective WD* conductor. When the WD1* terminal in the slave goes low, due to a jumper connection as shown in FIG. 17, the WD2* terminal in the master goes low and the output of gate 1626 is forced high. If the internal bus is already busy, the master having gained access to it, the WD* conductor 912 in the master is low. Consequently, the output of gate 1626 in the master is already high when the slave requests service. But gate 1616 cannot generate another clock signal because the output of inverter 1618 is low. It is only after the WD* conductor in the master goes high, followed by the restoration of the SSYN' line 1362, that gate 1616 generates a clock step. Thus when the slave requests service, master flip-flop 1606 is clocked immediately if the bus is free, or it is clocked immediately after the bus becomes free. The WD* conductor 912 in the master, which is connected to the D input of the master flip-flop 1606, is now high, so that a 1 is stored in the flip-flop. Since the WD2* terminal is now low, the output of inverter 1640 is high to enable one input of gate 1638. When the Q output of flip-flop 1606 in the master goes high, the output of gate 1638 goes low. The low potential on the EC2* terminal of the master is extended over a jumper connection to the EC1* terminal of the slave. The low potential at this terminal in the slave controls the accessing of the ACS by the slave just as a low potential at this terminal in the master controls the acessing of the ACS by the master. The slave maintains control over the internal UNIBUS until its operation has been completed.

Once flip-flop 1606 has been set in the 1 state, the master (which determines priorities) allows the slave to continue to gain access to the ACS. Whenever the WD* conductor in the slave is low, that signal is transmitted via the slave's WD1* terminal, a jumper connection, the master's WD2* terminal, inverter 1640 and gate 1638 in the master, the master's EC2* terminal, and the other jumper connection to the slave's EC1* terminal. The slave's EC1* terminal remains low as long as its WD* conductor 912 remains low for controlling an ACS access.

The key here is that flip-flp 1606 in the master determines which system has control over the internal UNIBUS, and a clock step can be applied to the CLK input of the flip-flop only when the SSYN' line is high, that is, when the bus is free. Once the bus is in use, the state of the master flip-flop 1606 cannot be changed until after the bus is freed. It makes no difference which system causes the output of gate 1626 in the master to go high (to generate a flip-flop clock signal as soon as the bus is free) because it is the potential on the WD* conductor 912 in the master which controls the state of flip-flop 1606. The master system has priority because it is the state of its WD* conductor 912 which determines the state of flip-flop 1606 whenever a clock signal is generated.

The 40-nanosecond delay between the appearance of a WD* signal in either system and the generation of a respective MSYN' signal is controlled by resistor 1636 and capacitor 1634. Each of inverters 1654 and 1632 has an open-collector output, resistor 1636 serving as a pull-up resistor so that the two inverters can be wire-OR'ed together. Only if both inverter output transistors are turned off does capacitor 1634 start to charge so that 40-nanoseconds later the input to inverter 1656 is high enough to generate the MSYN' signal. The 40-nanosecond delay begins only when both the WD* conductor and the EC1* terminal are low. If either system request changes the state of master flip-flop 1606, the EC1* terminal in the system making the request causes the 40-nanosecond delay period to begin. The wire-OR connection is required for the case where the flip-flop remains in the 0 (master control) state.

Suppose the master last had control of the bus. In such a case, even when the bus is freed, master terminal EC1* stays low. It is now the output of inverter 1654 which holds capacitor 1634 clamped to a low potential. It is only when the master WD* conductor 912 goes low that the output of inverter 1654 no longer clamps the capacitor, the capacitor starts to charge, and 40 nanoseconds later the MSYN' signal is generated. On the other hand, suppose the slave last had control of the bus. As soon as the bus was freed, the EC1* terminal in the slave went high. When the next slave WD* signal is generated, the slave EC1* terminal goes low. Thus in a slave, inverter 1632 is sufficient to clamp capacitor 1634 between bus uses. Inverter 1654 is not required. It is only in a master that inverter 1654 is required, and then only in the case where the master last had control of the bus, in order to start the 40-nanosecond delay when a service request is first made since the master EC1* terminal remains low between bus uses.

Inverter 1654 cannot be used alone to initiate the delay interval. This is because a WD* signal in either system should not initiate a MSYN' signal if the other system has control of the bus. It is only when the system in which the WD* signal was generated gains control of the bus (with its EC1* terminal going low) that the delay interval should begin. The wire-OR connection ensures that in every case a MSYN' signal is generated only 40-nanoseconds after both the WD* conductor is low and the system has control of the bus.

Positive potentials are applied to the CL (clear) input of flip-flop 1604 and to the PS (preset) input of flip-flop 1606. These inputs of the flip-flops, when held at high potentials, have no effects on the states of the flip-flops. It is only a low potential at one of the inputs that affects the flip-flop state. The CL input of master flip-flop 1606 is also high. While the CL input of this flip-flop in the slave is low due to the grounding of the slave's SS terminal, thus causing a 0 to be stored, flip-flop 1606 in the slave controls nothing in the first place.

It is only after the SSYN' signal has been restored on conductor 1362 by the ACS that a new request by either system for the use of the internal UNIBUS can be granted. Until the SSYN' signal goes high, gate 1616 cannot operate to clock a new bit value into flip-flop 1606. There is one exception, however, to this general rule; in the case of a DATIP operation, the system which has control over the bus maintains it until after the termination of the immediately following write operation. This is because a DATIP operation must be followed by a write operation (under control of the same processor) at the same address in a storage device. The CO conductor at the top of FIG. 15 is extended to one input of gate 1504 through inverter 1502. The Cl conductor is extended directly to one input of the gate. If the CO, Cl control bits represent a 10 code, gate 1504 operates and conductor 1506 goes low to represent a DATIP operation. (This gate in the master operates even if it is the slave which controls the bus; the respective CO and Cl lines of the two systems extended to the ACS are connected together.) Conductor 1506 is connected to the D input of flip-flop 1604. When the SSYN' signal is asserted by the ACS during the DATIP operation, a positive step appears at the CLK input of flip-flop 1604. At this time a 0 is stored in the flip-flop and the Q output goes low. Consequently, gate 1616 is disabled, and the state of flip-flop 1606 cannot be changed until after the Q output of flip-flop 1604 goes high. This happens during the succeeding write operation. Once again the CLK input of flip-flop 1604 is clocked, but now conductor 1506 is high in potential so that a 1 is stored in the flip-flop. Thus immediately after the write operation, the state of flip-flop 1606 can be changed if the system which did not have control of the bus next desires it.

Flip-flop 1604 is reset to the 1 state automatically in the event a write operation does not follow the DATIP operation within a preset time interval (e.g., 10 microseconds). When flip-flop 1604 is in its normal 1 state, its $\overline{Q}$ output is low. Consequently, the base of transistor 1608 is returned through diode 1614 to a low potential and the transistor remains off. The PS input of the flip-flop, which is returned through resistor 1648 to a positive potential, has no effect on the flip-flop state. Capacitor 1612 remains discharged. Bu as soon as flip-flop 1604 is switched to the 0 state, the $\overline{Q}$ output goes high. At this time diode 1614 is reverse biased and capacitor 1612 starts to charge through resistor 1610. When the capacitor charges to the point which turns on transistor 1608, a low potential is applied to the PS input of flip-flop 1604. This causes the flip-flop to be switched to the 1 state so that the Q output goes high and the $\overline{Q}$ output goes low. Capacitor 1612 now discharges through diode 1614, transistor 1608 turns off, and flip-flop 1604 remains in its normal 1 state. This time-out feature also controls the setting of the flip-flop in the 1 state when power is first turned on so that either system can control the state of flip-flop 1606 to gain access to the ACS.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A multi-mode memory comprising a first plurality of storage locations each having a respective access address, a second plurality of storage locations each having a respective access address and at least some of which are used for containing the access addresses of some of said storage locations in said first plurality, a plurality of data lines, means for transferring data between said data lines and either a selected one of the storage locations in said second plurality or a selected one of the storage locations in said first plurality having a derived access address, a plurality of address lines for receiving thereon memory addresses having a plurality of bits therein, means for verifying that a received memory address on said address lines is contained within one of several predetermined groups of memory addresses, and means responsive to the operation of said verifying means for deriving the access address of a selected storage location in either said first or said second plurality for use by said data transferring means, said deriving means including means for identifying from a received memory address a storage location in said second plurality and for deriving the access address of a selected storage location in said first plurality of performing a predetermined operation on the access address contained in the identified storage location in accordance with the values of at least some of the bits in the received memory address responsive to the received memory address being contained in at least one of said predetermined groups, said deriving means operating in one of several different modes in accordance with which predetermined group of memory addresses contains the received memory address.

2. A memory in accordance with claim 1 wherein said deriving means performs a different predetermined operation on an access address in accordance with which respective predetermined group of memory addresses contains the received memory address.

3. A memory in accordance with claim 1 wherein one of the modes of operation is a direct mode in which said deriving means derives the access address of a selected storage location in said first plurality by translating each received memory address within one of said predetermined groups by a preselected amount.

4. A memory in accordance with claim 3 further including means for adjusting the preselected amount by which each received memory address is translated to derive the access address of a storage location in said first plurality when said deriving means operates in said direct mode.

5. A memory in accordance with claim 3 further including means for establishing a set of contiguous memory addresses each of which when received results in said deriving means operating in said direct mode.

6. A memory in accordance with claim 1 wherein one of the modes of operation is a mapping mode in which said deriving means derives the access address of a selected storage location in said first plurality when the received memory address is contained within a predetermined mapping group, said mapping group including several memory address pages with each of said memory address pages being associated with a respective one of the storage locations in said second plurality, each of said respective storage locations in said second plurality containing the starting access address of a corresponding page of storage locations in said first plurality, said deriving means operating in the mapping mode to arithmetically combine the access address in that one of said storage locations in said second plurality which is associated with the memory address page which contains the received memory address with at least some of the bits in the received memory address to derive the access address of a selected storage location in said first plurality.

7. A memory in accordance with claim 6 wherein said at least some of the bits in the received memory address represent the difference between the received memory address and the starting memory address of the memory address page which contains the received memory address.

8. A memory in accordance with claim 6 further including means for controlling the storage of a new page starting access address which appears on said data lines in a storage location in said second plurality when the received memory address is contained within a special predetermined group, said deriving means including means for deriving the access address of a selected storage location in said second plurality from less than all of the bits in a received memory address which is contained within said special predetermined group.

9. A memory in accordance with claim 6 further including means for setting a number of contiguous memory address pages in said mapping group, a memory address in each of which when received results in said deriving means operating in said mapping mode.

10. A memory in accordance with claim 1 wherein one of the modes of operation is a special mode in which said deriving means derives the access address of a selected storage location in said second plurality when the received memory address is contained within a special predetermined group, said deriving means including means for deriving the access address of a selected storage location in said second plurality from at least some of the bits in a received memory address which is contained within said special predetermined group.

11. A memory in accordance with claim 10 further including means for setting a number of contiguous memory addresses which are contained in said special predetermined group.

12. A memory in accordance with claim 1 wherein one of the modes of operation is a stacking mode in which said deriving means derives the access address of a storage location in said first plurality when the received memory address is contained within a predetermined stacking group, said stacking group including a plurality of sub-groups the memory addresses in each of which are all associated with a respective one of the storage locations in said second plurality, each of said respective storage locations in said second plurality containing the respective access address of a storage location in a respective buffer area in said first plurality, said deriving means operating in the stacking mode to derive the access address of a storage location in said first plurality by performing a predetermined operation on the access address contained in the respective storage location in said second plurality which is associated with the received memory address in accordance with the values of less than all of the bits in the received memory address.

13. A memory in accordance with claim 12 wherein responsive to the receipt of at least one of the memory addresses in each of said sub-groups said deriving means modifies the access address contained in the associated storage location in said second plurality by a predetermined amount to derive the access address of a storage location in said first plurality.

14. A memory in accordance with claim 13 further including means for storing the modified access address in its previous storage location in said second plurality.

15. A memory in accordance with claim 13 wherein responsive to the receipt of at least one of the memory addresses in each of said sub-groups said deriving means decrements the access address contained in the associated storage location in said second plurality by 1.

16. A memory in accordance with claim 13 wherein responsive to the receipt of at least one of the memory addresses in each of said sub-groups said deriving means decrements the access address contained in the associated storage location in said second plurality by 2.

17. A memory in accordance with claim 13 wherein responsive to the receipt of at least one of the memory addresses in each of said sub-groups the access address which is modified is used by said data transferring means and is left unchanged in its respective storage location in said second plurality.

18. A memory in accordance with claim 17 wherein responsive to the receipt of at least one of the memory addresses in each of said sub-groups the access address which is modified and used by said data transferring means is decremented by 1.

19. A memory in accordance with claim 17 wherein responsive to the receipt of at least one of the memory addresses in each of said sub-groups the access address which is modified and used by said data transferring means is decremented by 2.

20. A memory in accordance with claim 12 wherein responsive to the receipt of at least one of the memory addresses in each of said sub-groups said deriving means retrieves the access address contained in the associated storage location in said second plurality to derive the access address of a storage location in said first plurality and thereafter modifies the retrieved access address by a predetermined amount and stores the modified retrieved access address in its previous storage location in said second plurality.

21. A memory in accordance with claim 20 wherein the derived access address is made equal to the retrieved access address.

22. A memory in accordance with claim 20 wherein responsive to the receipt of at least one of the memory addresses in each of said sub-groups the retrieved access address contained in the associated storage location in said second plurality is modified by incrementing it by 1.

23. A memory in accordance with claim 20 wherein responsive to the receipt of at least one of the memory addresses in each of said sub-groups the retrieved access address contained in the associated storage location in said second plurality is modified by incrementing it by 2.

24. A memory in accordance with claim 12 further including means for controlling the storage of new access addresses which appear on said data lines in particular storage locations in said second plurality which are associated with received memory addresses contained in a special predetermined group, and means for identifying such a particular storage location in said second plurality from at least some of the bits in a received memory address which is contained within said special predetermined group.

25. A memory in accordance with claim 12 further including means for setting the successive memory addresses in said stacking group, a memory address in each of which when received results in said deriving means operating in said stacking mode.

26. A memory in accordance with claim 1 further including a plurality of storage means, and means responsive to the receipt of a predetermined memory address on said address lines for controlling the transfer of data from said data lines to said plurality of storage means.

27. A memory in accordance with claim 26 further including means responsive to data stored in said plurality of storage means for selectively enabling and disabling the operation of said deriving means in some of said several modes.

28. A memory in accordance with claim 1 further including means for selectively changing said predetermined operation performed by said deriving means responsive to a received memory address being contained in said at least one predetermined group.

29. A memory in accordance with claim 1 wherein at least two of said predetermined groups of memory addresses are adjustable and can overlap, and further including means for controlling a priority sequence with respect to the mode in which said deriving means is operated in the event a received memory address is contained in at least two different ones of said predetermined groups.

30. A memory in accordance with claim 1 wherein memory addresses and data are received on said plurality of address and data lines from two sources, and further including means for delaying a data transfer operation in accordance with the memory address and data received from one source until after the completion of a data transfer operation which is in progress in accordance with the memory address and data received from the other source.

31. A memory for operating in a mapping mode comprising a first plurality of storage locations each having a respective access address, a second plurality of storage locations each having a respective access address, a plurality of data lines, means for transferring data between said data lines and either a selected one of the storage locations in said second plurality or a selected one of the storage locations in said first plurality having a derived access address, a plurality of address lines for receiving thereon memory addresses having a plurality of bits therein, some of said memory addresses being contained in a set of pages with all of the memory addresses in each of said pages being associated with the same respective one of the storage locations in said second plurality, others of said memory addresses being contained in a special group with each memory address therein being associated with a respective one of the storage locations in said second plurality, at least some of the storage locations in said second plurality containing the starting access addresses of pages of storage locations in said first plurality which correspond to the respective pages of memory addresses associated with said at least some storage locations in said second plurality, first means for deriving from a received memory address which is contained in said special group the access address of a selected storage location in said second plurality for use by said data transferring means, and second means for deriving from a received memory address which is contained in one of said pages the access address of a selected storage location in said first plurality for use by said data transferring means by combining the page starting access address contained in the associated storage location in said second plurality with at least some of the bits in the received memory address.

32. A memory in accordance with claim 31 wherein said second deriving means arithmetically combines said page starting access address with at least some of the bits in the received memory address to derive the access address of said selected storage location in said first plurality.

33. A memory in accordance with claim 32 wherein said at least some of the bits in the received memory address represent the difference between the received memory address and the starting memory address of the memory address page which contains the received memory address.

34. A memory in accordance with claim 33 wherein said first deriving means derives the access address of a selected storage location in said second plurality from at least some of the bits in a received memory address which is contained within said special group.

35. A memory in accordance with claim 34 further including means for setting the number of pages which contain memory addresses which when received result in the operation of said second deriving means.

36. A memory in accordance with claim 31 wherein said first deriving means derives the access address of a selected storage location in said second plurality from at least some of the bits in a received memory address which is contained within said special group.

37. A memory in accordance with claim 36 further including means for setting the number of pages which contain memory addresses which when received result in the operation of said second deriving means.

38. A memory in accordance with claim 31 further including means for setting the number of pages which contain memory addresses which when received result in the operation of said second deriving means.

39. A memory in accordance with claim 31 wherein memory addresses and data are received on said plurality of address and data lines from two sources, and further including means for delaying a data transfer operation in accordance with the memory address and data received from one source until after the completion of a data transfer operation which is in progress in accordance with the memory address and data received from the other source.

40. A memory for operating in a stacking mode comprising a first plurality of storage locations each having a respective access address, a second plurality of storage locations each having a respective access address, a plurality of data lines, means for transferring data between said data lines and either a selected one of the storage locations in said second plurality or a selected one of the storage locations in said first plurality having a derived access address, a plurality of address lines for receiving thereon memory addresses having a plurality of bits therein, some of said memory addresses being contained in respective groups with all of the memory addresses in each of said groups being associated with the same respective one of the storage locations in said second plurality, others of said memory addresses being contained in a special set with each memory address therein being associated with a respective one of the locations in said second plurality, at least some of the storage locations in said second plurality containing the access addresses of storage locations in said first plurality, first means for deriving from a received memory address which is contained in said special set the access address of a selected storage location in said second plurality for use by said data transferring means, and second means for deriving from a received memory address which is contained in one of said groups the access address of a selected storage location in said first plurality for use by said data transferring means by performing a predetermined operation on the access address contained in the associated storage location in said second plurality in accordance with the values of at least some of the bits in the received memory address.

41. A memory in accordance with claim 40 wherein responsive to the receipt of at least one of the memory addresses in each of said groups said second deriving means uses the access address contained in the associated storage location in said second plurality as the access address of a storage location in said first plurality.

42. A memory in accordance with claim 41 further including means for modifying by a predetermined amount the access address used by said data transferring means and for storing the modified access address in its previous storage location in said second plurality.

43. A memory in accordance with claim 42 wherein responsive to the receipt of at least one of the memory addresses in each of said groups said second deriving means increments the access address contained in the associated storage location in said second plurality by 1.

44. A memory in accordance with claim 42 wherein responsive to the receipt of at least one of the memory addresses in each of said groups said second deriving means increments the access address contained in the associated storage location in said second plurality by 2.

45. A memory in accordance with claim 40 wherein responsive to the receipt of at least one of the memory addresses in each of said groups said second deriving means increments the access address contained in the associated storage location in said second plurality by 1.

46. A memory in accordance with claim 40 wherein responsive to the receipt of at least one of the memory addresses in each of said groups said second deriving means increments the access address contained in the associated storage location in said second plurality by 2.

47. A memory in accordance with claim 40 wherein responsive to the receipt of at least one of the memory addresses in each of said groups said second deriving means retrieves the access address contained in the associated storage location in said second plurality and modifies the retrieved access address by a predetermined amount to derive an access address of a storage location in said first plurality.

48. A memory in accordance with claim 47 wherein the access address which is modified is thereafter used by said data transferring means, and further including means for storing the modified address in its previous storage location in said second plurality.

49. A memory in accordance with claim 48 wherein responsive to the receipt of at least one of the memory addresses in each of said groups the retrieved access address contained in the associated storage location in said second plurality is modified by decrementing it by 1.

50. A memory in accordance with claim 48 wherein responsive to the receipt of at least one of the memory addresses in each of said groups the retrieved access address contained in the associated storage location in said second plurality is modified by decrementing it by 2.

51. A memory in accordance with claim 40 wherein responsive to the receipt of at least one of the memory addresses in each of said groups said second deriving means retrieves the access address from the associated storage location in said second plurality and modifies it by a predetermined amount to derive the access address of a storage location in said first plurality, the access address in said associated storage location in said second plurality being left unchanged.

52. A memory in accordance with claim 51 wherein responsive to the receipt of at least one of the memory addresses in each of said groups the access address which is retrieved and modified is decremented by 1.

53. A memory in accordance with claim 51 wherein responsive to the receipt of at least one of the memory addresses in each of said groups the access address which is retrieved and modified is decremented by 2.

54. A memory in accordance with claim 40 wherein responsive to the receipt of at least one of the memory addresses in each of said groups said second deriving means decrements the access address contained in the associated storage location in said second plurality by 1.

55. A memory in accordance with claim 40 wherein responsive to the receipt of at least one of the memory addresses in each of said groups said second deriving means decrements the access address contained in the associated storage location in said second plurality by 2.

56. A memory in accordance with claim 40 further including means for setting the memory addresses contained in said respective groups.

57. A memory in accordance with claim 40 wherein memory addresses and data are received on said plurality of address and data lines from two sources, and further including means for delaying a data transfer operation in accordance with the memory address and data received from one source until after the completion of a data transfer operation which is in progress in accordance with the memory address and data received from the other source.

58. A memory for operating in a stacking mode comprising a plurality of storage locations each having a respective access address, a plurality of data lines, means for transferring data between said data lines and a selected one of said storage locations having a derived access address, a plurality of address lines for receiving thereon memory addresses having a plurality of bits therein, a plurality of pointer means each for representing the access address of a storage location, means for storing access addresses in said plurality of pointer means, a group of memory addresses being associated with each of said pointer means, and means for deriving from a received memory address the access address of a selected storage location for use by said data transferring means by performing a predetermined operation on the access address represented by the associated pointer means in accordance with the values of at least some of the bits in the received memory address.

59. A memory in accordance with claim 58 wherein responsive to the receipt of at least some of the memory addresses in each of the groups said deriving means uses the access address represented by the associated pointer means as the access address of a storage location.

60. A memory in accordance with claim 59 further including means for modifying by a predetermined amount the access address used by said data transferring means and storing the modified access address in its previous pointer means.

61. A memory in accordance with claim 60 wherein responsive to the receipt of at least one of the memory addresses in each of said groups said deriving means increments the access address represented by the associated pointer means by 1.

62. A memory in accordance with claim 60 wherein responsive to the receipt of at least one of the memory addresses in each of said groups said deriving means increments the access address represented by the associated pointer means by 2.

63. A memory in accordance with claim 58 wherein responsive to the receipt of at least one of the memory addresses in each of the groups said deriving means increments the access address represented by the associated pointer means by 1.

64. A memory in accordance with claim 58 wherein responsive to the receipt of at least one of the memory addresses in each of the groups said deriving means increments the access address represented by the associated pointer means by 2.

65. A memory in accordance with claim 58 wherein responsive to the receipt of at least one of the memory addresses in each of the groups said deriving means modifies by a predetermined amount the access address represented by the associated pointer means to derive an access address of a storage location.

66. A memory in accordance with claim 65 wherein the access address which is modified is used by said data transferring means, and further including means for storing the modified access address in its previous pointer means.

67. A memory in accordance with claim 66 wherein responsive to the receipt of at least one of the memory addresses in each of said groups the access address which is modified is decremented by 1.

68. A memory in accordance with claim 66 wherein responsive to the receipt of at least one of the memory addresses in each of said groups the access address which is modified is decremented by 2.

69. A memory in accordance with claim 65 wherein responsive to the receipt of at least one of the memory addresses in each of said groups the access address which is modified and used by said data transferring means is left unchanged in its pointer means.

70. A memory in accordance with claim 69 wherein responsive to the receipt of at least one of the memory addresses in each of said groups the access address which is modified and used by said data transferring means is decremented by 1.

71. A memory in accordance with claim 69 wherein responsive to the receipt of at least one of the memory addresses in each of said groups the access address which is modified and used by said data transferring means is decremented by 2.

72. A memory in accordance with claim 58 wherein responsive to the receipt of at least one of the memory addresses in each of the groups said deriving means decrements the access address represented by the associated pointer means by 1.

73. A memory in accordance with claim 58 wherein responsive to the receipt of at least one of the memory addresses in each of the groups said deriving means decrements the access address represented by the associated pointer means by 2.

74. A memory in accordance with claim 58 further including means for setting the memory addresses contained in the groups associated with said pointer means.

75. A memory in accordance with claim 58 wherein memory addresses and data are received on said plurality of address and data lines from two sources, and further including means for delaying a data transfer operation in accordance with the memory address and data received from one source until after the completion of a data transfer operation which is in progress in accordance with the memory address and data received from the other source.

76. A memory in accordance with claim 58 further including a plurality of storage means, and means responsive to the receipt of a predetermined memory address on said address lines for controlling the tranfer of data from said data lines to said plurality of storage means.

77. A memory in accordance with claim 76 further including means responsive to data stored in said plurality of storage means for selectively enabling and disabling the operation of said deriving means.

78. A memory in accordance with claim 76 further including means responsive to data stored in said plurality of storage means for selecting the memory addresses which are contained in at least one of said groups.

79. A memory in accordance with claim 58 further including means for selectively changing said predetermined operation performed by said deriving means responsive to a received memory address being contained in at least one of said groups.

* * * * *

UNITED STATES PATENT OFFICE
CERTIFICATE OF CORRECTION

Patent No. 3,914,747 Dated October 21, 1975

Inventor(s) Elwood Barnes, et al

It is certified that error appears in the above-identified patent and that said Letters Patent are hereby corrected as shown below:

Column 1, line 42, "memory" should read "'memory'".

Column 2, line 29, "using up" should read "'using up'".

Column 5, line 29, "storge" should read "storage".

line 39, "(K=$10^{24}$)" should read "(K=1024)".

Column 6, line 8, "pointed" should read "pointer".

Column 9, line 5, "valid" should read "'valid'".

line 25, "linens" should read "lines".

line 28, the comma should be a period.

line 34, "oout" should read "out".

line 37, "a 8-bit" should read "an 8-bit".

line 39, "work", each occurrence, should be "word".

line 58, "(* and," should read "(and,"

line 58, "work" should read "word".

line 67, "devided" should read "divided".

Column 10, line 63, "bocks" should read "blocks".

Column 12, line 21, "2" should read "16".

UNITED STATES PATENT OFFICE

CERTIFICATE OF CORRECTION

Patent No. 3,914,747 Dated October 21, 1975

Inventor(s) Elwood Barnes, et al

It is certified that error appears in the above-identified patent and that said Letters Patent are hereby corrected as shown below:

Column 14, line 5, "Junt" should read "Just".

Column 15, line 36, "computergenerated" should read "computer-generated".

Column 16, line 15, "operation." should read "operation)."

Column 16, line 58, after "any" there should appear "defined by the 6 bits of the control word is odd, then the next lowest 1K boundary".

Column 17, line 42, "efore" should read "before".

Column 18, line 12, "thast" should read "that".

Column 20, line 38, "or" should read "of".

Column 21, line 18, "or" should read "on".

line 57, "As2N + 513" should read "A + 2n + 513".

Column 22, line 58, "for" should read "four".

Column 24, line 10, "boundasry" should read "boundary".

line 23, "numer" should read "number".

Column 29, line 17, "(17;16)" should read "(17:16)".

UNITED STATES PATENT OFFICE

CERTIFICATE OF CORRECTION

Patent No. 3,914,747 Dated October 21, 1975

Inventor(s) Elwood Barnes, et al.

It is certified that error appears in the above-identified patent and that said Letters Patent are hereby corrected as shown below:

Column 33, line 20, "A(0)", each occurrence, should read "$\overline{A(0)}$".

line 24, "A(0)" should read "$\overline{A(0)}$".

Column 36, line 37, "manoseconds" should read "nanoseconds".

line 65, "gage" should read "gate".

Column 37, lines 3 and 4, after "D"(15:00)", the words "being extended through data receivers 1312 to the D"(15:00)" should be deleted.

Column 39, line 15, "addres" should read "address".

line 19, "alway" should read "always".

Column 40, line 62, "computergenerated" should read "computer-generated".

line 65, "computergenerated" should read "computer-generated".

Column 41, line 46, "MAP" should read "$\overline{MAP}$".

Column 42, line 33, "a" should read "A".

line 67, "seletor/registor" should read "selector/register".

UNITED STATES PATENT OFFICE

CERTIFICATE OF CORRECTION

Patent No. 3,914,747 Dated October 21, 1975

Inventor(s) Elwood Barnes, et al.

It is certified that error appears in the above-identified patent and that said Letters Patent are hereby corrected as shown below:

Column 44, line 19, "conducor" should read "conductor".

line 25, "ST·ACOR ST·D" should read "ST·AC OR ST·D".

Column 47, line 47, "$\overline{\text{SMPM}}$" should read "SMPM".

line 49, "SMPM" should read "$\overline{\text{SMPM}}$".

Column 48, line 24, "16bit" should read "16-bit".

line 36, "is" should read "in".

Column 56, line 68, "te" should read "the".

Column 57, line 66, "ST·L" should read "ST·I".

Column 59, line 29, "ST·I ST·AC*" should read "ST·I, ST·AC*".

Column 64, line 32, The period should be a comma.

Column 64, line 44, The first period should be a comma.

Column 65, line 30, "acessing" should read "accessing".

Column 67, line 25, "Bu" should read "But".

Column 68, line 4, "of" should read "by".

Column 74, line 53, "some" should read "one".

Column 76, line 29, "tranfer" should read "transfer".

Signed and Sealed this

*fourth* Day of *May 1976*

[SEAL]

*Attest:*

RUTH C. MASON
*Attesting Officer*

C. MARSHALL DANN
*Commissioner of Patents and Trademarks*